US012309547B2

(12) United States Patent
Kim et al.

(10) Patent No.: US 12,309,547 B2

(45) **Date of Patent: *May 20, 2025**

(54) VIBRATION APPARATUS AND APPARATUS INCLUDING THE SAME

(71) Applicant: LG Display Co., Ltd., Seoul (KR)

(72) Inventors: Minji Kim, Paju-si (KR); Sungwook Ko, Paju-si (KR); Seunghyun Sung, Paju-si (KR); SeungRyull Park, Paju-si (KR); YoungWook Ha, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 150 days.

This patent is subject to a terminal disclaimer.

(21) Appl. No.: 18/141,791

(22) Filed: May 1, 2023

(65) Prior Publication Data

US 2023/0269542 A1 Aug. 24, 2023

Related U.S. Application Data

(63) Continuation of application No. 17/532,487, filed on Nov. 22, 2021, now Pat. No. 11,678,124.

(30) Foreign Application Priority Data

Dec. 22, 2020 (KR) ........................ 10-2020-0181061

(51) Int. Cl.
*H04R 17/00* (2006.01)
*H04R 1/02* (2006.01)

(52) U.S. Cl.
CPC ............. *H04R 17/00* (2013.01); *H04R 1/028* (2013.01); *H04R 2499/15* (2013.01)

(58) Field of Classification Search
CPC ...... H04R 17/00; H04R 17/005; H04R 1/028; H04R 2499/15
See application file for complete search history.

(56) References Cited

U.S. PATENT DOCUMENTS

2015/0054779 A1* 2/2015 Horii .................... H04M 1/026 345/174
2018/0149786 A1 5/2018 Lee et al.
2019/0045286 A1* 2/2019 Kim ...................... H04R 17/00
(Continued)

FOREIGN PATENT DOCUMENTS

CN 107731790 A 2/2018
CN 108122488 A 6/2018
(Continued)

*Primary Examiner* — Jason R Kurr
(74) *Attorney, Agent, or Firm* — Birch, Stewart, Kolasch & Birch, LLP

(57) ABSTRACT

Discussed is an apparatus including a display panel configured to display an image, a vibration apparatus disposed at a rear surface of the display panel to vibrate the display panel to generate sound, and an adhesive member and a connection member between the display panel and the vibration apparatus. The vibration apparatus can include a vibration portion, a first protection member disposed at a first surface of the vibration portion, and a second protection member disposed at a second surface of the vibration portion, the second surface of the vibration portion being different from the first surface of the vibration portion. The connection member can cover a front surface of the first protection member adjacent to the adhesive member.

27 Claims, 13 Drawing Sheets

(56) References Cited

U.S. PATENT DOCUMENTS

| | | | | |
|---|---|---|---|---|
| 2019/0129231 | A1* | 5/2019 | Ham | H04R 7/045 |
| 2019/0238986 | A1 | 8/2019 | Ikeuchi | |
| 2020/0162804 | A1 | 5/2020 | Lee et al. | |
| 2021/0227332 | A1* | 7/2021 | Chen | H04R 7/04 |
| 2022/0014854 | A1* | 1/2022 | Zhou | H04R 1/288 |
| 2022/0102619 | A1* | 3/2022 | Kikuchi | H10N 30/092 |
| 2022/0238787 | A1 | 7/2022 | Kagawa et al. | |
| 2022/0312119 | A1 | 9/2022 | Marchant | |

FOREIGN PATENT DOCUMENTS

| | | | |
|---|---|---|---|
| CN | 110854262 | A | 2/2020 |
| CN | 111580208 | A | 8/2020 |
| CN | 111754858 | A | 10/2020 |
| KR | 10-2019-0048929 | A | 5/2019 |
| KR | 10-2020-0039299 | A | 4/2020 |
| WO | WO 2018/070399 | A1 | 4/2018 |

* cited by examiner

VIBRATION APPARATUS AND APPARATUS INCLUDING THE SAME

CROSS-REFERENCE TO RELATED APPLICATIONS

This application is a Continuation Application of U.S. patent application Ser. No. 17/532,487 filed on Nov. 22, 2021 (now U.S. Pat. No. 11,678,124 issued on Jun. 13, 2023), which claims priority to Korean Patent Application No. 10-2020-0181061 filed on Dec. 22, 2020 in the Republic of Korea, the entire contents of all these applications being hereby expressly incorporated by reference into the present application.

BACKGROUND OF THE DISCLOSURE

Field

The present disclosure relates to a vibration apparatus and an apparatus including the vibration apparatus.

Discussion of the Related Art

A display apparatus displays an image at the display panel and includes a separate speaker or sound device for providing a sound. When a speaker is in a display apparatus, the speaker occupies a space; due to this, the design and spatial disposition of the display apparatus are limited.

A speaker applied to display apparatuses can be, for example, an actuator, including a magnet and a coil. However, when the actuator is applied to the display apparatuses, a thickness thereof is large. Piezoelectric elements that enable thinness to be implemented are attracting much attention as imbedded speakers.

Meanwhile, because the piezoelectric elements are fragile, the piezoelectric elements can be easily damaged by an external impact, and thus the reliability of sound reproduction is low. Further, when a speaker using a piezoelectric element is applied to a flexible display apparatus, there is a problem where damage occurs due to a fragile characteristic of piezoelectric elements.

SUMMARY OF THE DISCLOSURE

Provided is a vibration apparatus for enhancing the quality of a sound and a sound pressure level characteristic. Accordingly, embodiments of the present disclosure are directed to an apparatus that substantially obviates one or more problems due to limitations and disadvantages of the related art.

An aspect of the present disclosure is to provide an apparatus which vibrates a vibration member to generate a sound or a vibration and have enhanced a sound characteristic and/or a sound pressure level characteristic.

Additional features and aspects will be set forth in part in the description that follows, and in part will become apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the inventive concepts, as embodied and broadly described herein, an apparatus includes a display panel configured to display an image, a vibration apparatus disposed at a rear surface of the display panel to vibrate the display panel, and an adhesive member and a connection member between the display panel and the vibration apparatus.

In another aspect of the present disclosure, an apparatus includes a vibration member, a vibration apparatus disposed at the vibration member, and an adhesive member and a connection member between the vibration member and the vibration apparatus.

In an aspect of the present disclosure, a vibration apparatus includes a vibration portion, a first protection member disposed at a first surface of the vibration portion, a second protection member disposed at a second surface different from the first surface of the vibration portion, a connection member disposed over the first protection member, and an adhesive member disposed over the connection member.

In another aspect of the present disclosure, a vibration apparatus includes a vibration member, a first vibration generator disposed at the vibration member, a second vibration generator disposed under the first vibration generator, a first adhesive member between the vibration member and the first vibration generator, a second adhesive member between the first vibration generator and the second vibration generator, and a first connection member between the second vibration generator and the second adhesive member.

The apparatus according to the embodiments of the present disclosure can include a vibration apparatus which vibrates a display panel or a vibration member, and thus, can generate a sound so that a traveling direction of the sound of the apparatus is a direction toward a forward region in front of the display panel or the vibration member.

According to embodiments of the present disclosure, an adhesive member and/or a connection member can be provided, thereby providing an apparatus having an enhanced a sound pressure level characteristic and/or a sound characteristic.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
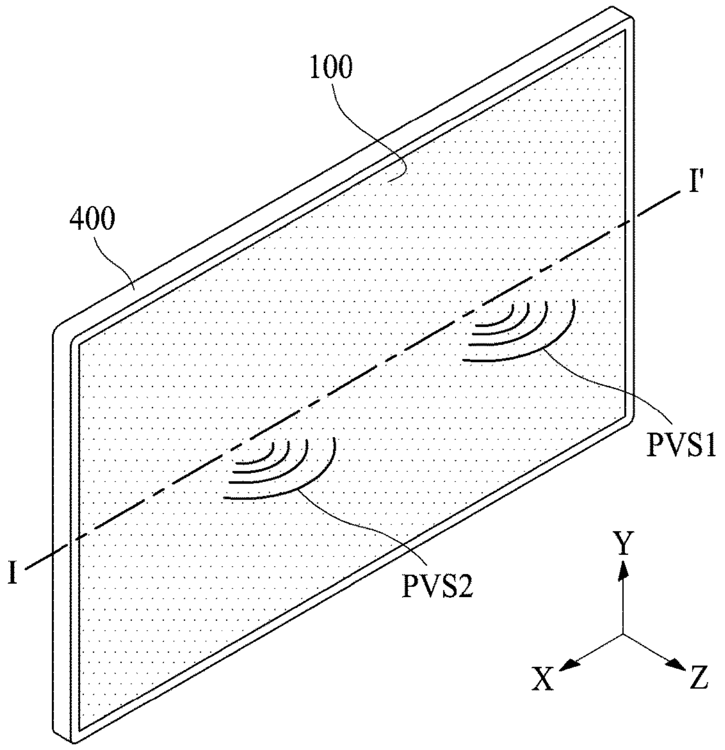
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer (or multiple elements or layers) the element or layer can not only be directly connected or adhered to another element or layer, but also be indirectly connected or adhered to another element or layer with one or more intervening elements or layers "disposed," or "interposed" between the elements or layers, unless otherwise specified.

In the description of embodiments, when a structure is described as being positioned "on, over, or above" or "under or below" another structure, this description should be construed as including a case in which the structures contact each other as well as a case in which a third structure is disposed therebetween. The size and thickness of each element shown in the drawings are given merely for the convenience of description, and are not limited thereto, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of an apparatus can include a display apparatus such as an organic light emitting display (OLED) module or a liquid crystal module (LCM) including a display panel and a driver for driving the display panel. Further, examples of the display apparatus can include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus can include a display apparatus itself, such as an LCM or an OLED module, and a set device (or a set apparatus) which is a final consumer device or an application product including the LCM or the OLED module.

In some embodiments, an LCM or an OLED module including a display panel and a driver can be referred to as a display apparatus, and an electronic apparatus which is a final product including an LCM or an OLED module can be referred to as a set apparatus. For example, the display apparatus can include a display panel, such as an LCD, an OLED, or an electroluminescent display, and a source printed circuit board (PCB) which is a controller for driving the display panel. The set apparatus can further include a set PCB which is a set controller electrically connected to the source PCB to overall control the set apparatus.

A display panel applied to an embodiment of the present disclosure can use all types of display panels such as a liquid crystal display panel, an organic light emitting diode (OLED) display panel, and an electroluminescent display panel, but the terms are not limited to a specific display panel, which is vibrated by a vibration apparatus according to an embodiment of the present disclosure to output a sound. Further, a shape or a size of a display panel applied to a display apparatus according to embodiments of the present disclosure are not limited.

For example, when the display panel is the liquid crystal display panel, the display panel can include a plurality of gate lines, a plurality of data lines, and a plurality of pixels respectively provided at a plurality of pixel areas defined by intersections of the gate lines and the data lines. Further, the display panel can include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, when the display panel is the organic light emitting display panel, the display panel can include a plurality of gate lines, a plurality of data lines, and a plurality of pixels respectively provided at a plurality of pixel areas defined by intersections of the gate lines and the data lines. Further, the display panel can include an array substrate including a TFT which is an element for selectively applying a voltage to each of the pixels, an organic light emitting device layer on the array substrate, and an encapsulation substrate disposed at the array substrate to cover the organic light emitting device layer. The encapsulation substrate can protect the TFT and the organic light emitting device layer from an external impact and can prevent water or oxygen from penetrating into the organic light emitting device layer. Further, a layer provided on the array substrate can include an inorganic light emitting layer (for example, a nano-sized material layer, a quantum dot, or the like). As another embodiment of the present disclosure, the layer provided on the array substrate can include a micro light emitting diode.

The display panel can further include a backing such as a metal plate attached on the display panel. However, embodiments of the present disclosure are not limited to the metal plate, and the display panel can include another structure.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

In a case where a speaker is provided at a display apparatus so as to realize a sound in the display apparatus, the speaker can be implemented as a film-type, and thus, a thickness of the display apparatus can be thin. A film-type vibration apparatus can be manufactured to have a large area, and can be applied to a display apparatus having a large area. However, because the film-type vibration apparatus is low in a piezoelectric characteristic, it can be difficult to apply the film-type vibration apparatus to a display apparatus having a large area due to a low vibration. When ceramic is used for enhancing a piezoelectric characteristic, the film-type vibration apparatus can weak in durability, and a size of ceramic can be limited. When a vibration apparatus including a piezoelectric composite including piezoelectric ceramic is applied to a display apparatus, because the piezoelectric composite vibrates in a horizontal direction with respect to a left-right direction (for example, a horizontal direction with respect to a left-right direction of the display apparatus), it can unable to sufficiently vibrate the display apparatus in a vertical (or front-to-rear) direction. Thus, it can difficult to apply the vibration apparatus to the display apparatus, and it can unable to output a desired sound to a forward region in front of the display apparatus. In a case where a film-type piezoelectric element is applied to an apparatus, there can be a problem where a sound pressure level characteristic is lower than a speaker such as an actuator. In a case where a stack type piezoelectric element where a plurality of film-type piezoelectric elements are stacked as a plurality of layers is applied to an apparatus, power consumption can increase, and a thickness of the apparatus can be thickened. Further, when one vibration apparatus is disposed at a rear surface of a display panel (for example, a rear surface of a mobile apparatus), a mono sound can be output, but the inventors of the present disclosure have recognized a problem where it is difficult to output a sound including a stereo sound. Therefore, a vibration apparatus can be further disposed at a periphery of a display panel so as to implement the sound including the stereo sound, but the inventors of the present disclosure have recognized a problem where it is difficult to place an exciter in a flexible apparatus where a curved portion is provided, and when a speaker including a piezoelectric element, for example, a piezoelectric ceramic is provided, the piezoelectric ceramic is breakable.

Therefore, implemented is a vibration apparatus which can realize the sound characteristic including the stereo sound, can be applied to a flexible apparatus, and can vibrate in a vertical direction with respect to a widthwise direction of the display panel. The inventors of the present disclosure have invented an apparatus including a vibration apparatus having a new structure, which can realize the sound characteristic including the stereo sound and can be applied to an apparatus including a flexible apparatus. This will be described below in detail. All components of each apparatus according to all embodiments of the present disclosure are operatively coupled and configured.

Figure 2:
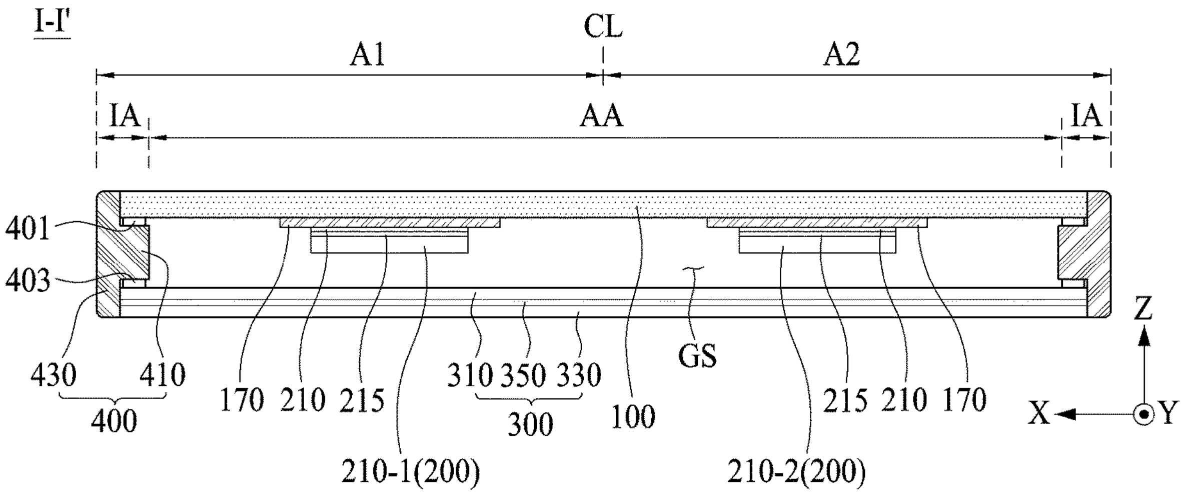
FIG. 2 is a cross-sectional view taken along line I-I' illustrated in FIG. 1.

FIG. 1 illustrates an apparatus according to an embodiment of the present disclosure, and FIG. 2 is a cross-sectional view taken along line I-I' illustrated in FIG. 1.

With reference to FIGS. 1 and 2, an apparatus according to an embodiment of the present disclosure can include a display panel 100 to display an image, and a vibration apparatus 200 disposed at a rear surface (or a backside surface) of the display panel 100.

The display panel 100 can display an electronic image or a digital image. For example, the display panel 100 can output light to display an image. The display panel 100 can be a curved display panel, or can be any type of display panel, such as a liquid crystal display panel, an organic light-emitting display panel, a quantum dot light-emitting display panel, a micro light-emitting diode display panel, and an electrophoresis display panel. The display panel 100 can be a flexible display panel. For example, the display panel 100 can a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto, and can be other types.

The display panel 100 according to an embodiment of the present disclosure can include a display area AA (or an active area) for displaying an image according to driving of the plurality of pixels. The display panel 100 can include a non-display area IA (or an inactive area) surrounding the display area AA, but embodiment of the present disclosure is not limited thereto.

The display panel 100 according to an embodiment of the present disclosure can be configured to display an image in a type such as a top emission type, a bottom emission type, a dual emission type, or the like according to a structure of the pixel array layer including an anode electrode, a cathode electrode, and a light emitting device. In the top emission type, an image can be displayed by outputting visible light generated from the pixel array layer to the forward region of a base substrate. In the bottom emission type, an image can be displayed by outputting visible light generated from the pixel array layer to the backward region of the base substrate.

The display panel 100 according to an embodiment of the present disclosure can include a pixel array part disposed in a pixel area configured by a plurality of gate lines and/or a plurality of data lines. The pixel array part can include a plurality of pixels which display an image based on a signal supplied through the signal lines. The signal lines can include a gate line, a data line, a pixel driving power line, and/or the like, but embodiments of the present disclosure are not limited thereto.

Each of the plurality of pixels can include a pixel circuit layer including a driving thin film transistor (TFT) provided at the pixel area, an anode electrode electrically connected to the driving TFT, a light emitting device formed over the anode electrode, and a cathode electrode electrically connected to the light emitting device.

The driving TFT can be configured at a transistor region of each pixel area provided at a substrate. The driving TFT can include a gate electrode, a gate insulation layer, a semiconductor layer, a source electrode, and a drain electrode. The semiconductor layer of the driving TFT can include silicon such as amorphous silicon (a-Si), polysilicon (poly-Si), or low temperature poly-Si or can include oxide such as indium-gallium-zinc-oxide (IGZO), but embodiments of the present disclosure are not limited thereto.

The anode electrode can be provided at an opening region provided at each pixel area and can be electrically connected to the driving TFT.

A light emitting device according to an embodiment can include a light emitting device layer formed over an anode electrode. The light emitting device layer can be implemented to emit light having the same color (for example, white light) for each pixel, or can be implemented to emit light having a different color (for example, red light, green light, or blue light) for each pixel. A cathode electrode (or a common electrode) can be connected to the light emitting device layer provided at each pixel area in common. For example, the light emitting device layer can have a stack structure including a single structure or two or more structures including the same color for each pixel. As another embodiment of the present disclosure, the light emitting device layer can have a stack structure including two or more structures including one or more different colors for each pixel. The two or more structures including the one or more different colors can be configured with one or more of blue, red, yellow-green, and green or a combination thereof, but embodiments of the present disclosure are not limited thereto. An example of the combination can include blue and red, red and yellow-green, red and green, red/yellow-green/green, or the like, but embodiments of the present disclosure are not limited thereto. Further, regardless of a stack order thereof, the present disclosure can be applied. The stack structure including two or more structures having the same color or one or more different colors can further include a charge generating layer between the two or more structures. The charge generating layer can have a PN junction structure and can include an N-type charge generating layer and a P-type charge generating layer.

The light emitting device according to another embodiment of the present disclosure can include a micro light emitting diode device electrically connected to each of an anode electrode and a cathode electrode. The micro light emitting diode device can be a light emitting diode implemented as an integrated circuit (IC) or chip type. The micro light emitting diode device can include a first terminal electrically connected to the anode electrode and a second terminal electrically connected to the cathode electrode. The cathode electrode can be connected to the second terminal of the micro light emitting diode device provided at each pixel area in common.

An encapsulation part can be formed on the substrate to surround the pixel array part, thereby preventing oxygen or water from penetrating into the light emitting device of the pixel array part. The encapsulation part according to an embodiment of the present disclosure can be formed in a multi-layer structure where an organic material layer and an inorganic material layer are alternately stacked, but embodiment of the present disclosure is not limited thereto. The inorganic material layer can prevent oxygen or water from penetrating into the light emitting device of the pixel array part. The organic material layer can be formed to have a thickness which is relatively thicker than the inorganic material layer, so as to cover particles occurring in a manufacturing process. For example, the encapsulation part can include a first inorganic layer, an organic layer over the first inorganic layer, and a second inorganic layer over the organic layer. The organic layer can be a particle cover layer, but embodiments of the present disclosure are not limited thereto. The touch panel can be disposed over the encapsulation part, or can be disposed at a rear surface of the pixel array part.

The display panel 100 according to an embodiment of the present disclosure can include a first substrate, a second substrate, and a liquid crystal layer. The first substrate can be an upper substrate or a thin film transistor (TFT) array substrate. For example, the first substrate can include a pixel array (or a display part or a display area) including a plurality of pixels which are respectively provided at a plurality of pixel areas defined by intersections between a plurality of gate lines and/or a plurality of data lines. Each of the plurality of pixels can include a TFT connected to a gate line and/or a data line, a pixel electrode connected to the TFT, and a common electrode which is provided adjacent to the pixel electrode and is supplied with a common voltage.

The first substrate can further include a pad part provided at a first periphery (or a first non-display part) and a gate driving circuit provided at a second periphery (or a second non-display part).

The pad part can supply a signal, supplied from the outside, to the pixel array and/or the gate driving circuit. For example, the pad part can include a plurality of data pads connected to a plurality of data lines through a plurality of data link lines and/or a plurality of gate input pads connected to the gate driving circuit through a gate control signal line. For example, a size of the first substrate can be greater than the second substrate, but embodiments of the present disclosure are not limited thereto.

The gate driving circuit according to an embodiment of the present disclosure can be embedded (or integrated) into a second periphery of the first substrate so as to be connected to the plurality of gate lines. For example, the gate driving circuit can be implemented with a shift register including a transistor, which is formed through the same process as the TFT provided at the pixel area. The gate driving circuit according to another embodiment of the present disclosure can be implemented as an integrated circuit (IC) and can be provided at a panel driving circuit without being embedded into the first substrate.

The second substrate can be a lower substrate or a color filter array substrate. For example, the second substrate can include a pixel including an opening area overlapping with the pixel area formed in the first substrate, and a color filter layer formed at the opening area. The second substrate can have a size which is smaller than the first substrate, but embodiments of the present disclosure are not limited thereto. For example, the second substrate can overlap a remaining portion, other than the first periphery, of the upper substrate. The second substrate can be attached to a remaining portion, other than the first periphery, of the first substrate with a liquid crystal layer therebetween using a sealant.

The liquid crystal layer can be disposed between the first substrate and the second substrate. The liquid crystal layer can include a liquid crystal including liquid crystal molecules where an alignment direction thereof is changed based on an electric field generated by the common voltage and a data voltage applied to a pixel electrode for each pixel.

A first polarization member can be attached at an upper surface of the first substrate and can polarize light which passes through the first substrate and is output to the outside. A second polarization member can be attached at a lower surface of the second substrate and can polarize light which is incident from the backlight and travels to the liquid crystal layer.

The display panel 110 according to an embodiment of the present disclosure can drive the liquid crystal layer based on an electric field which is generated in each pixel by the data voltage and the common voltage applied to each pixel, and thus, can display an image based on light passing through the liquid crystal layer.

In display panel 110 according to another embodiment of the present disclosure, the first substrate can be implemented as the color filter array substrate, and the second substrate can be implemented as the TFT array substrate. For example, the display panel 110 according to another embodiment of the present disclosure can have a type where an upper portion and a lower portion of the display panel 110 according to an embodiment of the present disclosure are reversed therebetween. In this case, a pad part of the display panel 110 according to another embodiment of the present disclosure can be covered by a separate mechanism or structure.

The display panel 100 according to another embodiment of the present disclosure can include a bending portion that can be bent or curved to have a curved shape or a certain curvature radius.

The bending portion of the display panel 100 can be in at least one of one periphery and the other periphery of the display panel 100, which are parallel to each other. The one periphery and/or the other periphery, where the bending portion is implemented, of the display panel 100 can include only the non-display area IA, or can include a periphery of the display area AA and the non-display area IA. The display panel 100 including the bending portion implemented by bending of the non-display area IA can have a one-side bezel bending structure or a both-side bezel bending structure. Moreover, the display panel 100 including the bending portion implemented by bending of the periphery of the display area AA and the non-display area IA can have a one-side active bending structure or a both-side active bending structure.

The vibration apparatus 200 can vibrate the display panel 100. For example, the vibration apparatus 200 can be implemented at the rear surface of the display panel 100 to directly vibrate the display panel 100. For example, the vibration apparatus 200 can vibrate the display panel 100 at the rear surface of the display panel 100, thereby providing a sound and/or a haptic feedback based on the vibration of the display panel 100 to a user (or a viewer).

According to an embodiment of the present disclosure, the vibration apparatus 200 can vibrate according to a voice signal synchronized with an image displayed by the display panel 100 to vibrate the display panel 100. As another embodiment of the present disclosure, the vibration apparatus 200 can vibrate according to a haptic feedback signal (or a tactile feedback signal) synchronized with a user touch applied to a touch panel (or a touch sensor layer) which is disposed at the display panel 100 or embedded into the display panel 100 and can vibrate the display panel 100. Accordingly, the display panel 100 can vibrate based on a vibration of the vibration apparatus 200 to provide a user (or a viewer) with at least one or more of a sound and a haptic feedback.

The vibration apparatus 200 according to an embodiment of the present disclosure can be implemented to have a size corresponding to the display area AA of the display panel 100. A size of the vibration apparatus 200 can be 0.9 to 1.1 times a size of the display area AA, but embodiments of the present disclosure are not limited thereto. For example, a size of the vibration apparatus 200 can be the same as or smaller than the size of the display area AA. For example, a size of the vibration apparatus 200 can be the same as or approximately same as the display area AA of the display panel 100, and thus, the vibration apparatus 200 can cover a most region of the display panel 100 and a vibration generated by the vibration apparatus 200 can vibrate a whole portion of the display panel 100, and thus, localization of a sound can be high, and satisfaction of a user can be improved. Further, a contact area (or panel coverage) between the display panel 100 and the vibration apparatus 200 can increase, and thus, a vibration region of the display panel 100 can increase, thereby improving a sound of a middle-low-pitched sound band generated based on a vibration of the display panel 100. Further, a vibration apparatus 200 applied to a large-sized display apparatus can vibrate the entire display panel 100 having a large size (or a large area), and thus, localization of a sound based on a vibration of the display panel 100 can be further enhanced, thereby realizing an improved sound effect. Therefore, the vibration apparatus 200 according to an embodiment of the present disclosure can be on the rear surface of the display panel 100 to sufficiently vibrate the display panel 100 in a vertical (or front-to-rear) direction, thereby outputting a desired sound to a forward region in front of the apparatus or the display apparatus.

The vibration apparatus 200 according to an embodiment of the present disclosure can be implemented as a film-type. Since the vibration apparatus 200 can be implemented as a film-type, it can have a thickness which is thinner than the display panel 100, and thus, a thickness of the display apparatus may not increase due to the arrangement of the vibration apparatus 200. For example, the vibration apparatus 200 can be referred to as a sound generating module, a sound generating device, a film actuator, a film-type piezoelectric composite actuator, a film speaker, a film-type piezoelectric speaker, a film-type piezoelectric composite speaker, or the like, which uses the display panel 100 as a vibration plate, but embodiments of the present disclosure are not limited thereto. As another embodiment of the present disclosure, the vibration apparatus 200 may not be disposed at the rear surface of the display panel 100 and can be applied to a non-display panel instead of the display panel. For example, the non-display panel can be one or more of wood, plastic, glass, cloth, paper, a vehicle interior material, a building indoor ceiling, an aircraft interior material, and the like, but embodiments of the present disclosure are not limited thereto. In this case, the non-display panel can be applied as a vibration plate, and the vibration apparatus 200 can vibrate the non-display panel to output a sound.

For example, the apparatus according to an embodiment of the present disclosure can include a vibration member (or a vibration object) and a vibration apparatus 200 disposed at the vibration member. For example, the vibration member can include a display panel including a plurality of pixels configured to display an image, or can include a non-display panel. For example, the vibration member can include a display panel including a pixel displaying an image, or can be include one or more of wood, plastic, glass, cloth, paper, a vehicle interior material, a vehicle glass window, a building indoor ceiling, a building glass window, a building interior material, an aircraft interior material, an aircraft glass window, or the like, but embodiments of the present disclosure are not limited thereto. For example, the non-display panel can be a light emitting diode lighting panel (or apparatus), an organic light emitting lighting panel (or apparatus), an inorganic light emitting lighting panel (or apparatus), or the like, but embodiments of the present disclosure are not limited thereto. For example, the vibration member can include a display panel including a pixel configured to display an image, or can include one or more of a light emitting diode lighting panel (or apparatus), an organic light emitting lighting panel (or apparatus), and an inorganic light emitting lighting panel (or apparatus), but embodiments of the present disclosure are not limited thereto. In this case, the vibration member (or the vibration object) can be applied as a vibration plate, the vibration apparatus 200 can output a sound to vibrate the vibration member (or the vibration object).

According to another embodiment of the present disclosure, the vibration member can include a plate, and the plate can include a metal material, or can include one or more a single nonmetal material or a composite nonmetal material of wood, plastic, glass, cloth, and leather. However, embodiments of the present disclosure are not limited thereto.

The vibration apparatus 200 according to another embodiment of the present disclosure can be disposed at the rear surface of the display panel 100 to overlap the display area of the display panel 100. For example, the vibration apparatus 200 can overlap half or more of the display area of the display panel 100. As another embodiment of the present disclosure, the vibration apparatus 200 can overlap the whole display area of the display panel 100.

The vibration apparatus 200 according to an embodiment of the present disclosure can vibrate by alternately and repeatedly contract and expand based on an inverse piezoelectric effect when an alternating current (AC) voltage is applied, thereby directly vibrating the display panel 100 through the vibration thereof. For example, the vibration apparatus 200 can vibrate according to a voice signal synchronized with an image displayed by the display panel 100 to vibrate the display panel 100. As another embodiment of the present disclosure, the vibration apparatus 200 can vibrate according to a haptic feedback signal (or a tactile feedback signal) synchronized with a user touch applied to a touch panel (or a touch sensor layer) which is disposed over the display panel 100 or embedded into the display panel 100 and can vibrate the display panel 100. Accordingly, the display panel 100 can vibrate based on a vibration of the vibration apparatus 200 to provide a user (or a viewer) with at least one or more of a sound and a haptic feedback.

Therefore, the apparatus according to an embodiment of the present disclosure can output a sound, generated by a vibration of the display panel 100 based on a vibration of the vibration apparatus 200, in a forward region in front of the display panel. And, in the apparatus according to an embodiment of the present disclosure, a most region of the display panel 100 can be vibrated by the vibration apparatus 200 having a film-type, thereby more enhancing a sense of sound localization and a sound pressure level characteristic of a sound based on the vibration of the display panel 100.

According to another embodiment of the present disclosure, a rear surface (or a back surface) of a display panel 100 can include a first region (or a first rear area) A1 and a second region (or a second rear area) A2. For example, in the rear surface of the display panel 100, the first region A1 can be a left rear region, and the second region A2 can be a right rear region. The first region A1 and the second region A2 can be a left-right symmetrical with respect to a center line CL of the display panel 100 in a first direction X, but embodiments of the present disclosure are not limited thereto. For example, each of the first region A1 and the second region A2 can overlap the display area of the display panel 100. In other embodiments, additional regions can be used, and the arrangement of the regions A1 and A2 need not be a left and right arrangement, but can be an upper and lower arrangement, all upper or all lower arrangement, or any other arrangement.

The vibration apparatus 200 according to an embodiment of the present disclosure can include a first vibration device 210-1 and a second vibration device 210-2 disposed at the rear surface of the display panel 100.

The first vibration device 210-1 can be disposed in the first region A1 of the display panel 100. For example, the first vibration device 210-1 can be disposed close to a center or a periphery within the first region A1 of the display panel 100 with respect to the first direction X. The first vibration device 210-1 according to an embodiment of the present disclosure can vibrate the first region A1 of the display panel 100, and thus, can generate a first vibration sound PVS1 or a first haptic feedback in the first region A1 of the display panel 100. For example, the first vibration device 210-1 according to an embodiment of the present disclosure can directly vibrate the first region A1 of the display panel 100, and thus, can generate the first vibration sound PVS1 or the first haptic feedback in the first region A1 of the display panel 100. For example, the first vibration sound PVS1 can be a left sound, e.g., sound from the left side of the display panel 100. A size of the first vibration device 210-1 according to an embodiment of the present disclosure can have a size corresponding to half or less of the first region A1 or half or more of the first region A1 based on a characteristic of the first vibration sound PVS1 or a sound characteristic needed for an apparatus. As another embodiment of the present disclosure, the size of the first vibration device 210-1 can have a size corresponding to the first region A1 of the display panel 100. For example, the size of the first vibration device 210-1 can have the same size as the first area A1 of the display panel 100 or can have a size smaller than the first area A1 of the display panel 100.

The second vibration device 210-2 can be disposed in the second region A2 of the display panel 100. For example, the second vibration device 210-2 can be disposed close to a center or a periphery within the second region A2 of the display panel 100 with respect to the first direction X. The second vibration device 210-2 according to an embodiment of the present disclosure can vibrate the second region A2 of the display panel 100, and thus, can generate a second vibration sound PVS2 or a second haptic feedback in the second region A2 of the display panel 100. For example, the second vibration device 210-2 according to an embodiment of the present disclosure can directly vibrate the second region A2 of the display panel 100, and thus, can generate the second vibration sound PVS2 or the second haptic feedback in the second region A2 of the display panel 100. For example, the second vibration sound PVS2 can be a right sound, e.g., sound from the right side of the display panel 100. A size of the second vibration device 210-2 according to an embodiment of the present disclosure can have a size corresponding to half or less of the second region A2 or half or more of the second region A2 based on a characteristic of the second vibration sound PVS2 or a sound characteristic needed for an apparatus. As another embodiment of the present disclosure, the size of the second vibration device 210-2 can have a size corresponding to the second region A2 of the display panel 100. For example, the size of the second vibration device 210-2 can have the same size as the second area A2 of the display panel 100 or can have a size smaller than the second area A2 of the display panel 100. Therefore, the first vibration device 210-1 and the second vibration device 210-2 can have the same size or different sizes to each other based on a sound characteristic of left and right sounds and/or a sound characteristic of the apparatus. And, the first vibration device 210-1 and the second vibration device 210-2 can be disposed in a left-right symmetrical structure or a left-right asymmetrical structure with respect to the center line CL of the display panel 100.

Each of the first and second vibration devices 210-1 and 210-2 can include a piezoelectric structure (or a vibration portion or a piezoelectric vibration portion) including piezoelectric ceramic having a piezoelectric characteristic, but embodiments of the present disclosure are not limited thereto. For example, each of the first and second vibration devices 210-1 and 210-2 according to an embodiment of the present disclosure can include piezoelectric ceramic having a perovskite crystalline structure, and thus, can vibrate (or mechanical displacement) in response to an electrical signal applied from the outside. For example, when a vibration driving signal (or a voice signal) is applied, each of the plurality of vibration generators 230 and 270 can alternately and repeatedly contract and expand based on an inverse piezoelectric effect of the piezoelectric structure (or the vibration portion or the piezoelectric vibration portion), and thus, can be displaced (or vibrated or driven) in the same direction based on a bending phenomenon where a bending direction is alternately changed, thereby increasing or maximizing a displacement amount (or a bending force or a flexural force) or an amplitude displacement of the vibration apparatus 200 or/and the display panel 100.

The vibration apparatus 200 according to an embodiment of the present disclosure can further include an adhesive member 210. For example, the adhesive member 210 can be disposed between the display panel 100 and the vibration apparatus 200. For example, the adhesive member 210 can be disposed between each of the first and second vibration devices 210-1 and 210-2 and the display panel 100. The adhesive member 210 will be described below with reference to FIGS. 3A to 11. Meanwhile, other components may not be shown expressly.

The adhesive member 210 can be disposed between each of the first and second vibration devices 210-1 and 210-2 and the display panel 100, and thus, can connect or couple the vibration apparatus 200 to the rear surface of the display panel 100. For example, the vibration apparatus 200 can be connected or coupled to the rear surface of the display panel 100 by the adhesive member 210, and thus, can be supported by or disposed at the rear surface of the display panel 100.

The adhesive member 210 according to another example of the present disclosure can further include a hollow portion provided between the display panel 100 and the vibration apparatus 200. The hollow portion of the adhesive member 210 can provide an air gap between the display panel 100 and the vibration apparatus 200. Due to the air gap, a sound wave (or a sound pressure) based on a vibration of the vibration apparatus 200 may not be dispersed by the adhesive member 210, and can concentrate on the display panel 100. Thus, the loss of a vibration caused by the adhesive member 210 can be minimized, thereby increasing a sound pressure level characteristic of a sound generated based on a vibration of the display panel 100.

The apparatus according to an embodiment of the present disclosure can further include a plate 170 disposed between the display panel 100 and the vibration apparatus 200.

The plate 170 can be disposed between each of the first vibration device 210-1 and the second vibration device 210-2 of the vibration apparatus 200 and the rear surface of the display panel 100.

The plate 170 can dissipate heat generated from the display panel 100 or can reinforce a mass of the vibration apparatus 200 which is disposed at or hung from the rear surface of the display panel 100. The plate 170 can have the same shape and size as the rear surface of the display panel 100, or can have the same shape and size as the vibration apparatus 200. As another embodiment of the present disclosure, the plate 170 can have a size different from the display panel 100. For example, the plate 170 can be smaller than the size of the display panel 100. As another embodiment of the present disclosure, the plate 170 can have a size different from the vibration apparatus 200. For example, the plate 170 can be greater or smaller than the size of the vibration apparatus 200. The vibration apparatus 200 can be the same as or smaller than the size of the display panel 100.

The plate 170 according to an embodiment of the present disclosure can include a metal material. For example, the plate 170 can include one or more materials of stainless steel, aluminum (Al), a magnesium (Mg), a magnesium (Mg) alloy, a magnesium-lithium (Mg—Li) alloy, and an Al alloy, but embodiments of the present disclosure are not limited thereto.

The plate 170 according to an embodiment of the present disclosure can include a plurality of opening portions. The plurality of opening portions can be configured to have a predetermined size and a predetermined interval. For example, the plurality of opening portions can be provided along a first direction X and a second direction Y so as to have a predetermined size and a predetermined interval. Due to the plurality of opening portions, a sound wave (or a sound pressure) based on a vibration of the vibration apparatus 200 may not be dispersed by the plate 170, and can concentrate on the display panel 100. Thus, the loss of a vibration caused by the plate 170 can be minimized, thereby increasing a sound pressure level characteristic of a sound generated based on a vibration of the display panel 100. For example, the plate 170 including the plurality of openings can have a mesh shape. For example, the plate 170 including the plurality of openings can be a mesh plate.

According to some embodiments of the present disclosure, the plate 170 can be connected or coupled to the rear surface of the display panel 100. The plate 170 can dissipate heat occurring in the display panel 100. For example, the plate 170 can be referred to as a heat dissipation member, a heat dissipation plate, or a heat sink, but embodiments of the present disclosure are not limited thereto.

According to an embodiment of the present disclosure, the plate 170 can reinforce a mass of the vibration apparatus 200 which is disposed at or hung from the rear surface of the display panel 100. Thus, the plate 170 can decrease a resonance frequency of the vibration apparatus 200 based on an increase in mass of the vibration apparatus 200. Therefore, the plate 170 can increase a sound characteristic and a sound pressure level characteristic of the low-pitched sound band generated based on a vibration of the vibration apparatus 200 and can enhance the flatness of a sound pressure level characteristic. For example, the flatness of a sound pressure level characteristic can be a magnitude of a deviation between a highest sound pressure level and a lowest sound pressure level. For example, the plate 170 can be referred to as a weight member, a mass member, a sound planarization member, or the like, but embodiments of the present disclosure are not limited thereto.

According to an embodiment of the present disclosure, a displacement amount (or a bending force or a flexural force) or an amplitude displacement (or a vibration width) of the display panel 100 with the plate 170 disposed therein can decrease as a thickness of the plate 170 increases, based on the stiffness of the plate 170. Accordingly, a sound pressure level characteristic and a low-pitched sound band characteristic of a sound generated based on a displacement (or a vibration) of the display panel 100 can be reduced.

The apparatus according to an embodiment of the present disclosure can further include a supporting member 300 disposed at a rear surface of the display panel 100.

The supporting member 300 can cover a rear surface of the display panel 100. For example, the supporting member 300 can cover a whole rear surface of the display panel 100 with a gap space GS therebetween. For example, the supporting member 300 can include at least one or more of a glass material, a metal material, and a plastic material. For example, the supporting member 300 can be a rear surface structure or a set structure. For example, the supporting member 300 can be referred to as a cover bottom, a plate bottom, a back cover, a base frame, a metal frame, a metal chassis, a chassis base, or m-chassis, or the like. For example, the supporting member 300 can be implemented as an arbitrary type frame or a plate-shaped structure disposed at a rear surface of the display panel 100.

A periphery or a sharp corner of the supporting member 300 can have an inclined shape or a curved shape through a chamfer process or a corner rounding process. For example, the supporting member 300 of the glass material can be sapphire glass. As another embodiment of the present disclosure, the supporting member 300 of the metal material can include any one or more of aluminum (Al), an Al alloy, a magnesium (Mg), a Mg alloy, and an iron (Fe)-nickel (Ni) alloy.

The supporting member 300 can be spaced apart from a rearmost surface of the display panel 100 or the vibration apparatus 200 with a gap space GS therebetween. For example, the gap space GS can be referred to as an air gap, a vibration space, a sound resonance box, or the like, but embodiments of the present disclosure are not limited thereto.

The supporting member 300 according to an embodiment of the present disclosure can include a first supporting member 310 and a second supporting member 330.

The first supporting member 310 can be disposed between a rear surface of the display panel 100 and the second supporting member 330. For example, the first supporting member 310 can be disposed between a rear periphery portion of the display panel 100 and a front periphery portion of the second supporting member 330. The first supporting member 310 can support one or more of a periphery portion of the display panel 100 and the periphery portion of the second supporting member 330. As another embodiment of the present disclosure, the first supporting member 310 can cover the rear surface of the display panel 100. For example, the first supporting member 310 can cover the whole rear surface of the display panel 100. For example, the first supporting member 310 can be a member which covers a whole rear surface of the display panel 100. For example, the first supporting member 310 can include at least one or more materials of a glass material, a metal material, and a plastic material. For example, the first supporting member 310 can be an inner plate, but embodiments of the present disclosure are not limited thereto. For example, the first support member 310 can be omitted.

The first supporting member 310 can be spaced apart from a rearmost surface of the display panel 100 or the vibration apparatus 200 with a gap space GS therebetween.

The second supporting member 330 can be disposed at a rear surface of the first supporting member 310. The second supporting member 330 can be a member which covers the whole rear surface of the display panel 100. For example, the second supporting member 330 can include at least one or more of a glass material, a metal material, and a plastic material. For example, the second supporting member 330 can be an outer plate, a rear plate, a back plate, a back cover, or a rear cover, but embodiments of the present disclosure are not limited thereto.

The supporting member 300 according to an embodiment of the present disclosure can further include a coupling member 350.

The coupling member 350 can be disposed between the first supporting member 310 and the second supporting member 330. For example, the first supporting member 310 and the second supporting member 330 can be coupled or connected to each other by the coupling member 350. For example, the coupling member 350 can be an adhesive resin, a double-sided tape, or a double-sided adhesive foam pad, but embodiments of the present disclosure are not limited thereto. For example, the coupling member 350 can have elasticity for absorbing an impact, but embodiments of the present disclosure are not limited thereto. For example, the coupling member 350 can be disposed at a whole region between the first supporting member 310 and the second supporting member 330. As another embodiment of the present disclosure, the coupling member 350 can be provided at a mesh structure including an air gap between the first supporting member 310 and the second supporting member 330.

The apparatus according to an embodiment of the present disclosure can further include a middle frame 400. The middle frame 400 can be disposed between a rear periphery of the display panel 100 and a front periphery of the supporting member 300. The middle frame 400 can support one or more of the rear periphery of the display panel 100 and the front periphery of the supporting member 300. The middle frame 400 can surround one or more of side surfaces of each of the display panel 100 and the supporting member 300. The middle frame 400 can provide a gap space GS between the display panel 100 and the supporting member 300. The middle frame 400 can be referred to as a connection member, a frame, a frame member, an intermediate member, a side cover member, a middle cabinet, a middle cover, a middle chassis, or the like, but embodiments of the present disclosure are not limited thereto.

The middle frame 400 according to an embodiment of the present disclosure can include a first supporting portion 410 and a second supporting portion 430. For example, the first supporting portion 410 can be a supporting portion, but embodiments of the present disclosure are not limited thereto. For example, the second supporting portion 430 can be a sidewall portion, but embodiments of the present disclosure are not limited thereto.

The first supporting portion 410 can be disposed between the rear periphery of the display panel 100 and the front periphery of the supporting member 300, and thus, can provide a gap space GS between the display panel 100 and the supporting member 300. A front surface of the first supporting portion 410 can be coupled or connected to the rear periphery of the display panel 100 by a first coupling member 401. A rear surface of the first supporting portion 410 can be coupled or connected to the front periphery of the supporting member 300 by a second coupling member 403. For example, the first supporting portion 710 can have a single picture frame structure having a square shape or a frame structure having a plurality of divided bar shapes, but embodiments of the present disclosure are not limited thereto.

The second supporting portion 430 can be disposed in parallel with a thickness direction Z of the apparatus. For example, the second supporting portion 430 can be vertically coupled to an outer surface of the first supporting portion 410 in parallel with a thickness direction Z of the apparatus. The second supporting portion 430 can surround one or more of an outer surface of the display panel 100 and an outer surface of the supporting member 300, thereby protecting the outer surface of each of the display panel 100 and the supporting member 300. The first supporting portion 410 can protrude from an inner surface of the second supporting portion 430 toward the gap space GS between the display panel 100 and the support member 300.

The apparatus according to an embodiment of the present disclosure can include a panel connection member instead of the middle frame 400.

The panel connection member can be disposed between the rear periphery of the display panel 100 and the front periphery of the supporting member 300 and can provide the gap space GS between the display panel 100 and the supporting member 300. The panel connection member can be disposed between the rear periphery of the display panel 100 and the front periphery of the supporting member 300 to adhere the display panel 100 and the support member 300. For example, the panel connection member can be a double-sided tape, a single-sided tape, or a double-sided adhesive foam pad, but embodiments of the present disclosure are not limited thereto. For example, an adhesive layer of the panel connection member can include epoxy, acrylic, silicone, or urethane, but embodiments of the present disclosure are not limited thereto. For example, in order to minimize the vibration of the display panel 100 from being transmitted to the support member 300, an adhesive layer of the panel connection member can include a urethane-based material which relatively has a ductile characteristic compared to acrylic of acrylic and urethane. Accordingly, a vibration of the display panel 100 transmitted to the support member 300 can be minimized.

In the apparatus according to an embodiment of the present disclosure, when the apparatus includes a panel connection member instead of a middle frame 400, the supporting member 300 can include a bending sidewall which is bent from an end (or an end portion) of the second supporting member 330 and surrounds one or more of an outer surface (or an outer sidewall) of each of the first supporting member 310, the panel connection member, and the display panel 100. The bending sidewall according to an embodiment of the present disclosure can have a single sidewall structure or a hemming structure. The hemming structure can be a structure where end portions of an arbitrary member are bent in a curve shape and overlap each other or are apart from each other in parallel. For example, in order to enhance a sense of beauty in design, the bending sidewall can include a first bending sidewall, bent from one side of the second supporting member 330, and a second bending sidewall bent from the first bending sidewall to a region between the first bending sidewall and an outer surface of the display panel 100. The second bending sidewall can be apart from an inner surface of the first bending sidewall. Therefore, the second bending sidewall can prevent the outer surface of the display panel 100 from contacting an inner surface of the first bending sidewall or can prevent a lateral-direction external impact from being transferred to the outer surface of the display panel 100.

According to another embodiment of the present disclosure, the middle frame 400 can be omitted. The apparatus according to another embodiment of the present disclosure can include the panel connection member or adhesive member instead of the middle frame 400. The apparatus according to another embodiment of the present disclosure can include a partition instead of the middle frame 400.

Figure 3A:
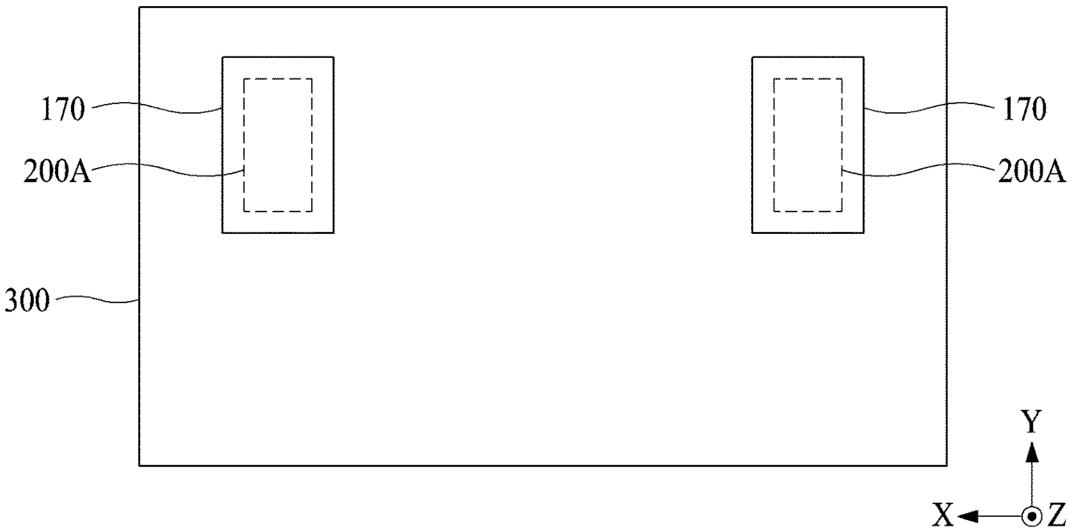
FIGS. 3A and 3B illustrate an apparatus according to an embodiment of the present disclosure.
Figure 3B:
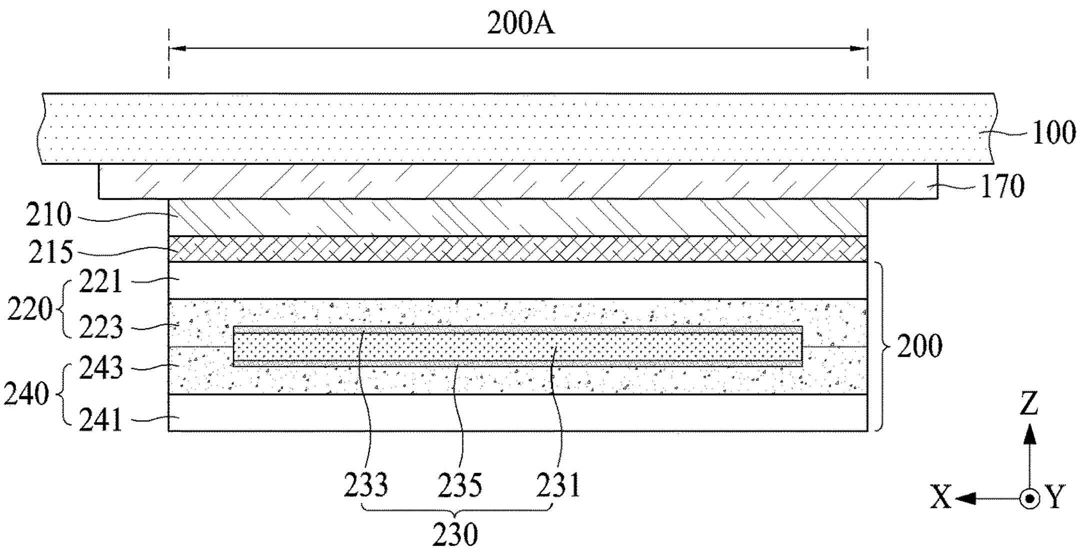

FIGS. 3A and 3B illustrate an apparatus according to an embodiment of the present disclosure. FIG. 3A illustrates a rear surface of the apparatus.

With reference to FIGS. 3A and 3B, the apparatus according to an embodiment of the present disclosure can include a vibration apparatus 200 and an adhesive member 210. The vibration apparatus 200 can include a vibration generator 230.

The vibration generator 230 according to an embodiment of the present disclosure can include a vibration portion 231, a first electrode layer 233, and a second electrode layer 235.

The vibration portion 231 can include a piezoelectric material, a composite piezoelectric material, or an electroactive material, and the piezoelectric material, the composite piezoelectric material and the electroactive material can have a piezoelectric effect. The vibration portion 231 can be referred to as a vibration layer, a vibration material layer, a piezoelectric composite layer, an electroactive layer, a piezoelectric material portion, a piezoelectric composite layer, an electroactive portion, a piezoelectric structure, a piezoelectric composite, or a piezoelectric ceramic composite, or the like, but embodiments of the present disclosure are not limited thereto.

The vibration portion 231 can be formed of a transparent, semitransparent, or opaque piezoelectric material, and the vibration portion 231 can be transparent, semitransparent, or opaque.

The first electrode layer 233 can be disposed at a first surface (or an upper surface) of the vibration portion 231 and can be electrically connected to the first surface of the vibration portion 231. For example, the first electrode layer 233 can have a single-body electrode type (or a common electrode type) which is disposed at a whole first surface of the vibration portion 231. The first electrode layer 233 according an embodiment of the present disclosure can include a transparent conductive material, a semitransparent (or translucent) conductive material, or an opaque conductive material. For example, examples of the transparent conductive material or the semitransparent conductive material can include indium tin oxide (ITO) or indium zinc oxide (IZO), but embodiments of the present disclosure are not limited thereto. The opaque conductive material can include aluminum (Al), copper (Cu), gold (Au), silver (Ag), molybdenum (Mo), magnesium (Mg), or the like, and an alloy of any thereof, but embodiments of the present disclosure are not limited thereto.

The second electrode layer 235 can be disposed at a second surface (or a rear surface) opposite to the first surface of the vibration portion 231, and can be electrically connected to the second surface of the vibration portion 231. For example, the second electrode layer 235 can have a single-body electrode type (or a common electrode type) which is disposed at a whole second surface of the vibration portion 231. The second electrode layer 235 according to an embodiment of the present disclosure can include a transparent conductive material, a semitransparent conductive material, or an opaque conductive material. For example, the second electrode layer 235 can include the same material as the first electrode layer 233, but embodiments of the present disclosure are not limited thereto. As another embodiment of the present disclosure, the second electrode layer 235 can include a material different from the first electrode layer 233.

The vibration portion 231 can be polarized (or polling) by a certain voltage applied to the first electrode layer 233 and the second electrode layer 235 in a certain temperature atmosphere, or in a temperature atmosphere that can be changed from a high temperature to a room temperature, but embodiments of the present disclosure are not limited thereto.

The apparatus according to an embodiment of the present disclosure can further include a first protection member 220 and a second protection member 240.

The first protection member 220 can be disposed over a first surface of the vibration generator 230. For example, the first protection member 220 can cover the first electrode layer 233 disposed over the first surface of the vibration generator 230. The first protection member 220 can be disposed over the first electrode layer 233. For example, the first electrode layer 233 can be disposed between the vibration portion 231 and the first protection member 220. The first protection member 220 can protect the first electrode layer 233. Accordingly, the first protection member 220 can protect the first surface of the vibration generator 230 or the first electrode layer 233.

The second protection member 240 can be disposed over a second surface of the vibration generator 230. For example, the second protection member 240 can cover the second electrode layer 235 disposed over the second surface of the vibration generator 230. The second protection member 240 can be disposed over the second electrode layer 235. For example, the second electrode layer 235 can be disposed between the vibration portion 231 and the second protection member 240. The second protection member 240 can protect the second electrode layer 235. Accordingly, the second protection member 240 can protect the second surface of the vibration generator 230 or the second electrode layer 235.

According to an embodiment of the present disclosure, each of the first protection member 220 and the second protection member 240 can be formed of a plastic material or a fiber material, but embodiments of the present disclosure are not limited thereto. For example, the first protection member 220 can be formed of the same or different material as the second protection member 240. One or more of the first protection member 220 and the second protection member 240 can be connected or coupled to a rear surface of the display panel 100 by the adhesive member 210. For example, the first protection member 220 of the first vibration generator 230 can be connected or coupled to the rear surface of the display panel 100 by the adhesive member 210.

The first protection member 220 can include a base member 221 and an adhesive layer 223. For example, the adhesive layer 223 can be disposed at a first surface of the base member 221. The adhesive layer 223 can be formed to be adjacent to the vibration generator 230 rather than the base member 221. For example, the adhesive layer 223 can contact the vibration portion 231. For example, the adhesive layer 223 of the first protection member 220 can be between the first electrode layer 233 of the vibration generator 230 and the base member 221 of the first protection member 220.

The second protection member 240 can include a base member 241 and an adhesive layer 243. For example, the adhesive layer 243 can be disposed at a first surface of the base member 241. The adhesive layer 243 can be formed to be adjacent to the vibration generator 230 rather than the base member 241. For example, the adhesive layer 243 can contact the vibration portion 231. For example, the adhesive layer 243 of the second protection member 240 can be between the second electrode layer 235 of the vibration generator 230 and the base member 241 of the second protection member 240.

For example, the base members 221 and 241 of each of the first protection member 220 and the second protection member 240 can be a polyimide (PI) film or a polyethylene terephthalate (PET) film, but embodiments of the present disclosure are not limited thereto.

Each of the adhesive layer 223 and 243 of each of the first protection member 220 and the second protection member 240 can include an epoxy resin, an acrylic resin, a silicone resin, or a urethane resin, but embodiments of the present disclosure are not limited thereto.

The adhesive layers 223 of the first protection member 220 and the adhesive layers 243 of the second protection member 240 can be connected or coupled to each other between the first protection member 220 and the second protection member 240. For example, the adhesive layers 223 of the first protection member 220 and the adhesive layers 243 of the second protection member 240 can be connected or coupled to each other in a periphery portion between the first protection member 220 and the second protection member 240. Therefore, the vibration portion 231 of the vibration generator 230 can be surrounded by the adhesive layers 223 of the first protection member 220 and the adhesive layers 243 of the second protection member 240. For example, the adhesive layers 223 of the first protection member 220 and the adhesive layers 243 of the second protection member 240 can entirely surround the whole the vibration portion 231 of the vibration generator 230. For example, the adhesive layers 223 of the first protection member 220 and the adhesive layers 243 of the second protection member 240 can be referred to as a cover member, but embodiments of the present disclosure are not limited thereto. When the adhesive layers 223 of the first protection member 220 and the adhesive layers 243 of the second protection member 240 is a cover member, the first protection member 220 can be disposed at a first surface of the cover member, and the second protection member 240 can be disposed at a second surface of the cover member.

The apparatus according to an embodiment of the present disclosure can include an adhesive member 210. The adhesive member 210 can include an adhesive layer. The adhesive layer can be low in modulus, and due to this, can have a problem of absorbing a vibration of the vibration generator 230. Therefore, when a curing rate of the adhesive member 210 increases for enhancing a modulus, there can be a problem where an adhesive force is reduced. When epoxy having a relatively high modulus is applied to the adhesive member 210, one-liquid type or film type epoxy can need a curing temperature of 100° C. or more or ultraviolet (UV) irradiation, and due to this, can have a problem where it is difficult to be applied to the apparatus. Further, a curing temperature can be lowered by performing two-liquid type treatment or primer treatment on epoxy, but when such a process is applied, there can be a problem where the cost increases. As another embodiment of the present disclosure, a curing temperature can be lowered by processing epoxy, requiring high temperature curing, as epoxy, but when such a process is applied, there can be a problem where the cost increases. For example, the adhesive member 210 can have a low modulus of about MPa, and due to this, there can be a problem where it is difficult to transfer a vibration of the vibration generator 230, having a modulus of GPa or more, to the display panel 100.

Therefore, the inventors of the present disclosure have invented a vibration apparatus in which a modulus is enhanced, and an adhesive member capable of being cured at a low temperature is implemented, thereby enhancing a vibration of the vibration apparatus. This will be described below in detail.

With reference to FIGS. 3A and 3B, the vibration apparatus 200 according to the embodiment of the present disclosure can include a vibration portion 211, a first protection member 220, and a second protection member 240. For example, the first protection member 220 can be disposed at a first surface of the vibration portion 211. For example, the second protection member 240 can be disposed at a different surface from the first surface of the vibration portion 211. The apparatus according to the embodiment of the present disclosure can include an adhesive member 210. The adhesive member 210 can be disposed between the vibration apparatus 200 and the display panel 100 (or the vibration member).

With reference to FIG. 3A, the plate 170 can be disposed at an arrangement area 200A of the vibration apparatus at a rear surface of the display panel 100. The vibration apparatus 200 can be disposed at the arrangement area 200A of the vibration apparatus. For example, a size of the plate 170 can be the same as or greater than a size of the arrangement area 200A of the vibration apparatus. For example, the size of the plate 170 can be the same as or greater than a size of the vibration apparatus 200. The plate 170 can be configured with one or more of a single nonmetal material and a composite nonmetal material. For example, the single nonmetal material or the composite nonmetal material can be one or more of wood, plastic, glass, cloth, paper, and leather, but embodiments of the present disclosure are not limited thereto. For example, the plate 170 can be configured with a material that does not have a metal oxide surface. Meanwhile, although an outline of the arrangement area 200A and the plate 170 are shown as being rectangular by example, the shapes thereof need not be limited. Variations of the shape of the arrangement area 200A and the plate 170 can be used, and the shapes of the arrangement area 200A and the plate 170 can be independent of each other, and can have either the same shape or a different shape. Further, when multiple vibration apparatus 200 are used, the various vibration apparatus 200 can have different shapes, and such shapes can be based on desire for higher sonic output, sharper or higher fidelity sound or arrangement for three dimensional sound or other acoustic characteristics.

The apparatus according to the embodiment of the present disclosure can further include a connection member 215. For example, the adhesive member 210 can be disposed over the connection member 215. For example, the connection member 215 can be metal oxide particles or precursors which are capable of vulcanization.

The connection member 215 according to an embodiment of the present disclosure can react with the adhesive member 210, and as the connection member 215 and the adhesive member 210 are cured, the vibration apparatus 200 can be attached at a rear surface of the display panel 100. For example, the connection member 215 can react with the adhesive member 210 based on a mechanism such as a vulcanization reaction and can be cured by applying heat at a temperature of 80° C. or more. For example, a curing temperature can be a temperature of 80° C. or more to 100° C. or less. The vulcanization reaction can be a chemical reaction which adds sulfur (S) or other additives to a polymer such as rubber to enhance durability. For example, a cross-linking reaction of the adhesive member 210 can be induced by the connection member 215. Therefore, as the adhesive member 210 is cross-linked, tacky characteristic can be removed, decreased or lost and one or more of a modulus, a tension, and hardness can increase. Further, a resistance to a high-temperature and high-humidity environment can increase.

The adhesive layer of the adhesive member 210 can include epoxy, rubber, silicone, or urethane, but embodiments of the present disclosure are not limited thereto. For example, the connection member 215 can be a cross-linking agent, and can include metal oxide. For example, the metal oxide can be oxide such as copper, iron, silver, zinc, or magnesium or the like, but embodiments of the present disclosure are not limited thereto. For example, the metal oxide can be copper oxide (CuO or $Cu_2O$), iron oxide ($Fe_2O_3$ or $Fe_3O_4$), silver oxide ($Ag_2O$), zinc oxide (ZnO), or magnesium oxide (MgO), or the like, but embodiments of the present disclosure are not limited thereto. The connection member 215 and the adhesive member 210 can be cured based on a reaction between the connection member 215 and the adhesive member 210. For example, the connection member 215 and the adhesive member 210 can be cured by a film laminating process or a panel aging process, thereby solving a problem caused by high temperature curing.

According to an embodiment of the present disclosure, the connection member 215 can be formed by performing a sputtering process on metal oxide, attaching sheet-type metal oxide, or coating an oxide solution. As another embodiment of the present disclosure, when the connection member 215 is not metal oxide, a metal layer can be formed by a sputtering process, and after a sheet-type metal layer is attached and a solution is coated thereon, the connection member 215 can be formed by oxidizing the metal layer. As another embodiment of the present disclosure, when the connection member 215 is not metal oxide, a metal layer can be formed by a sputtering process, a sheet-type metal layer can be attached thereon, and the connection member 215 can be formed by natural oxidization.

The connection member 215 can be disposed over the first protection member 220. For example, the connection member 215 can be disposed between the first protection member 220 and the adhesive member 210. For example, the connection member 215 can be disposed between the base member 221 of the first protection member 220 and the adhesive member 210. For example, the adhesive member 210 can be disposed between the plate 170 and the vibration apparatus 200. For example, the connection member 215 can be disposed between the adhesive member 210 and the vibration apparatus 200. As another embodiment of the present disclosure, the connection member 215 can be disposed between the plate 170 and the vibration apparatus 200. For example, the adhesive member 210 can be disposed between the connection member 215 and the vibration apparatus 200. As another embodiment of the present disclosure, the adhesive member 210 and the connection member 215 can be configured to be compatible (or exchanged) with each other. The vibration apparatus 200 can be connected or attached to the rear surface of the display panel 100 by the adhesive member 210 and the connection member 215. Accordingly, after the adhesive member 210 and the connection member 215 can be formed, the vibration apparatus 200 can be attached to the arrangement area 200A of the vibration apparatus in the rear surface of the display panel 100.

According to an embodiment of the present disclosure, a vibration surface can be between the display panel 100 and the plate 170. For example, the whole plate 170 or the whole display panel 100 can vibrate based on a vibration transferred from the vibration apparatus 200, and thus, the vibration surface can be transferred to the whole display panel 100 or the whole plate 170. For example, a contact surface can be between the plate 170 and the adhesive member 210. An area of the contact surface can be greater than or equal to the vibration surface. An adhesive force can be enhanced by the connection member 215, and a vibration characteristic of transferring a vibration of the vibration apparatus 200 to the display panel 100 or a vibration member can be enhanced.

According to an embodiment of the present disclosure, a vibration apparatus for vibrating a display panel or a vibration member can be provided, and thus, a sound can be generated so that a sound of an apparatus travels in a direction toward a front surface of the display panel or the vibration member (or vibration object).

According to an embodiment of the present disclosure, the vibration apparatus 200 can be disposed by using the adhesive member 210 where a modulus and/or an adhesive force are/is enhanced based on a configuration of the connection member 215, and thus, a vibration characteristic of transferring a vibration from the vibration apparatus 200 to the vibration surface can be enhanced, thereby enhancing a sound pressure level characteristic and/or a sound characteristic. For example, by using the adhesive member 210 and the connection member 215, the vibration apparatus 200 can be attached or disposed at the plate 170 which is the arrangement area 200A of the vibration apparatus of the rear surface of the display panel 100.

Therefore, in the apparatus according to an embodiment of the present disclosure, the adhesive member 210 where a modulus and/or an adhesive force are/is enhanced based on a configuration of the connection member 215 can be provided, and thus, a vibration characteristic of transferring a vibration from the vibration apparatus 200 to the vibration surface can be enhanced, thereby providing an apparatus including the vibration apparatus 200 where a sound pressure level characteristic and/or a sound characteristic are/is enhanced. Further, according to an embodiment of the present disclosure, by using the adhesive member 210 where a modulus and/or an adhesive force are/is enhanced by the connection member 215, the vibration apparatus 200 can be disposed at the arrangement area 200A of the vibration apparatus, thereby providing the vibration apparatus 200 where a sound pressure level characteristic and/or a sound characteristic are/is enhanced.

Figure 4A:
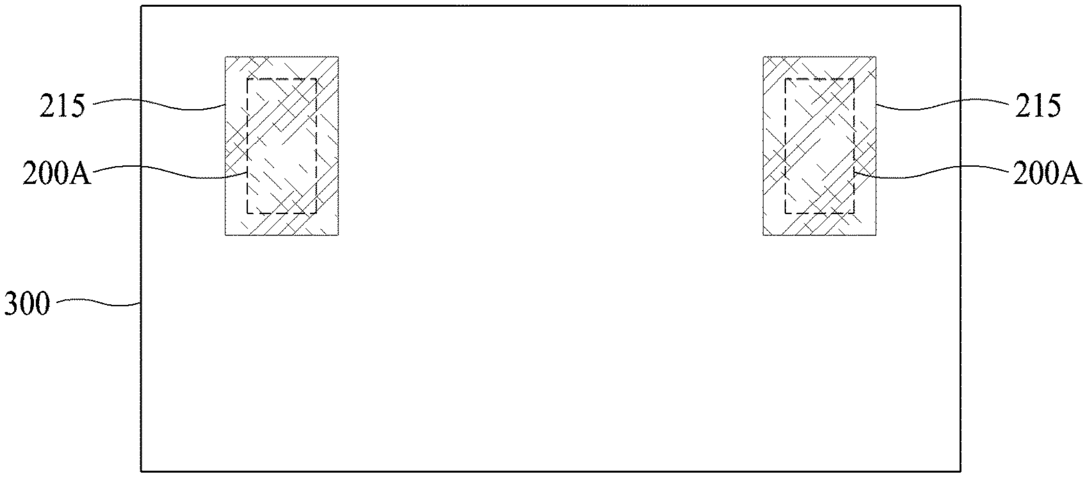
FIGS. 4A and 4B illustrate an apparatus according to another embodiment of the present disclosure.
Figure 4B:
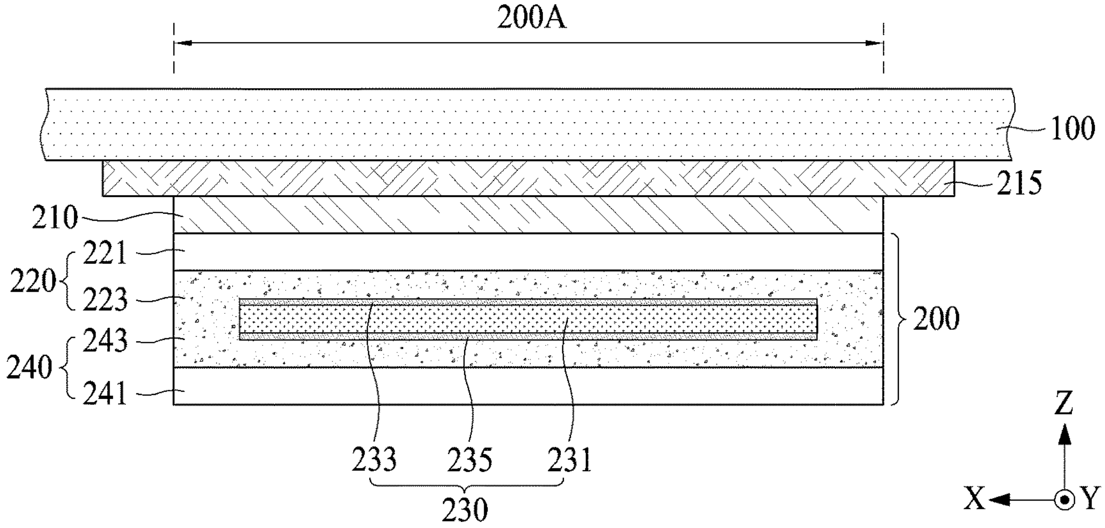

FIGS. 4A and 4B illustrate an apparatus according to another embodiment of the present disclosure. FIG. 4A illustrates a rear surface of the apparatus.

With reference to FIGS. 4A and 4B, the apparatus according to an embodiment of the present disclosure can include a vibration apparatus 200 and an adhesive member 210. The vibration apparatus 200 can include a vibration generator 230.

The vibration generator 230 according to an embodiment of the present disclosure can include a vibration portion 231, a first electrode layer 233, and a second electrode layer 235. A description of the vibration generator 230 can be the same as descriptions given above with reference to FIGS. 3A and 3B, and thus, their repetitive descriptions can be omitted.

With reference to FIG. 4A, the vibration apparatus 200 can be disposed at an arrangement area 200A of a vibration apparatus of a rear surface of the display panel 100. For example, when the display panel 100 is an electroluminescent display panel (or a light emitting display panel), the arrangement area 200A of the vibration apparatus can be an encapsulation portion. For example, the arrangement area 200A of the vibration apparatus can include a plate. For example, the plate can include a metal material. For example, the metal material can include one or more materials of stainless steel, aluminum (Al), a magnesium (Mg), a magnesium (Mg) alloy, a Mg—Li alloy, an Al alloy, electrolytic galvanized iron (EGI), and an iron-nickel (Fe—Ni) alloy (for example, invar), but embodiments of the present disclosure are not limited thereto. Because the arrangement area 200A of the vibration apparatus includes a metal material, a connection member 215 can include oxide capable of reacting with a metal material. For example, the connection member 215 can include metal oxide oxidized from the plate 170. The metal oxide can be formed by performing surface treatment such as coating performed on the metal oxide, or can be formed by natural oxidization such as metal coating. For example, the connection member 215 can be between the plate 170 and the adhesive member 210.

According to an embodiment of the present disclosure, the connection member 215 can be between the display panel 100 or a vibration member and the adhesive member 210. For example, the adhesive member 210 can be between the connection member 215 and the vibration apparatus 200.

According to an embodiment of the present disclosure, the connection member 215 can be formed by performing a sputtering process on metal oxide, attaching sheet-type metal oxide, or coating an oxide solution. As another embodiment of the present disclosure, example, when the plate is not a metal material, a metal layer can be formed by a sputtering process, and after a sheet-type metal layer is attached and a solution is coated thereon, the connection member 215 can be formed by oxidizing the metal layer. As another embodiment of the present disclosure, example, when the plate is not a metal material, a metal layer can be formed by a sputtering process, a sheet-type metal layer can be attached thereon, and the connection member 215 can be formed by natural oxidization.

With reference to FIGS. 4A and 4B, the connection member 215 can be formed at the arrangement area 200A of the vibration apparatus, and the vibration apparatus 200 can be disposed at the arrangement area 200A of the vibration apparatus. The connection member 215 can react with the adhesive member 210 and can be cured by heat. For example, the adhesive member 210 and the connection member 215 can be cured in a state where the vibration apparatus 200 is attached thereon, and thus, the performance of the vibration apparatus 200 can be enhanced without a reduction in an adhesive force.

According to an embodiment of the present disclosure, a vibration surface can be between the display panel 100 and the plate 170. For example, the whole plate 170 or the whole display panel 100 can vibrate based on a vibration transferred from the vibration apparatus 200, and thus, the vibration surface can be transferred to the whole display panel 100 or the whole plate 170. For example, a contact surface can be between the adhesive member 210 and the connection member 215. An area of the contact surface can be greater than or equal to that of the vibration surface. An adhesive force can be enhanced by the connection member 215, and a vibration characteristic of transferring a vibration of the vibration apparatus 200 to the display panel 100 or a vibration member can be enhanced.

According to an embodiment of the present disclosure, when the arrangement area 200A of the vibration apparatus includes a metal material, the arrangement area 200A of the vibration apparatus can include the connection member 215 which is metal oxide, and by attaching the vibration apparatus 200, the vibration apparatus can be attached thereon without a reduction in an adhesive force, thereby decreasing a reduction in sound pressure level characteristic and/or sound characteristic of the vibration apparatus 200 caused by a reduction in an adhesive force.

Figure 5:
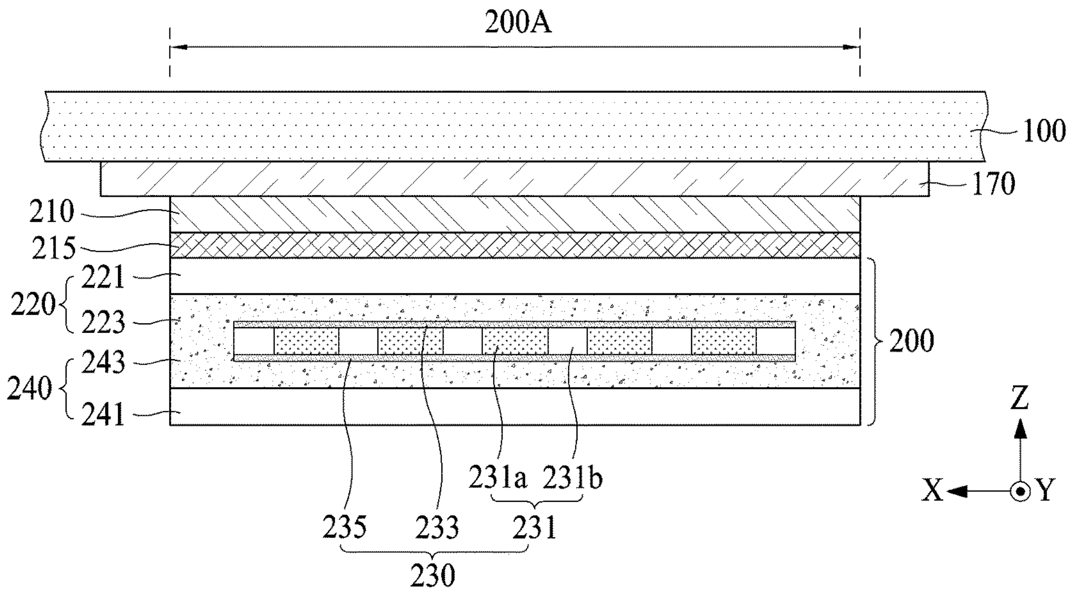
FIG. 5 illustrates an apparatus according to another embodiment of the present disclosure.
Figure 6:
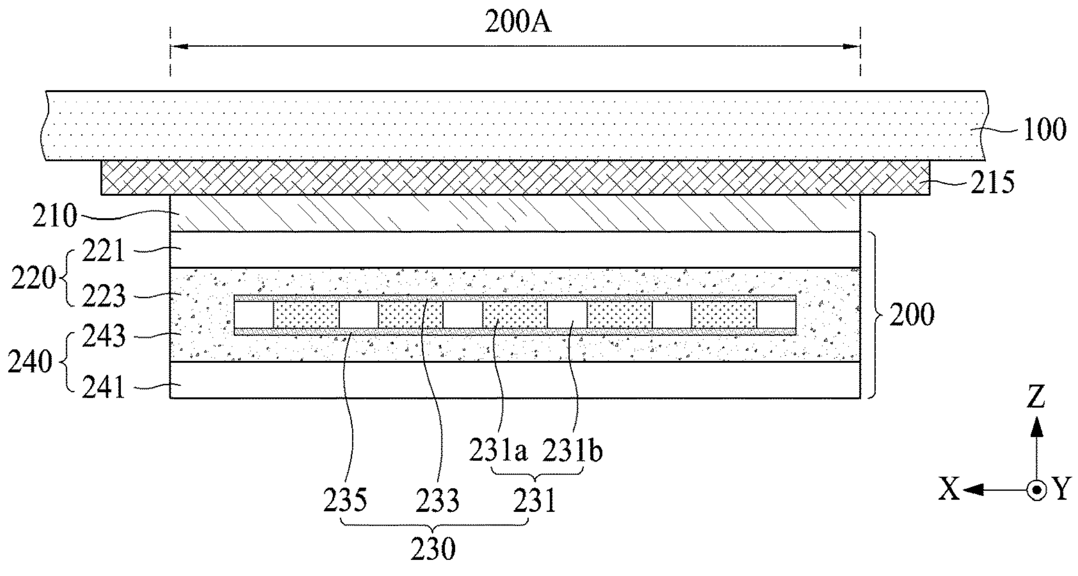
FIG. 6 illustrates an apparatus according to another embodiment of the present disclosure.

FIG. 5 illustrates an apparatus according to another embodiment of the present disclosure. FIG. 6 illustrates an apparatus according to another embodiment of the present disclosure.

With reference to FIGS. 5 and 6, the apparatus according to an embodiment of the present disclosure can include a vibration apparatus 200 and an adhesive member 210. The vibration apparatus 200 can include a vibration generator 230.

The vibration generator 230 according to an embodiment of the present disclosure can include a vibration portion 231, a first electrode layer 233, and a second electrode layer 235. A description of the vibration generator 230 can be the same as descriptions given above with reference to FIGS. 3A to 4B, and thus, their repetitive descriptions can be omitted.

With reference to FIG. 5, the apparatus according to an embodiment of the present disclosure can further include an adhesive member 210 and a connection member 215. For example, the adhesive member 210 can be disposed between the display panel 100 (or the vibration member) and the vibration apparatus 200. For example, the connection member 215 can be disposed between the adhesive member 210 and the vibration apparatus 200. A description of the adhesive member 210 and the connection member 215 can be the same as descriptions given above with reference to FIGS. 3A and 3B, and thus, their repetitive descriptions can be omitted.

The apparatus according to an embodiment of the present disclosure can further include a plate 170. The adhesive member 210 can be between the plate 170 and the connection member 215. For example, the connection member 215 can be disposed between the adhesive member 210 and the vibration apparatus 200. As another embodiment of the present disclosure, the connection member 215 can be disposed between the plate 170 and the vibration apparatus 200. For example, the adhesive member 210 can be disposed between the connection member 215 and the vibration apparatus 200. As another embodiment of the present disclosure, the adhesive member 210 and the connection member 215 can be configured to be compatible (or exchanged) with each other. For example, the plate 170 can be configured with one or more of a single nonmetal material and a composite nonmetal material. For example, the single nonmetal material or the composite nonmetal material can be one or more of wood, plastic, glass, cloth, paper, and leather, but embodiments of the present disclosure are not limited thereto.

With reference to FIG. 6, the apparatus according to an embodiment of the present disclosure can further include a plate. For example, the plate can include a metal material. The connection member 215 can include a metal oxide oxidized from the plate. The metal oxide can be formed by a surface treatment process such as coating of a metal oxide, or the like, or can be formed by a natural oxidation such as a metal coating, or the like. For example, the connection member 215 can be between the plate and the adhesive member 210. For example, the connection member 215 can be between the vibration member (or the display panel 100) and the adhesive member 210. For example, the adhesive member 210 can be between the vibration apparatus 200 and the connection member 215. A description of the adhesive member 210 and the connection member 215 can be the same as descriptions given above with reference to FIGS. 4A and 4B, and thus, their repetitive descriptions can be omitted.

The vibration portion 231 according to an embodiment of the present disclosure can include a plurality of first portions 231*a* and a plurality of second portions 231*b*. For example, the plurality of first portions 231*a* and the plurality of second portions 231*b* can be alternately and repeatedly arranged in a first direction X (or a second direction Y). For example, the first direction X can be a widthwise direction of the vibration portion 231, the second direction Y can be a lengthwise direction of the vibration portion 231 crossing the first direction X, but embodiments of the present disclosure are not limited thereto. For example, the first direction X can be the lengthwise direction of the vibration portion 231, and the second direction Y can be the widthwise direction of the vibration portion 231.

Each of the plurality of first portions 231*a* can be configured with an inorganic material portion. The inorganic material portion can include the piezoelectric material described above. For example, the first portions 231*a* can include a ceramic-based material for generating a relatively high vibration, or can include a piezoelectric ceramic having a perovskite-based crystalline structure. The perovskite crystalline structure can have a piezoelectric effect and an inverse piezoelectric effect, and can be a plate-shaped structure having orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A", and "B" can be cations, and "O" can be anions. For example, the first portions 231*a* can include one of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

The first portions 231*a* according to an embodiment of the present disclosure can include one or more materials of lead (Pb), zirconium (Zr), titanium (Ti), zinc (Zn), nickel (Ni), and niobium (Nb), but embodiments of the present disclosure are not limited thereto.

According to another embodiment of the present disclosure, the first portions 231*a* can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. Further, the first portions 231*a* can include at least one or more of calcium titanate ($CaTiO_3$), $BaTiO_3$, and $SrTiO_3$, each without Pb, but embodiments of the present disclosure are not limited thereto.

According to another embodiment of the present disclosure, the first portions 231*a* can have a piezoelectric deformation coefficient "$d_{33}$" of 1,000 pC/N or more in a thickness direction Z. By having a high piezoelectric deformation coefficient "$d_{33}$", it is possible to provide the vibration apparatus 200 that can be applied to a display panel having a large size or can have a sufficient vibration characteristic or piezoelectric characteristic. For example, the first portions 231*a* can include a PZT-based material ($PbZrTiO_3$) as a main component and can include a softener dopant material doped into A site (Pb) and a relaxor ferroelectric material doped into B site (ZrTi).

The softener dopant material can enhance a piezoelectric characteristic and a dielectric characteristic of the first portions 231*a*, and for example, can increase the piezoelectric deformation coefficient "$d_{33}$" of the first portions 231*a*. When the softener dopant material includes a dyad element "+1", the piezoelectric characteristic and the dielectric characteristic of the first portions 231*a* can be reduced. For example, when the softener dopant material includes Kalium (K) and rubidium (Rb), the piezoelectric characteristic and the dielectric characteristic of the first portions 231*a* can be reduced. The softener dopant material according to an embodiment of the present disclosure can include a dyad element "+2" to a triad element "+3". Morphotropic phase boundary (MPB) can be implemented by adding the softener dopant material to the PZT-based material ($PbZrTiO_3$), and thus, a piezoelectric characteristic and a dielectric characteristic can be enhanced. For example, the softener dopant material can include strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) can substitute a portion of lead (Pb) in the PZT-based material ($PbZrTiO_3$), and a substitution rate thereof can be about 2 mol % to about 20 mol %. For example, when the substitution rate is smaller than 2 mol % or greater than 20 mol %, a perovskite crystal structure can be broken, and thus, an electromechanical coupling coefficient "kP" and the piezoelectric deformation coefficient "$d_{33}$" can decrease. When the softener dopant material is substituted, the MPB can be formed, and a piezoelectric characteristic and a dielectric characteristic can be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) can enhance an electric deformation characteristic of the first portions 231*a*. The relaxor ferroelectric material according to an embodiment of the present disclosure can include a lead magnesium niobate (PMN)-based material or a lead nickel niobate (PNN)-based material, but embodiments of the present disclosure are not limited thereto. The PMN-based material can include Pb, Mg, and Nb, and for example, can include $Pb(Mg, Nb)O_3$. The PNN-based material can include Pb, Ni, and Nb, and for example, can include $Pb(Ni, Nb)O_3$. For example, the relaxor ferroelectric material doped into the PZT-based material ($PbZrTiO_3$) can substitute a portion of each of zirconium (Zr) and titanium (Ti) in the PZT-based material ($PbZrTiO_3$), and a substitution rate thereof can be about 5 mol % to about 25 mol %. For example, when the substitution rate is smaller than 5 mol % or greater than 25 mol %, a perovskite crystal structure can be broken, and thus, the electromechanical coupling coefficient "kP" and the piezoelectric deformation coefficient "$d_{33}$" can decrease.

According to an embodiment of the present disclosure, the first portions 231*a* can further include a donor material doped into B site (ZrTi) of the PZT-based material ($PbZrTiO_3$), in order to more enhance a piezoelectric coefficient. For example, the donor material doped into the B site (ZrTi) can include a tetrad element "+4" or a hexad element "+6". For example, the donor material doped into the B site (ZrTi) can include tellurium (Te), germanium (Ge), uranium (U), bismuth (Bi), niobium (Nb), tantalum (Ta), antimony (Sb), or tungsten (W).

The first portions 231*a* according to an embodiment of the present disclosure can have a piezoelectric deformation coefficient "$d_{33}$" of 1,000 pC/N or more in a thickness direction Z, thereby implementing a vibration apparatus having an enhanced vibration characteristic. For example, a vibration apparatus having an enhanced vibration characteristic can be implemented in a large-area apparatus or a large-area vibration object (or a large-area vibration member).

FIGS. 7A to 7F illustrate a vibration apparatus according to an embodiment of the present disclosure.

Figure 7A:
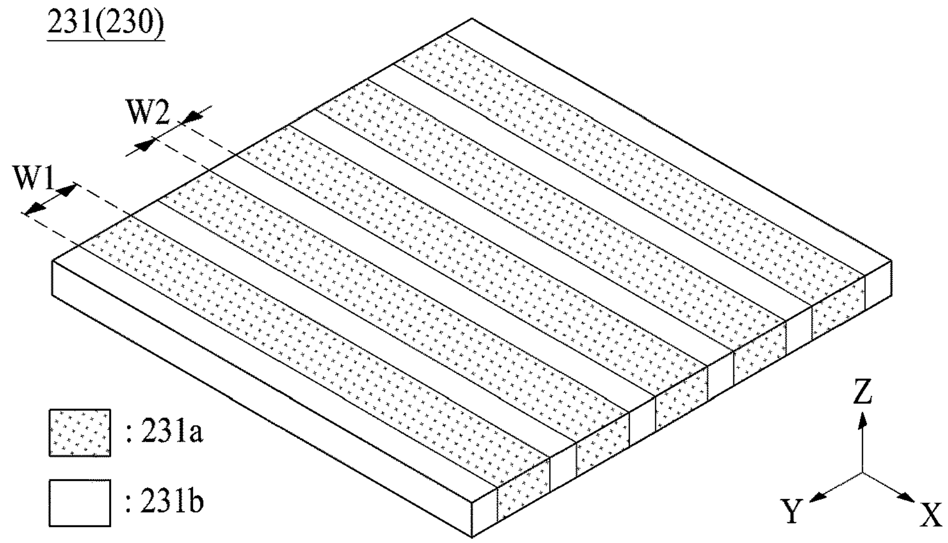
FIGS. 7A to 7F illustrate a vibration apparatus according to an embodiment of the present disclosure.

With reference to FIGS. 5, 6, and 7A, the vibration generator 230 according to an embodiment of the present disclosure can include a vibration portion 231. For example, the vibration generator 230 according to an embodiment of the present disclosure can include a first portion 231*a* and a second portion 231*b*. For example, the first portion 231*a* can include an inorganic material, and the second portion 231*b* can include an organic material. For example, the first portion 231*a* can have a piezoelectric characteristic, and the second portion 211*b* can have a ductile characteristic or flexibility. For example, the inorganic material of the first portion 231*a* can have piezoelectric characteristic, and the organic material of the second portion 231*b* can have a ductile characteristic or flexibility. The vibration portion 231 can include a plurality of first portions 231*a* and a plurality of second portions 231*b*. For example, the plurality of first portions 231*a* and the plurality of second portions 231*b* can be alternately and repeatedly arranged along a second direction Y. Each of the plurality of first portions 231*a* can be disposed between two adjacent second portions 231*b* of the plurality of second portions 231*b*. For example, each of the plurality of first portions 231*a* can have a first width W1 parallel to the second direction Y and a length parallel to a first direction X. Each of the plurality of second portions 231*b* can be disposed in parallel to the second direction Y. For example, each of the plurality of second portions 231*b* can have a second width W2 and a length parallel to the first direction X. Each of the plurality of second portions 231*b* can have the same size, for example, the same width, area, or volume. For example, each of the plurality of second portions 231*b* can have the same size (for example, the same width, area, or volume) within a process error range (or an allowable error) occurring in a manufacturing process. The first width W1 can be the same as or different from the second width W2. For example, the first width W1 can be greater than the second width W2. For example, the first portion 231*a* and the second portion 231*b* can include a line shape or a stripe shape which has the same size or different sizes. Therefore, the vibration portion 231 illustrated in FIG. 7A can include a 2-2 composite structure and thus can have a resonance frequency of 20 kHz or less, but embodiments of the present disclosure are not limited thereto and a resonance frequency of the vibration portion 231 can vary based on at least one or more of a shape, a length, and a thickness of the vibration portion.

Figure 7B:
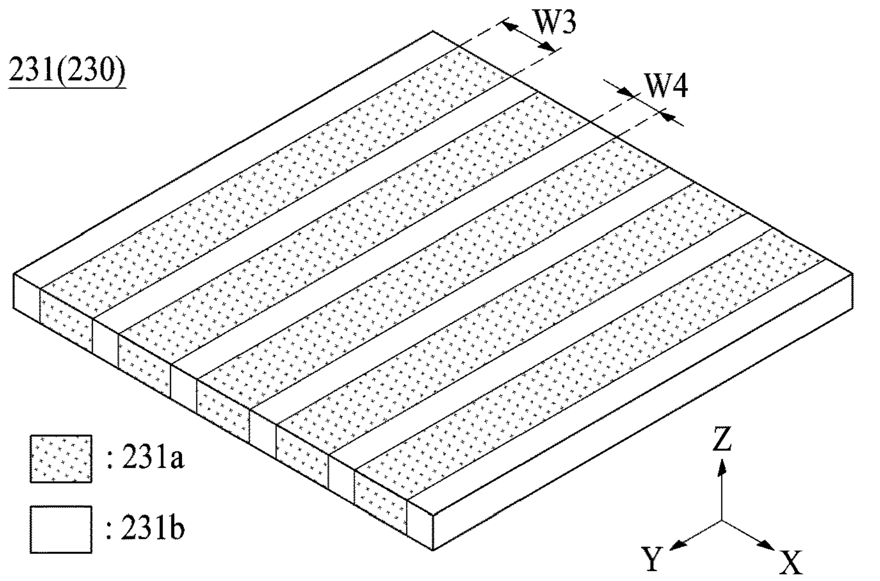

With reference to FIGS. 5, 6, and 7B, the vibration generator 230 according to another embodiment of the present disclosure can include a plurality of first portions 231*a* and a plurality of second portions 231*b*, which are alternately and repeatedly arranged in a first direction X. Each of the plurality of first portions 231*a* can be disposed between two adjacent second portions 231*b* of the plurality of second portions 231*b*. For example, each of the plurality of first portions 231*a* can have a third width W3 parallel to the first direction X and a length parallel to a second direction Y. Each of the plurality of second portions 231*b* can have a fourth width W4 parallel to the first direction X and can have a length parallel to the second direction Y. The third width W3 can be the same as or different from the fourth width W4. For example, the third width W3 can be greater than the fourth width W4. For example, the first portion 231*a* and the second portion 231*b* can include a line shape or a stripe shape which has the same size or different sizes. Therefore, the vibration portion 231 illustrated in FIG. 7B can include a 2-2 composite structure and thus can have a resonance frequency of 20 kHz or less, but embodiments of the present disclosure are not limited thereto and a resonance frequency of the vibration portion 231 can vary based on at least one or more of a shape, a length, and a thickness of the vibration portion.

In the vibration portion 231 illustrated in each of FIGS. 7A and 7B, each of the plurality of first portions 231*a* and each of the plurality of second portions 231*b* can be disposed (or arranged) in parallel on the same plane (or the same layer). Each of the plurality of second portions 231*b* can be configured to fill a gap between two adjacent first portions 231*a*. Each of the plurality of second portions 231*b* can be connected to or attached at an adjacent first portion 231*a*. Accordingly, the vibration portion 231 can be enlarged to have a desired size or length based on side coupling (or side connection) between the first portion 231*a* and the second portion 231*b*.

In the vibration portion (or vibration layer) 231 illustrated in each of FIGS. 7A and 7B, a width (or a size) W2 and W4 of each of the plurality of second portions 231*b* can progressively decrease in a direction from a center portion to both peripheries (or both sides or both ends) of the vibration portion 231 or the vibration apparatus 200.

According to another embodiment of the present disclosure, a second portion 231*b*, having a largest width (W2, W4) of the plurality of second portions 231*b*, can be located at a portion on which a highest stress can concentrate when the vibration portion 231 or the vibration apparatus 200 is vibrating in a vertical (or upper and lower) direction Z (or a thickness direction). A second portion 231*b*, having a smallest width (W2, W4) of the plurality of second portions 231*b*, can be located at a portion where a relatively low stress can occur when the vibration portion 231 or the vibration apparatus 200 is vibrating in the vertical direction Z. For example, the second portion 231*b*, having the largest width (W2, W4) of the plurality of second portions 231*b*, can be disposed at the center portion of the vibration portion 231, and the second portion 231*b*, having the smallest width (W2, W4) of the plurality of second portions 231*b* can be disposed at each of the both peripheries of the vibration portion 231. Therefore, when the vibration portion 231 or the vibration apparatus 200 is vibrating in the vertical direction Z, interference of a sound wave or overlapping of a resonance frequency, each occurring in the portion on which the highest stress concentrates, can be reduced or minimized. Thus, dipping phenomenon of a sound pressure level occurring in the low-pitched sound band can be reduced, thereby improving flatness of a sound characteristic in the low-pitched sound band. For example, flatness of a sound characteristic can be a level of a deviation between a highest sound pressure and a lowest sound pressure.

In the vibration portion 231 illustrated in each of FIGS. 7A and 7B, each of the plurality of first portions 231*a* can have different sizes (or widths). For example, a size (or a width) of each of the plurality of first portions 231*a* can progressively decrease or increase in a direction from the center portion to the both peripheries (or both sides or both ends) of the vibration portion 231 or the vibration apparatus 200. For example, in the vibration portion 231, a sound pressure level characteristic of a sound can be enhanced and a sound reproduction band can increase, based on various natural vibration frequencies according to a vibration of each of the plurality of first portions 231*a* having different sizes.

Figure 7C:
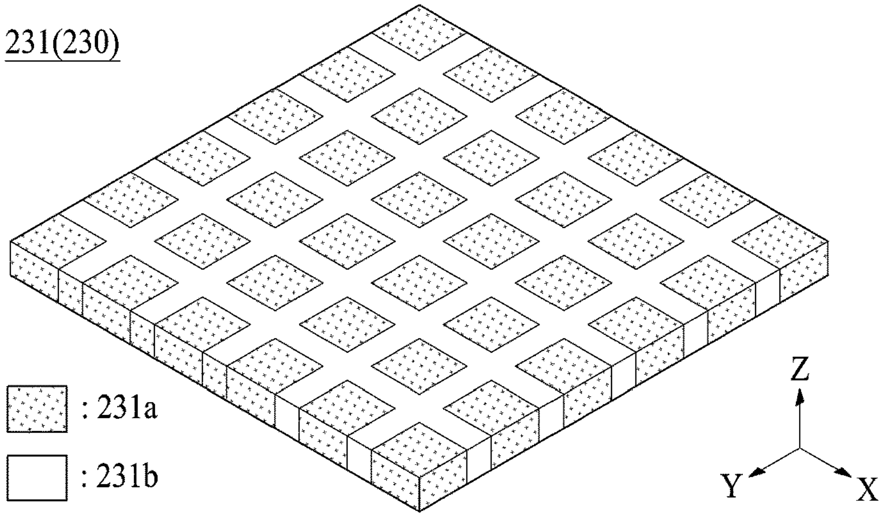

With reference to FIGS. 5, 6, and 7C, the vibration generator 230 according to another embodiment of the present disclosure can include a plurality of first portions 231*a*, which are spaced apart from one another in a first direction X and a second direction Y, and a second portion 231*b* disposed between the plurality of first portions 231*a*. The plurality of first portions 231*a* can be disposed to be spaced apart from one another in the first direction X and the second direction Y. For example, each of the plurality of first portions 231*a* can have a hexahedral shape (or a six-sided object shape) having the same size and can be disposed in a lattice shape. The second portion 231*b* can be disposed between the plurality of first portions 231*a* in each of the first direction X and the second direction Y. The second portion 231*b* can be configured to fill a gap or a space between two adjacent first portions 231*a* or to surround each of the plurality of first portions 231*a*. Thus, the second portion 231*b* can be connected to or attached to an adjacent first portion 231*a*. For example, a width of a second portion 231*b* disposed between two first portions 231*a* adjacent to each other in the first direction X can be the same as or different from the first portion 231*a*, and a width of a second portion 231*b* disposed between two first portions 231*a* adjacent to each other in the second direction Y can be the same as or different from the first portion 231*a*. Therefore, the vibration portion 231 illustrated in FIG. 7C can have a resonance frequency of 30 MHz or less according to a 1-3 composite structure, but embodiments of the present disclosure are not limited thereto and a resonance frequency of the vibration portion 231 can vary based on at least one or more of a shape, a length, and a thickness of the vibration portion.

Figure 7D:
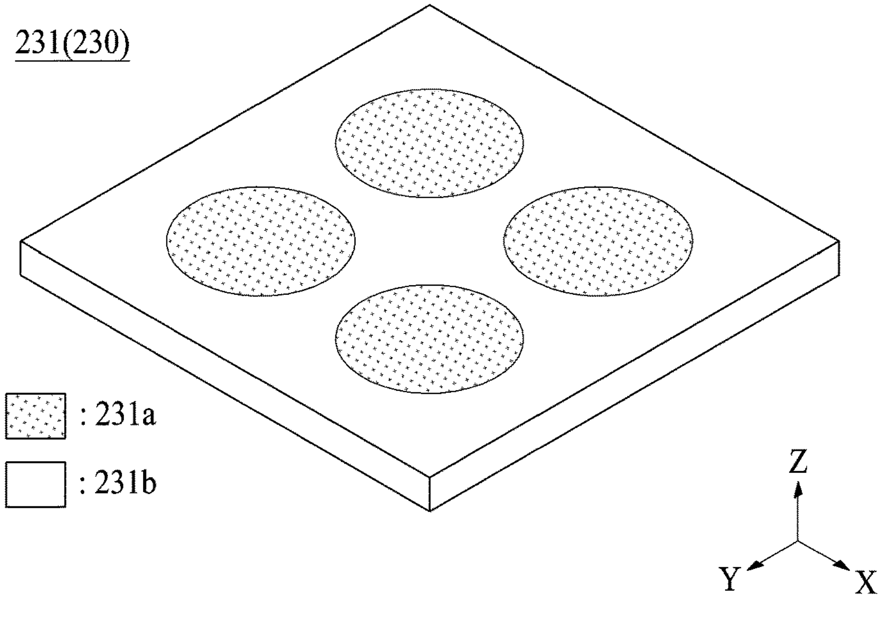

With reference to FIGS. 5, 6, and 7D, the vibration generator 230 according to another embodiment of the present disclosure can include a plurality of first portions 231*a*, which are spaced apart from one another in a first direction X and a second direction Y, and a second portion 231*b* which surrounds each of the plurality of first portions 231*a*. Each of the plurality of first portions 231*a* can have a flat structure of a circular shape. For example, each of the plurality of first portions 231*a* can have a circular shape, but embodiments of the present disclosure are not limited thereto and can have a dot shape including an oval shape, a polygonal shape, or a donut shape. The second portion 231*b* can be configured to surround each of the plurality of first portions 231*a*. Thus, the second portion 231*b* can be connected to or attached on a side surface of each of the plurality of first portions 231*a*. The plurality of first portions 231*a* and the second portion 231*b* can be disposed (or arranged) in parallel on the same plane (or the same layer). Therefore, the vibration portion 231 illustrated in FIG. 7D can include a 1-3 composite structure and can be implemented as a circular vibration source (or vibrator), and thus, can be enhanced in vibration characteristic or sound output characteristic and can have a resonance frequency of 30 MHz or less, but embodiments of the present disclosure are not limited thereto and a resonance frequency of the vibration portion 231 can vary based on at least one or more of a shape, a length, and a thickness of the vibration portion.

Figure 7E:
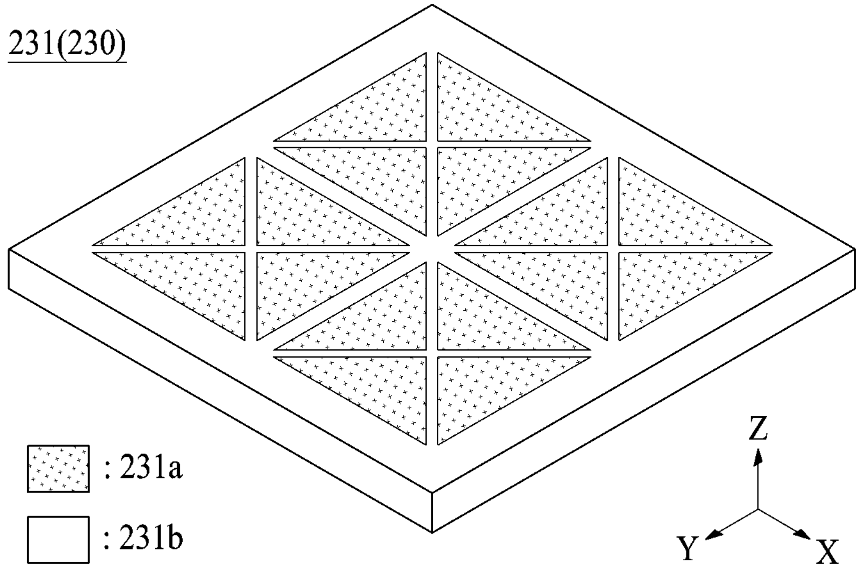

With reference to FIGS. 5, 6, and 7E, the vibration generator 230 according to another embodiment of the present disclosure can include a plurality of first portions 231*a*, which are spaced apart from one another in a first direction X and a second direction Y, and a second portion 231*b* which surrounds each of the plurality of first portions 231*a*. Each of the plurality of first portions 231*a* can have a flat structure of a triangular shape. For example, each of the plurality of first portions 231*a* can have a triangular plate shape.

According to another embodiment of the present disclosure, four adjacent first portions 231*a* of the plurality of first portions 231*a* can be adjacent to one another to form a tetragonal or quadrilateral shape (or a square shape). Vertices of the four adjacent first portions 231*a* forming a tetragonal shape can be adjacent to one another in a center portion (or a central portion) of the tetragonal shape. The second portion 231*b* can be configured to surround each of the plurality of first portions 231*a*. Thus, the second portion 231*b* can be connected to or attached to a side surface (or a lateral surface) of each of the plurality of first portions 231*a*. The plurality of first portions 231*a* and the second portion 231*b* can be disposed (or arranged) in parallel on the same plane (or the same layer). Therefore, the vibration portion 231 illustrated in FIG. 7E can have a resonance frequency of 30 MHz or less according to a 1-3 composite structure, but embodiments of the present disclosure are not limited thereto and a resonance frequency of the vibration portion 231 can vary based on at least one or more of a shape, a length, and a thickness of the vibration portion.

Figure 7F:
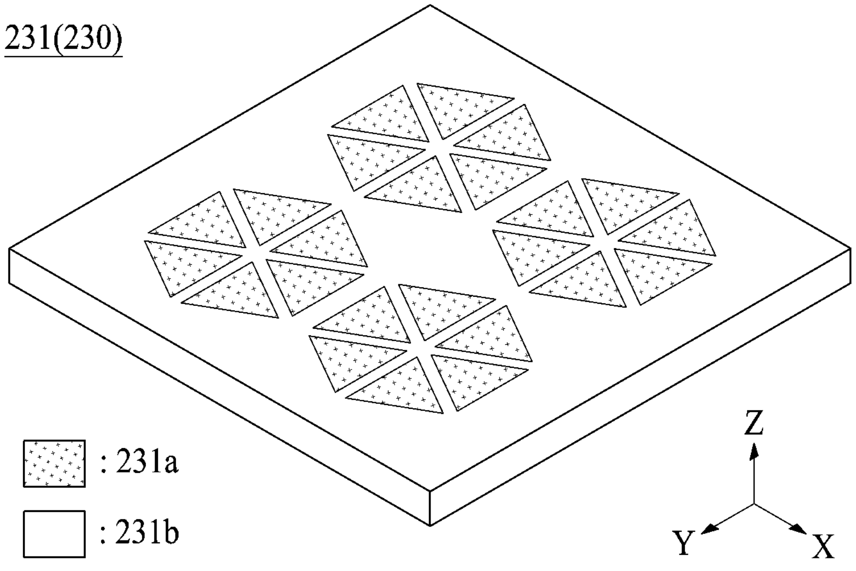

According to another embodiment of the present disclosure, as illustrated in FIG. 7F, six adjacent first portions 231*a* of the plurality of first portions 231*a* can be adjacent to one another to form a hexagonal shape (or a regularly hexagonal shape). Vertices of the six adjacent first portions 231*a* forming a hexagonal shape can be adjacent to one another in a center portion (or a central portion) of the hexagonal shape. The second portion 231*b* can be configured to surround each of the plurality of first portions 231*a*. Thus, the second portion 231*b* can be connected to or attached on a side surface (or a lateral surface) of each of the plurality of first portions 231*a*. The plurality of first portions 231*a* and the second portion 231*b* can be disposed (or arranged) in parallel on the same plane (or the same layer). Therefore, the vibration portion 231 illustrated in FIG. 7F can include a 1-3 composite structure and can be implemented as a circular vibration source (or vibrator), and thus, can be enhanced in vibration characteristic or sound output characteristic and can have a resonance frequency of 30 MHz or less, but embodiments of the present disclosure are not limited thereto, and a resonance frequency of the vibration portion 231 can vary based on at least one or more of a shape, a length, and a thickness of the vibration portion.

With reference to FIGS. 7E and 7F, 2N (where N is a natural number greater than or equal to 2) adjacent first portions 200 of the plurality of first portions 231*a* having the triangular shape can be disposed adjacent to one another to form a 2N-angular shape.

In FIGS. 7A to 7F, the plurality of first portions 231*a* according to an embodiment of the present disclosure can each be configured with an inorganic material portion. The inorganic material portion can include a piezoelectric material or an electroactive material. The piezoelectric material or the electroactive material can have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. As described above with reference to FIGS. 3A and 3B, a first surface of each of the plurality of first portions 231*a* can be electrically connected to the first electrode layer 233, and a second surface of each of the plurality of first portions 231*a* can be electrically connected to the second electrode layer 235.

In FIGS. 7A to 7F, the second portion 231*b* can be disposed between the plurality of first portions 231*a*, or can be disposed to surround each of the plurality of first portions 231*a*. Therefore, in the vibration portion 231 of the vibration generator 210 or the vibration apparatus 200, vibration energy based on a link in a unit lattice of each first portion 231*a* can increase by a corresponding second portion 231*b*. Thus, a vibration can increase, and a piezoelectric characteristic and flexibility can be secured. For example, the second portion 231*b* can include one or more of an epoxy-based polymer, an acrylic-based polymer, and a silicone-based polymer, but embodiments of the present disclosure are not limited thereto.

The second portion 231*b* according to an embodiment of the present disclosure can be configured with an organic material portion. For example, the organic material portion can be disposed between the inorganic material portions and can absorb an impact applied to the inorganic material portion (or the first portion), can release a stress concentrating on the inorganic material portion to enhance the total durability of the vibration portion 231 of the vibration generator 230 or the vibration apparatus 200, and can provide flexibility to the vibration portion 231 of the vibration generator 230 or the vibration apparatus 200.

The second portion 231*b* according to an embodiment of the present disclosure can have modulus and viscoelasticity that are lower than those of each first portion 231*a*. Thus, the second portion 231*b* can enhance the reliability of each first portion 231*a* vulnerable to an impact due to a fragile characteristic. For example, the second portion 231*b* can include a material having a loss coefficient of about 0.01 to about 1.0 and modulus of about 0.1 [GPa] to about 10 [GPa].

The organic material portion included in the second portion 231*b* can include one or more of an organic material, an organic polymer, an organic piezoelectric material, and an organic non-piezoelectric material that has a flexible characteristic or a ductile characteristic in comparison with the inorganic material portion of the first portions 231*a*. For example, the second portion 231*b* can be referred to as an adhesive portion, a stretch portion, a bending portion, a damping portion, a flexible portion, or the like, but embodiments of the present disclosure are not limited thereto.

Therefore, the plurality of first portions 231*a* and the second portion 231*b* can be disposed at (or connected to) the same plane, and thus, the vibration portion 231 of the vibration generator 210 according to various embodiments of the present disclosure can have a single thin film-type. For example, the vibration portion 231 can be vibrated in a vertical (or upper and lower) direction (or a thickness direction) by the first portion 231*a* having a vibration characteristic and can be bent in a curved shape by the second portion 231*b* having flexibility or ductility. Further, in the vibration portion 231 of the vibration generator 210 according to various embodiments of the present disclosure, a size of the first portion 231*a* and a size of the second portion 231*b* can be adjusted based on a piezoelectric characteristic and flexibility needed for the vibration portion 231. For example, in a case where the vibration portion 231 needs a piezoelectric characteristic rather than flexibility, a size of the first portion 231*a* can be adjusted to be greater than the second portion 231*b*. As another embodiment of the present disclosure, in a case where the vibration portion 231 needs flexibility rather than a piezoelectric characteristic, a size of the second portion 231*b* can be adjusted to be greater than the first portion 231*a*. Accordingly, a size of the vibration portion 231 can be adjusted based on a characteristic needed therefor, and thus, the vibration portion 231 can be easy to design.

Figure 8A:
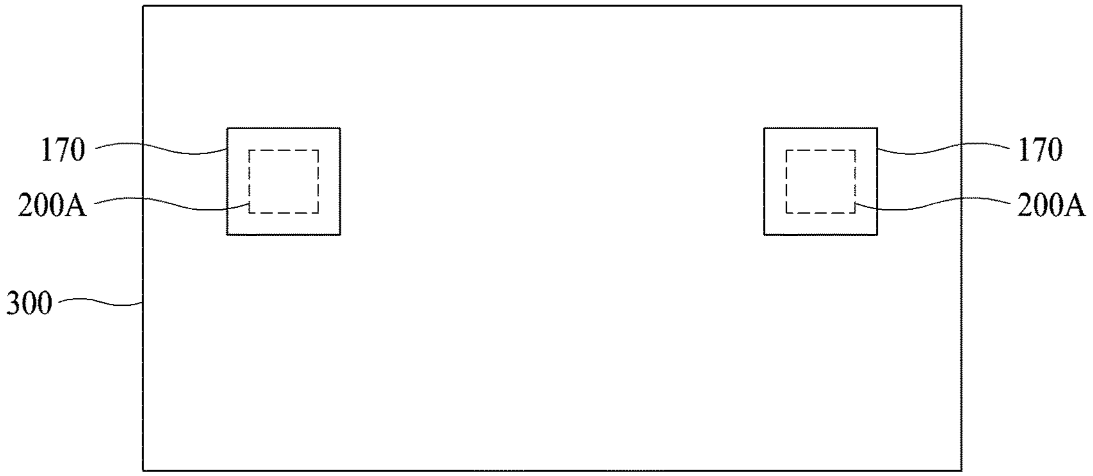
FIGS. 8A and 8B illustrate an apparatus according to another embodiment of the present disclosure.
Figure 8B:
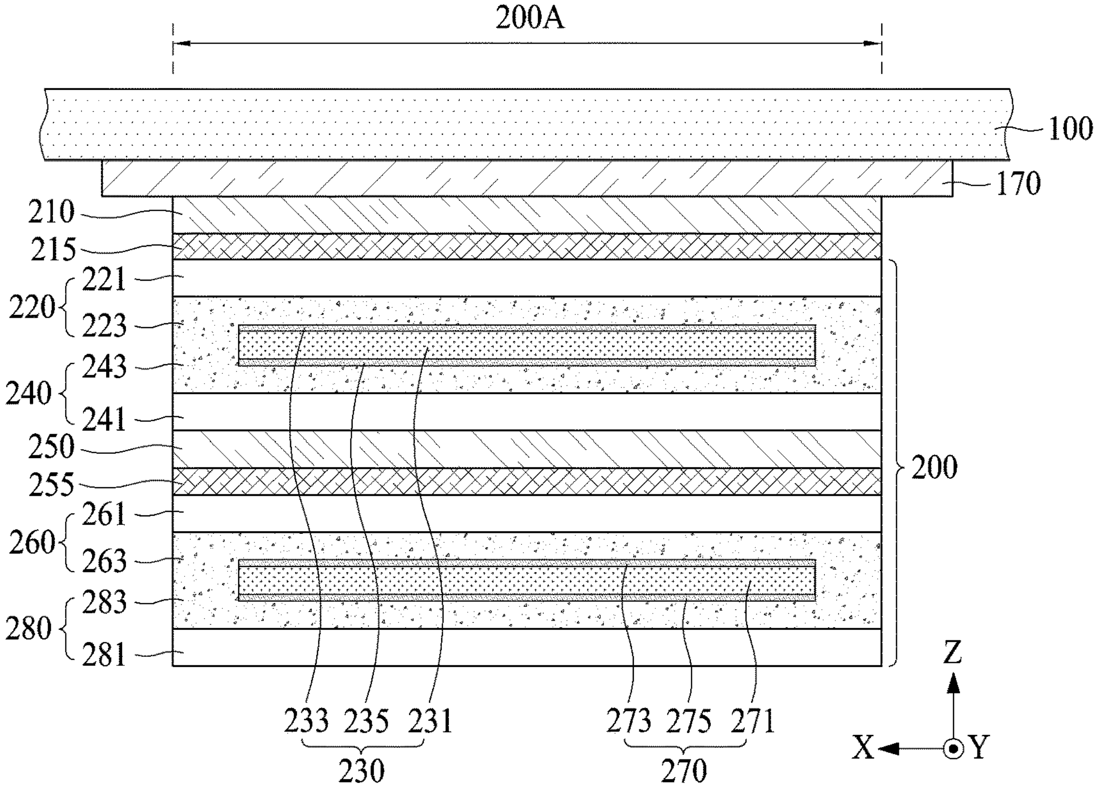

FIGS. 8A and 8B illustrate an apparatus according to another embodiment of the present disclosure. FIG. 8A illustrates a rear surface of the apparatus.

A vibration apparatus including one vibration generator can have a problem where it is unable to output a sufficient sound. For example, when a vibration apparatus including one vibration generator is applied to an apparatus such as a television (TV) or the like, there can be a problem where it is difficult to secure a sufficient sound. Therefore, when a vibration apparatus implemented with two vibration generators is applied to an apparatus, an attachment area between the display panel 100 or the vibration member (or the vibration object) and the vibration apparatus can be enlarged. As the attachment area is enlarged, when the vibrating device is attached to the rear surface of the display panel 100, it can be difficult to attach the vibration apparatus on the rear surface of the display panel 100 without an air bubble. For example, when the display panel 100 can be a light emitting display panel, there can be a problem where it is difficult to attach the vibration apparatus on an encapsulation substrate without an air bubble. Further, in a vibration apparatus implemented with two vibration generators arranged in parallel, because vibrations of adjacent vibration generators differ, there can be a problem of a division vibration where different vibrations occur. Due to this, there can be a problem where it is difficult to output a sound having enhanced flatness of a sound characteristic. There can be a problem where a division vibration increases as an attachment area of a vibration apparatus increases.

The vibration apparatus 200 according to an embodiment of the present disclosure can include a plurality of vibration generators 230 and 270 which stack (or overlap) to each other. The vibration apparatus 200 can include the plurality of vibration generators 230 and 270 which overlap or are stacked to be displaced (or vibrated) in the same direction. For example, the vibration apparatus 200 can include the plurality of vibration generators 230 and 270 which are overlapped or stacked to have the same driving direction. Although shown with at least two vibration generators 230 and 270 by way of example, the number of utilized vibrators can be multiple for each vibration apparatus 200. Additionally, when multiple vibration apparatus 200 are used, each vibration apparatus 200 need not have the same number of vibration generators, but can have different numbers of vibration generators depending on desire for higher sonic output, sharper or higher fidelity sound or arrangement for three dimensional sound or other acoustic characteristics.

The plurality of vibration generators 230 and 270 can overlap or be stacked to be displaced (or driven or vibrated) in the same direction. For example, the plurality of vibration generators 230 and 270 can contract or expand in the same driving direction (or displacement direction or vibration direction) based on a vibration driving signal in a state where the plurality of vibration generators 230 and 270 overlap or are stacked, and thus, a displacement amount (or a bending force) or an amplitude displacement of the display panel 100 can increase or can be maximized. Therefore, the plurality of vibration generators 230 and 270 can increase (or maximize) a displacement amount (or a bending force or a flexural force) or an amplitude displacement of the display panel 100, thereby enhancing a sound pressure level characteristic of a sound and a sound characteristic of a middle-low-pitched sound band generated based on a vibration of the display panel 100. For example, the plurality of vibration generators 230 and 270 can be implemented so that the plurality of vibration generators 230 and 270 overlap or are stacked to have the same driving direction, and thus, a driving force of each of the plurality of vibration generators 230 and 270 can increase or can be maximized, thereby enhancing a sound pressure level characteristic of a sound and a sound characteristic of a middle-low-pitched sound band generated by the display panel 100 based on vibrations of the plurality of vibration generators 230 and 270. For example, the middle-low-pitched sound band can be 200 Hz to 1 kHz, but embodiments of the present disclosure are not limited thereto. For example, the high-pitched sound band can be 1 kHz or more, but embodiments of the present disclosure are not limited thereto.

Each of the plurality of vibration generators 230 and 270 can include a piezoelectric structure (or a vibration portion, or a piezoelectric vibration portion, or a vibration structure) including piezoelectric ceramic having a piezoelectric characteristic, but embodiments of the present disclosure are not limited thereto. For example, each of the plurality of vibration generators 230 and 270 can include piezoelectric ceramic having a perovskite crystalline structure, and thus, can vibrate (or mechanical displacement) in response to an electrical signal applied from the outside. For example, when a vibration driving signal (or a voice signal or a vibration signal) is applied, each of the plurality of vibration generators 230 and 270 can alternately and repeatedly contract and expand based on an inverse piezoelectric effect of the piezoelectric structure (or the vibration portion, or the piezoelectric vibration portion or the vibration structure), and thus, can be displaced (or vibrated) in the same direction based on a bending phenomenon where a bending direction is alternately changed, thereby increasing or maximizing a displacement amount (or a bending force) or an amplitude displacement of the vibration apparatus 200 or/and the display panel 100.

A first vibration generator 230 disposed at the display panel 100 of the plurality of vibration generators 230 and 270 can be one main vibration generator. For example, the remaining second vibration generator 270 of the plurality of vibration generators 230 and 270 can be at least one auxiliary vibration generator which is stacked on the first vibration generator 210. The second vibration generator 270 can have the same structure as the first vibration generator 230, but embodiments of the present disclosure are not limited thereto.

The apparatus according to an embodiment of the present disclosure can include display panel 100, a vibration apparatus 200 at a rear surface of the display panel 100, a first adhesive member 210, and a second adhesive member 250. The vibration apparatus 200 can include a first vibration generator 230 and a second vibration generator 270.

The first vibration generator 230 according to an embodiment of the present disclosure can include a first vibration portion 231, a first electrode layer 233, and a second electrode layer 235. For example, the first electrode layer 233 can be disposed at a first surface of the first vibration portion 231. For example, the second electrode layer 235 can be disposed at a second surface different from the first surface of the first vibration portion 231. A description of the first vibration portion 231 can be the same as descriptions given above with reference to FIGS. 1 to 4B, and thus, their repetitive descriptions can be omitted.

The second vibration generator 270 according to an embodiment of the present disclosure can include a second vibration portion 271, a first electrode layer 273, and a second electrode layer 275. For example, the second electrode layer 273 can be disposed at a first surface of the second vibration portion 271. For example, the second electrode layer 235 can be disposed at a second surface different from the first surface of the second vibration portion 271. A description of the second vibration portion 271 can be the same as descriptions given above with reference to FIGS. 1 to 4B, and thus, their repetitive descriptions can be omitted.

The first vibration generator 230 according to an embodiment of the present disclosure can further include a first protection member 220 and a second protection member 240. A description of the first protection member 220 and the second protection member 240 can be the same as descriptions given above with reference to FIGS. 1 to 4B, and thus, their repetitive descriptions can be omitted.

The first protection member 220 can be disposed at a first surface of the first vibration generator 230. For example, the first protection member 220 can cover the first electrode layer 233 disposed at the first surface of the first vibration generator 230. The first protection member 220 can be disposed over the first electrode layer 233. For example, the first electrode layer 233 can be disposed between the first vibration portion 231 and the first protection member 220. The first protection member 220 can protect the first electrode layer 233. Accordingly, the first protection member 220 can protect the first surface of the first vibration generator 230 or the first electrode layer 233.

The second protection member 240 can be disposed at a second surface of the first vibration generator 230. For example, the second protection member 240 can cover the second electrode layer 235 disposed at the second surface of the first vibration generator 230. The second protection member 240 can be disposed over the second electrode layer 235. For example, the second electrode layer 235 can be disposed between the first vibration portion 231 and the second protection member 240. The second protection member 240 can protect the second electrode layer 235. Accordingly, the second protection member 240 can protect the second surface of the first vibration generator 230 or the second electrode layer 235.

The first protection member 220 can include a base member 221 and an adhesive layer 223. For example, the adhesive layer 223 can be disposed at a first surface of the base member 221. The adhesive layer 223 can be formed to be adjacent to the first vibration generator 230 rather than the base member 221. For example, the adhesive layer 223 can contact the first vibration portion 231. For example, the adhesive layer 223 of the first protection member 220 can be between the first electrode layer 233 of the first vibration generator 230 and the base member 221 of the first protection member 220.

The second protection member 240 can include a base member 241 and an adhesive layer 243. For example, the adhesive layer 243 can be disposed at a first surface of the base member 241. The adhesive layer 243 can be formed to be adjacent to the first vibration generator 230 rather than the base member 241. For example, the adhesive layer 243 can contact the first vibration portion 231. For example, the adhesive layer 243 of the second protection member 240 can be between the second electrode layer 235 of the first vibration generator 230 and the base member 241 of the second protection member 240.

The second vibration generator 270 according to an embodiment of the present disclosure can further include a first protection member 260 and a second protection member 280. A description of the first protection member 260 and the second protection member 280 can be the same as descriptions given above with reference to FIGS. 1 to 4B, and thus, their repetitive descriptions can be omitted.

The first protection member 260 can cover the first electrode layer 273 disposed at the first surface of the second vibration generator 270. The first protection member 260 can be disposed over the first electrode layer 273. For example, the first electrode layer 273 can be disposed between the second vibration portion 271 and the first protection member 260. The first protection member 260 can protect the first electrode layer 273. Accordingly, the first protection member 260 can protect the first surface of the second vibration generator 270 or the first electrode layer 273.

The second protection member 280 can cover the second electrode layer 275 disposed at the second surface of the second vibration generator 270. The second protection member 280 can be disposed over the second electrode layer 275. For example, the second electrode layer 275 can be disposed between the second vibration portion 271 and the second protection member 280. The second protection member 280 can protect the second electrode layer 275. Accordingly, the second protection member 280 can protect the second surface of the second vibration generator 270 or the second electrode layer 275.

The first protection member 260 can include a base member 261 and an adhesive layer 263. For example, the adhesive layer 263 can be disposed at a first surface of the base member 261. The adhesive layer 263 can be formed to be adjacent to the second vibration generator 270 rather than the base member 261. For example, the adhesive layer 263 can contact the second vibration portion 271. For example, the adhesive layer 263 of the first protection member 260 can be between the first electrode layer 273 of the second vibration generator 270 and the base member 261 of the first protection member 260. For example, the adhesive layer 263 can contact the second vibration portion 271. For example, the adhesive layer 263 of the first protection member 260 can be between the first electrode layer 263 of the second vibration generator 270 and the base member 261 of the first protection member 260.

The second protection member 280 can include a base member 281 and an adhesive layer 283. For example, the adhesive layer 283 can be disposed at a first surface of the base member 281. The adhesive layer 283 can be formed to be adjacent to the second vibration generator 270 rather than the base member 281. For example, the adhesive layer 283 can contact the second vibration portion 271. For example, the adhesive layer 283 of the second protection member 280 can be between the second electrode layer 275 of the second vibration generator 270 and the base member 281 of the second protection member 280. For example, the adhesive layer 283 can contact the second vibration portion 271. For example, the adhesive layer 283 of the second protection member 280 can be between the second electrode layer 275 of the second vibration generator 270 and the base member 281 of the second protection member 280.

The apparatus according to an embodiment of the present disclosure can further include a first adhesive member 210. For example, the first adhesive member 210 can be disposed between the vibration member (or the display panel 100) and the vibration apparatus 200. For example, the first adhesive member 210 can be disposed between the display panel 100 and the first vibration generator 230. For example, the first adhesive member 210 can be disposed between the plate 170 and the vibration apparatus 200. For example, the first adhesive member 210 can be disposed between the plate 170 and the first vibration generator 230. For example, the first adhesive member 210 can be disposed between the plate 170 and the first protection member 220 of the first vibration generator 230. The first adhesive member 210 can be disposed between the display panel 100 and the vibration apparatus 200 and can connect or couple the vibration apparatus 200 to the rear surface of the display panel 100. For example, the vibration apparatus 200 can be connected or coupled to the rear surface of the display panel 100 by the first adhesive member 210, and thus, can be supported by or disposed at the rear surface of the display panel 100.

The apparatus according to an embodiment of the present disclosure can further include a first connection member 215. For example, the first adhesive member 210 can be disposed over the first connection member 215. For example, the first adhesive member 210 can be disposed between the first connection member 215 and the plate 170. For example, the first connection member 215 can be disposed between the first protection member 220 and the first adhesive member 210. A description of the first adhesive member 210 and the first connection member 215 can be the same as descriptions given above with reference to FIGS. 1 to 3B and 5, and thus, their repetitive descriptions can be omitted.

According to the embodiment of the present disclosure, the plurality of vibration generators 230 and 270 can be disposed at an arrangement area 200A of the vibration apparatus by the first adhesive member 210 and the first connection member 215. The plate 170 can be disposed at the arrangement area 200A of the vibration apparatus. For example, the plate 170 can be disposed between the display panel 100 and the vibration apparatus 200. For example, the plate 170 can be disposed between the display panel 100 and the first vibration generator 230. For example, a size of the plate 170 can be the same as or greater than a size of the arrangement area 200A of the vibration apparatus. For example, the size of the plate 170 can be the same as or greater than a size of the vibration apparatus 200. For example, the size of the plate 170 can be the same as or greater than a size of the plurality of vibration generators 230 and 270. The plate 170 can be configured with one or more of a single nonmetal material and a composite nonmetal material. For example, the single nonmetal material or the composite nonmetal material can be one or more of wood, plastic, glass, cloth, paper, and leather, but embodiments of the present disclosure are not limited thereto. For example, the plate 170 can be configured with a material that does not have a metal oxide surface.

The vibration apparatus 200 according to an embodiment of the present disclosure can further include a second adhesive member 250 disposed between the plurality of vibration generators (for example, first and second vibration generators) 230 and 270. The vibration apparatus 200 can further include a second connection member 255 disposed between the second adhesive member 250 and the second vibration generators 270. The vibration apparatus 200 can further include the second connection member 255. The second connection member 255 can include metal oxide. For example, the metal oxide can be oxide such as copper, iron, silver, zinc, or magnesium, or the like, but embodiments of the present disclosure are not limited thereto. For example, the metal oxide can be copper oxide ($CuO$ or $Cu_2O$), iron oxide ($Fe_2O_3$ or $Fe_3O_4$), silver oxide ($Ag_2O$), zinc oxide ($ZnO$), or magnesium oxide ($MgO$), or the like, but embodiments of the present disclosure are not limited thereto. The second connection member 255 and the second adhesive member 250 can be cured based on a reaction between the second connection member 255 and the second adhesive member 250. For example, the second connection member 255 and the second adhesive member 250 can be cured by a film laminating process or a panel aging process, thereby solving a problem caused by high temperature curing.

According to an embodiment of the present disclosure, the second connection member 255 can be formed by performing a sputtering process on metal oxide, attaching sheet-type metal oxide, or coating an oxide solution. As another embodiment of the present disclosure, for example, when the second connection member 255 is not metal oxide, a metal layer can be formed by a sputtering process, and after a sheet-type metal layer is attached and a solution is coated thereon, the second connection member 255 can be formed by oxidizing the metal layer. As another embodiment of the present disclosure, for example, when the second connection member 255 is not metal oxide, a metal layer can be formed by a sputtering process, a sheet-type metal layer can be attached thereon, and the second connection member 255 can be formed by natural oxidization.

The second connection member 255 can be disposed between the second adhesive member 250 and the second vibration generator 270. For example, the second connection member 255 can be disposed between the second adhesive member 250 and the first protection member 260 of the second vibration generator 270. For example, the second connecting member 255 can be disposed between the first protective member 260 and the second adhesive member 250.

According to an embodiment of the present disclosure, the second adhesive member 250 can be configured with the same material as the first adhesive member 210, but embodiments of the present disclosure are not limited thereto. For example, the second connection member 255 can be configured with the same material as the first connection member 215, but embodiments of the present disclosure are not limited thereto.

According to an embodiment of the present disclosure, a vibration characteristic of transferring a vibration from the vibration apparatus 200 to a vibration surface can be enhanced by using the first adhesive member 210 where a modulus and/or an adhesive force are/is enhanced by the first connection member 215, thereby providing an apparatus including the vibration apparatus 200 where a sound pressure level characteristic and/or a sound characteristic are/is enhanced. Further, the first vibration apparatus 230 can be attached on the second vibration apparatus 270 by using the second adhesive member 250 where a modulus and/or an adhesive force are/is enhanced by the second connection member 255, and thus, a vibration characteristic of transferring a vibration from the vibration apparatus 200 to the vibration surface can be enhanced, thereby enhancing a sound pressure level characteristic and/or a sound characteristic. The plurality of vibration generators 230 and 270 according to an embodiment of the present disclosure can be provided as one structure (or one part) by a laminating process using the second adhesive member 250 and the second connection member 255.

Figure 9A:
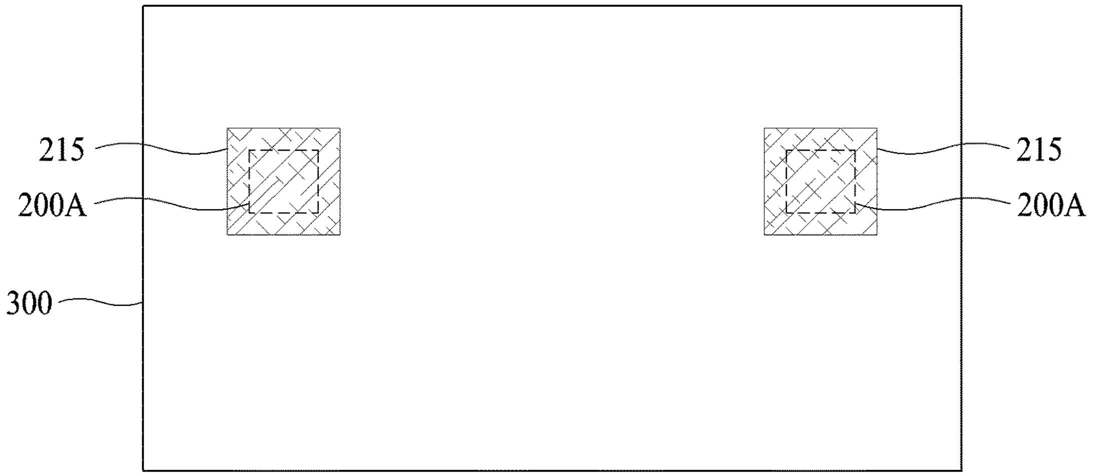
FIGS. 9A and 9B illustrate an apparatus according to another embodiment of the present disclosure.
Figure 9B:
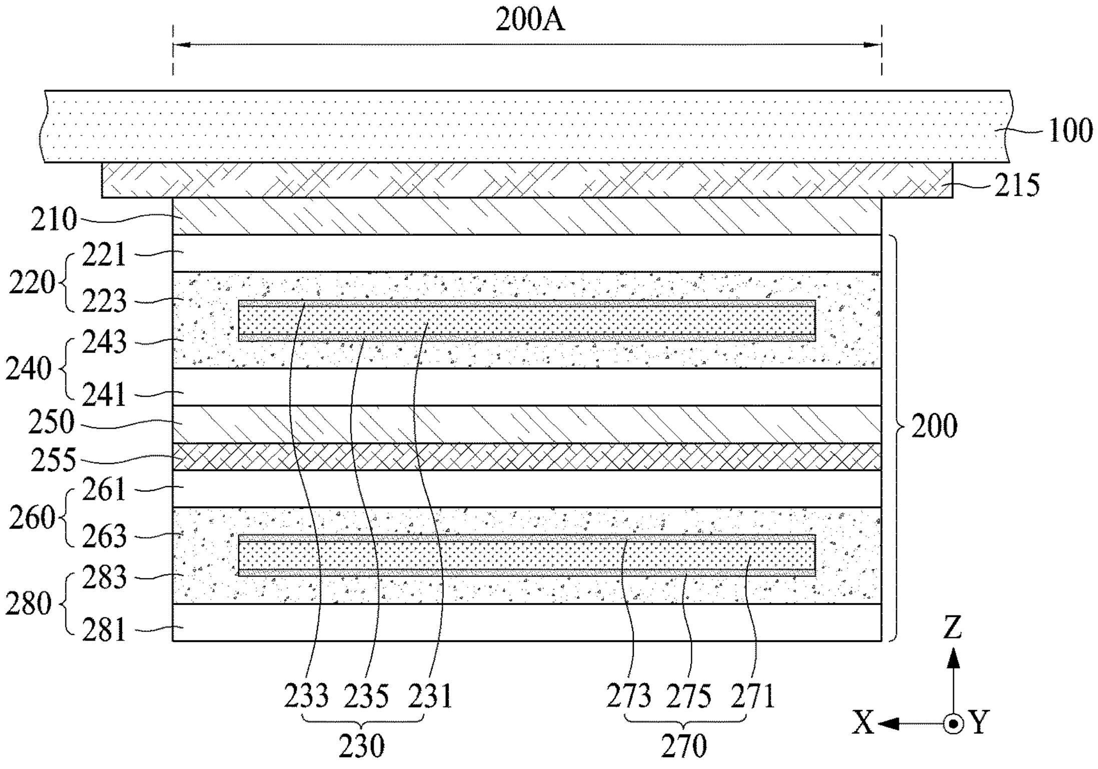

FIGS. 9A and 9B illustrate an apparatus according to another embodiment of the present disclosure. FIG. 9A illustrates a rear surface of the apparatus.

With reference to FIGS. 9A and 9B, the apparatus according to an embodiment of the present disclosure can include a vibration apparatus 200, a first adhesive member 210, and a second adhesive member 250. The vibration apparatus 200 can include a first vibration generator 230 and a second vibration generator 270. A description of the first vibration generator 230 and the second vibration generator 270 can be the same as descriptions given above with reference to FIGS. 8A and 8B, and thus, their repetitive descriptions can be omitted.

The vibration apparatus 200 can be disposed at the arrangement area 200A of the vibration apparatus at the rear surface of the display panel 100. For example, when the display panel 100 is an electroluminescent display panel, the arrangement area 200A of the vibration apparatus can be an encapsulation part. For example, the arrangement area 200A of the vibration apparatus can include a plate. A description of the plate can be the same as descriptions given above with reference to FIGS. 4A, 4B and 6B, and thus, their repetitive descriptions can be omitted.

Because the arrangement area 200A of the vibration apparatus includes a metal material, the first connection member 215 can include oxide capable of reacting with the metal material. For example, the first connection member 215 can include metal oxide oxidized from the plate. The metal oxide can be formed by performing surface treatment such as coating performed on the metal oxide.

According to an embodiment of the present disclosure, the first connection member 215 can be between the display panel 100 (or a vibration member) and the first adhesive member 210. For example, the first adhesive member 210 can be between the first connection member 215 and the vibration apparatus 200. For example, the first adhesive member 210 can be between the first connection member 215 and the first vibration generator 230. The descriptions of the first adhesive member 210 and the first connection member 215 can be the same as the adhesive member 210 and the connection member 215 described above with reference to FIGS. 4A, 4B, and 6, and thus, their descriptions are omitted.

With reference to FIGS. 9A and 9B, the first connection member 215 can be formed at the arrangement area 200A of the vibration apparatus, and the vibration apparatus 200 can be disposed at the arrangement area 200A of the vibration apparatus. The first connection member 215 can react with the first adhesive member 210 and can be cured by heat. For example, the first adhesive member 210 and the first connection member 215 can be cured in a state where the vibration apparatus 200 is attached thereon, and thus, the performance of the vibration apparatus 200 can be enhanced without a reduction in an adhesive force.

According to an embodiment of the present disclosure, when the arrangement area 200A of the vibration apparatus includes a metal material, the arrangement area 200A of the vibration apparatus can include the first connection member 215 which is metal oxide, and by attaching the vibration apparatus 200, the vibration apparatus can be attached thereon without a reduction in an adhesive force, thereby decreasing a reduction in sound pressure level characteristic and/or sound characteristic of the vibration apparatus 200 caused by a reduction in an adhesive force.

The vibration apparatus 200 according to an embodiment of the present disclosure can further include a second adhesive member 250 disposed between the first vibration generator 230 and the second vibration generator 270. A second connection member 255 can be further disposed between the second adhesive member 250 and the second vibration generator 270. The descriptions of the second adhesive member 250 and the second connection member 255 can be the same as the second adhesive member 250 and the second connection member 255 described above with reference to FIGS. 8A and 8B, and thus, their descriptions are omitted.

According to an embodiment of the present disclosure, a vibration characteristic of transferring a vibration from the vibration apparatus 200 to a vibration surface can be enhanced by using the second adhesive member 250 where a modulus and/or an adhesive force are/is enhanced by the second connection member 255, thereby providing an apparatus including the vibration apparatus 200 where a sound pressure level characteristic and/or a sound characteristic are/is enhanced. Further, the first vibration apparatus 230 can be attached on the second vibration apparatus 270 by using the second adhesive member 250 where a modulus and/or an adhesive force are/is enhanced by the second connection member 255, and thus, a vibration characteristic of transferring a vibration from the vibration apparatus 200 to the vibration surface can be enhanced, thereby enhancing a sound pressure level characteristic and/or a sound characteristic. The plurality of vibration generators 230 and 270 according to an embodiment of the present disclosure can be provided as one structure material (or one part) by a laminating process using the second adhesive member 250 and the second connection member 255.

Figure 10:
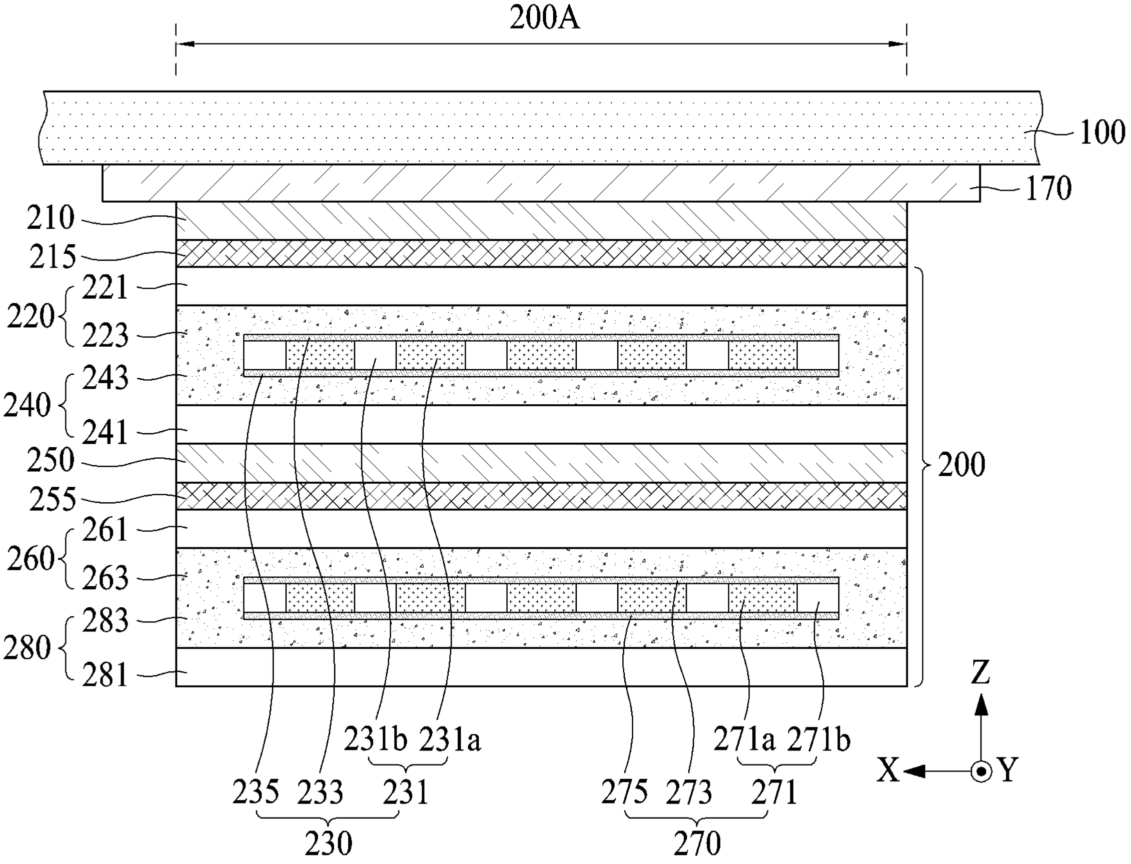
FIG. 10 illustrates an apparatus according to another embodiment of the present disclosure.
Figure 11:
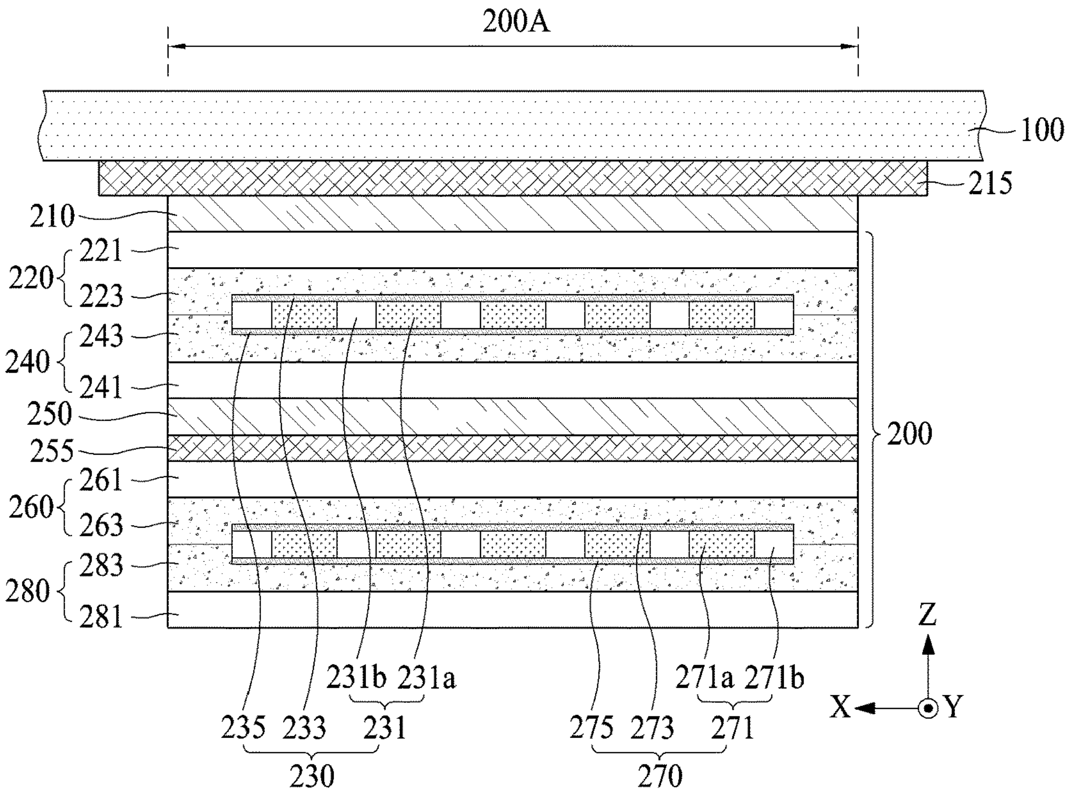
FIG. 11 illustrates an apparatus according to another embodiment of the present disclosure.

FIG. 10 illustrates an apparatus according to another embodiment of the present disclosure. FIG. 11 illustrates an apparatus according to another embodiment of the present disclosure.

With reference to FIGS. 10 and 11, the apparatus according to an embodiment of the present disclosure can include a vibration apparatus 200. The vibration apparatus 200 can include a first vibration generator 230 and a second vibration generator 270.

With reference to FIGS. 10 and 11, the first vibration generator 230 according to an embodiment of the present disclosure can include a first vibration portion 231, a first electrode layer 233, and a second electrode layer 235. The first vibration portion 231 can include a plurality of first portions 231*a* and a plurality of second portions 231*b*. Except for that the first vibration portion 231 includes the plurality of first portions 231*a* and the plurality of second portions 231*b*, the first vibration portion 231 can be the same as descriptions given above with reference to FIGS. 8A and 8B, and thus, their repetitive descriptions can be omitted. For example, the first vibration portion 231 can be configured with one or more the vibration portion 231 illustrated in FIGS. 7A to 7F.

The second vibration generator 270 according to an embodiment of the present disclosure can include a second vibration portion 271, a first electrode layer 273, and a second electrode layer 275. The second vibration portion 271 can include a plurality of first portions 271*a* and a plurality of second portions 271*b*. Except for that the second vibration portion 271 includes the plurality of first portions 271*a* and the plurality of second portions 271*b*, the second vibration portion 271 can be the same as descriptions given above with reference to FIGS. 8A and 8B, and thus, their repetitive descriptions can be omitted. For example, the second vibration portion 271 can be configured with one or more the vibration portion 231 illustrated in FIGS. 7A to 7F.

With reference to FIG. 10, the apparatus according to an embodiment of the present disclosure can further include a first adhesive member 210 and a first connection member 215. As another embodiment of the present disclosure, the first adhesive member 210 and the first connection member 215 can be configured to be compatible (or exchanged) with each other. A description of the first adhesive member 210 and the first connection member 215 can be the same as descriptions given above with reference to FIGS. 3A, 3B, 5, 8A, and 8B, and thus, their repetitive descriptions can be omitted. The apparatus according to an embodiment of the present disclosure can further include a second adhesive member 250 and a second connection member 255 between the first vibration generator 230 and the second vibration generator 270. A description of the second adhesive member 250 and the second connection member 255 can be the same as descriptions given above with reference to FIGS. 8A and 8B, and thus, their repetitive descriptions can be omitted.

With reference to FIG. 11, the apparatus according to an embodiment of the present disclosure can further include a first adhesive member 210 and a first connection member 215. A description of the first adhesive member 210 and the first connection member 215 can be the same as descriptions given above with reference to FIGS. 4A, 4B, 6, 9A, and 9B, and thus, their repetitive descriptions can be omitted. The apparatus according to an embodiment of the present disclosure can further include a second adhesive member 250 and a second connection member 255 between the first vibration generator 230 and the second vibration generator 270. A description of the second adhesive member 250 and the second connection member 255 can be the same as descriptions given above with reference to FIGS. 9A and 9B, and thus, their repetitive descriptions can be omitted.

According to an embodiment of the present disclosure, the plurality of first portions 231*a* and the second portion 231*b* can be disposed at (or connected to) the same plane, and thus, the first vibration portion 231 can have a single thin film-type. The plurality of first portions 231*a* and the second portion 231*b* can be disposed at (or connected to) the same plane, and thus, the second vibration portion 271 can have a single thin film-type. According to an embodiment of the present disclosure, the vibrating apparatus 200 including the plurality of first portions 231*a* and the second portion 231*b* can be provided, thereby providing the vibrating apparatus 200 having an enhanced flexible characteristic and a piezoelectric characteristic.

Figure 12:
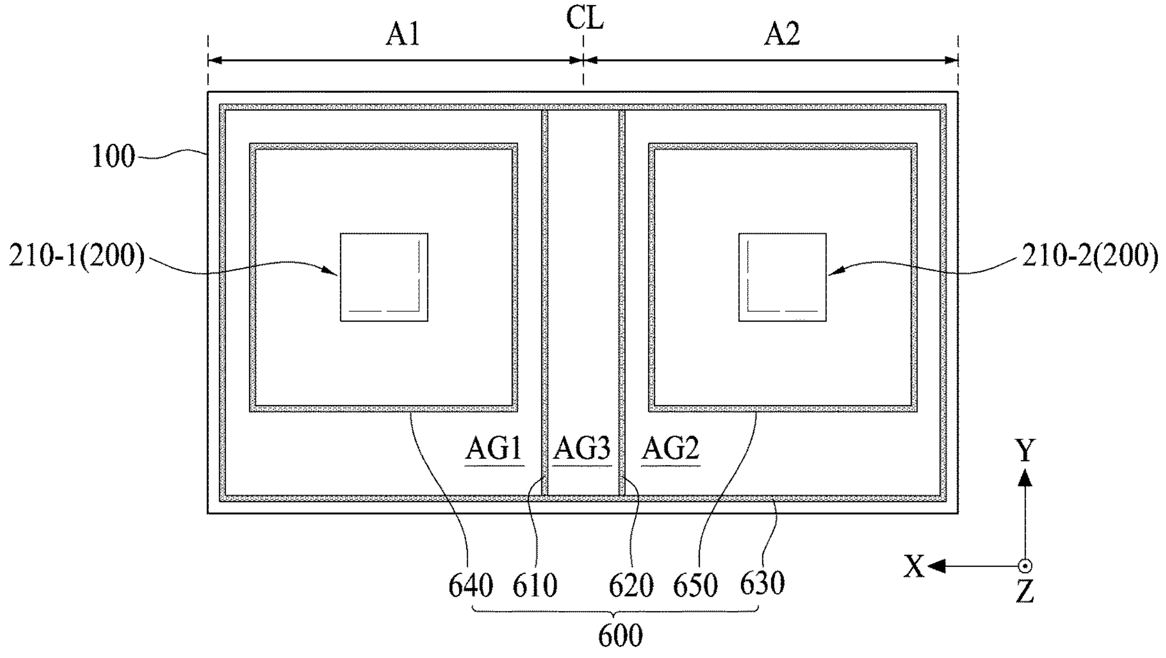
FIG. 12 illustrates an apparatus according to another embodiment of the present disclosure.

FIG. 12 illustrates an apparatus according to another embodiment of the present disclosure.

With reference to FIG. 12, in the apparatus according to another embodiment of the present disclosure, a rear surface (or a back surface) of a display panel 100 can include a first region (or a first rear area) A1 and a second region (or a second rear area) A2. For example, in the rear surface of the display panel 100, the first region A1 can be a left rear region, and the second region A2 can be a right rear region. The first region A1 and the second region A2 can be a left-right symmetrical with respect to a center line CL of the display panel 100 in a first direction X, but embodiments of the present disclosure are not limited thereto. For example, each of the first region A1 and the second region A2 can overlap the display area of the display panel 100.

The vibration apparatus 200 according to another embodiment of the present disclosure can include a first vibration device 210-1 and a second vibration device 210-2 disposed at the rear surface of the display panel 100.

The first vibration device 210-1 can be disposed at the first region A1 of the display panel 100. For example, the first vibration device 210-1 can be disposed close to a center or a periphery within the first region A1 of the display panel 100 with respect to the first direction X. The first vibration device 210-1 according to an embodiment of the present disclosure can vibrate the first region A1 of the display panel 100, and thus, can generate a first vibration sound PVS1 or a first haptic feedback in the first region A1 of the display panel 100. For example, the first vibration device 210-1 according to an embodiment of the present disclosure can directly vibrate the first region A1 of the display panel 100, and thus, can generate the first vibration sound PVS1 or the first haptic feedback in the first region A1 of the display panel 100. For example, the first vibration sound PVS1 can be a left sound. A size of the first vibration device 210-1 according to an embodiment of the present disclosure can have a size corresponding to half or less of the first region A1 or half or more of the first region A1 based on a characteristic of the first vibration sound PVS1 or a sound characteristic needed for an apparatus. As another embodiment of the present disclosure, the size of the first vibration device 210-1 can have a size corresponding to the first region A1 of the display panel 100. For example, the size of the first vibration device 210-1 can have the same size as the first area A1 of the display panel 100 or can have a size smaller than the first area A1 of the display panel 100.

The second vibration device 210-2 can be disposed at the second region A2 of the display panel 100. For example, the second vibration device 210-2 can be disposed close to a center or a periphery within the second region A2 of the display panel 100 with respect to the first direction X. The second vibration device 210-2 according to an embodiment of the present disclosure can vibrate the second region A2 of the display panel 100, and thus, can generate a second vibration sound PVS2 or a second haptic feedback in the second region A2 of the display panel 100. For example, the second vibration device 210-2 according to an embodiment of the present disclosure can directly vibrate the second region A2 of the display panel 100, and thus, can generate the second vibration sound PVS2 or the second haptic feedback in the second region A2 of the display panel 100. For example, the second vibration sound PVS2 can be a right sound. A size of the second vibration device 210-2 according to an embodiment of the present disclosure can have a size corresponding to half or less of the second region A2 or half or more of the second region A2 based on a characteristic of the second vibration sound PVS2 or a sound characteristic needed for an apparatus. As another embodiment of the present disclosure, the size of the second vibration device 210-2 can have a size corresponding to the second region A2 of the display panel 100. For example, the size of the second vibration device 210-2 can have the same size as the second area A2 of the display panel 100 or can have a size smaller than the second area A2 of the display panel 100. Therefore, the first vibration device 210-1 and the second vibration device 210-2 can have the same size or different sizes to each other based on a sound characteristic of left and right sounds and/or a sound characteristic of the apparatus. And, the first vibration device 210-1 and the second vibration device 210-2 can be disposed in a left-right symmetrical structure or a left-right asymmetrical structure with respect to the center line CL of the display panel 100.

Each of the first vibration device 210-1 and the second vibration device 210-2 can include one or more of the vibration apparatus 200 described above with reference to FIGS. 3 to 11, and thus, their repetitive descriptions can be omitted.

The apparatus according to another embodiment of the present disclosure can further include a partition 600. For example, the partition 600 can divide the first and second regions A1 and A2 of the display panel 100.

The partition 600 can be an air gap or a space, where sounds PVS1 and PVS2 are generated when the display panel 100 is vibrated by the first and second vibration devices 210-1 and 210-2. For example, a partition 600 can separate the sounds PVS1 and PVS2 or a channel and can prevent or decrease the reduction of a sound characteristic caused by interference of the sounds PVS1 and PVS2. The partition 600 can be referred to as a sound blocking member, a sound separation member, a space separation member, an enclosure, or a baffle, or the like, but embodiments of the present disclosure are not limited thereto.

The partition 600 according to an embodiment of the present disclosure can include a first partition member 610 and a second partition member 620 disposed between the first vibration device 210-1 and the second vibration device 210-2.

The first partition member 610 and the second partition member 620 can be disposed between the display panel 100 and a supporting member 300. For example, the first partition member 610 and the second partition member 620 can be disposed between the display panel 100 and a second supporting member 330. For example, the first partition member 610 and the second partition member 620 can be disposed between the display panel 100 and a supporting member 300 corresponding to a center region of the display panel 100. The first partition member 610 and the second partition member 620 can separate a first vibration sound PVS1 generated by the first vibration device 210-1 and a second vibration sound PVS2 generated by the second vibration device 210-2. For example, the first partition member 610 and the second partition member 620 can block the transfer of a vibration, generated by the first vibration device 210-1 in the first region A1 of the display panel 100, to the second region A2 of the display panel 100, or can block the transfer of a vibration, generated by the second vibration device 210-2 in the second region A2 of the display panel 100, to the first region A1 of the display panel 100. Therefore, the first partition member 610 and the second partition member 620 can attenuate or absorb a vibration of the display panel 100 at a center of the display panel 100, and thus, the first and second partition members 610 and 620 can block the transfer of a sound of the first region A1 to the second region A2, or can block the transfer of a sound of the second region A2 to the first region A1. Accordingly, the first partition member 610 and the second partition member 620 can separate a left sound and a right sound to further enhance a sound output characteristic of the apparatus. Thus, the apparatus according to an embodiment of the present disclosure can output a sound including a sound of a two-channel type to a forward region in front of the display panel 100 by separating the left and right sounds according to the first partition member 610 and the second partition member 620.

According to an embodiment of the present disclosure, the partition 600 can include a material having elasticity which enables a certain degree of compression. For example, the partition 600 can be configured with polyurethane or polyolefin, but embodiments of the present disclosure are not limited thereto. As another embodiment of the present disclosure, the partition 600 can be configured as a single-sided tape, a single-sided foam pad, a double-sided tape, a double-sided foam tape, or the like, but embodiments of the present disclosure are not limited thereto.

According to an embodiment of the present disclosure, one of the first partition member 610 and the second partition member 620 can be omitted. For example, one of the first partition member 610 and the second partition member 620 is between the first vibration device 210-1 and the second vibration device 210-2, and thus, a left sound and a right sound can be separated from each other. For example, when the second partition member 620 of the first partition member 610 and the second partition member 620 is omitted, the first partition member 610 can be disposed between the display panel 100 and the supporting member 300 to correspond to a rear center line CL of the display panel 100.

Therefore, the first partition member 610 and/or the second partition member 620 can separate a left sound and a right sound to further enhance a sound output characteristic of the apparatus. An apparatus including the first partition member 610 or the second partition member 620 can separate the left and right sounds by the first partition member 610 or the second partition member 620 to output a sound including a sound of a two-channel type to the forward region in front of the display panel 100.

The partition 600 according to an embodiment of the present embodiment can further include a third partition member 630 between the display panel 100 and the supporting member 300.

The third partition member 630 can be disposed to surround all of the first and second vibration devices 210-1 and 210-2. For example, the third partition member 630 can be disposed between a rear periphery of the display panel 100 and a front periphery of the supporting member 300. The third partition member 630 can be referred to as an edge partition, a sound blocking member, an edge enclosure, an edge baffle, or the like, but embodiments of the present disclosure are not limited thereto. For example, the third partition member 630 can be adjacent to or in contact with the first coupling member 401 illustrated in FIG. 2, and can be surrounded by the first coupling member 401. As another embodiment of the present disclosure, the third partition member 630 can be integrated as one body with the first coupling member 401.

The third partition member 630 can provide first to third air gaps AG1 to AG3 between the display panel 100 and the supporting member 300 together with the first and second partition members 610 and 620. For example, each of the first to third air gaps AG1 to AG3 can be referred to as a vibration space, a sound pressure space, a sound box, a sound part, a resonance box, or a resonance part, but embodiments of the present disclosure are not limited thereto.

The first air gap AG1 can be provided at the first region A1 of the display panel 100. For example, the first air gap AG1 can be provided at the first region A1 of the display panel 100 which is surrounded by the first partition member 610 and the third partition member 630 disposed in the first region A1 of the display panel 100.

The second air gap AG2 can be provided at the second region A2 of the display panel 100. For example, the second air gap AG2 can be provided at the second region A2 of the display panel 100 which is surrounded by the second partition member 620 and the third partition member 630 disposed in the second region A2 of the display panel 100.

The third air gap AG3 can be provided at a rear center region of the display panel 100. For example, the third air gap AG3 can be provided at a rear center region of the display panel 100 surrounded by the first and second partition members 610 and 620 and the third partition member 630. For example, the third air gap AG3 can be provided between the second air gap AG2 and the first air gap AG1, including the rear center line CL of the display panel 100. The third air gap AG3 can be referred to as a sound separation space, a sound blocking space, a sound interference prevention space, or the like, but embodiments of the present disclosure are not limited thereto. The third air gap AG3 can separate the first air gap AG1 from the second air gap AG2, and thus, the third air gap AG3 can reduce or prevent a resonance phenomenon or an interference phenomenon in a certain frequency band generated in each of the first air gap AG1 and the second air gap AG2.

The first vibration device 210-1 can be surrounded by the first partition member 610 and the third partition member 630 providing the first air gap AG1. The second vibration device 210-2 can be surrounded by the second partition member 620 and the third partition member 630 providing the second air gap AG2.

When one of the first and second partition members 610 and 620 is omitted, the third air gap AG3 can be omitted.

Therefore, the third partition member 630 can surround an area between the display panel 100 and the supporting member 300, and can individually surround each of the first and second vibration devices 210-1 and 210-2, together with the first and second partition members 610 and 620, to secure a vibration space of each of the first and second vibration devices 210-1 and 210-2. Thus, the third partition member 630 can enhance a sound pressure level characteristic of left and right sounds. And, the third partition member 630 can prevent sound or a sound pressure level from being leaked to the outside through the side surface between the display panel 100 and the supporting member 300, thereby further enhancing a sound output characteristic of the apparatus.

The partition 600 according to an embodiment of the present embodiment can further include a fourth partition member 640 and a fifth partition member 650. The fourth partition member (or a first enclosure) 640 can surround the first vibration device 210-1. The fifth partition member (or a second enclosure) 650 can surround the second vibration device 210-2.

The fourth partition member 640 can be disposed between the display panel 100 and the supporting member 300 to correspond to the first air gap AG1. For example, the fourth partition member 640 can independently (or individually) surround the first vibration device 210-1. The fourth partition member 640 according to an embodiment of the present disclosure can have a rectangular shape surrounding the first vibration device 210-1, but embodiments of the present disclosure are not limited thereto. For example, the fourth partition member 640 can have a shape that is the same as or different from a whole shape of the first vibration device 210-1. For example, when the first vibration device 210-1 has a square shape, the fourth partition member 640 can have a square shape, a circular shape or an oval shape having a size relatively larger than the first vibration device 210-1.

The fourth partition member 640 can limit (or define) a vibration region (or a vibration area) of the display panel 100 based on the first vibration device 210-1. For example, in the first region A1 of the display panel 100, as a size of the fourth partition member 640 increases, a vibration region of the first region A1 can increase. Thus, a low-pitched sound band characteristic of a left sound can be enhanced. As another embodiment of the present disclosure, in the first region A1 of the display panel 100, as a size of the fourth partition member 640 decreases, the vibration region of the first region A1 can decrease. Thus, a high-pitched sound band characteristic of the left sound can be enhanced. Accordingly, a size of the fourth partition member 640 can be adjusted based on a desired characteristic of a sound band, based on a vibration of the display panel 100 due to the vibration of the first vibration device 210-1.

The fifth partition member 650 can be disposed between the display panel 100 and the supporting member 300 to correspond to the second air gap AG2. The fifth partition member 650 can independently (or individually) surround the second vibration device 210-2. For a left sound to be symmetrical with a right sound, the fifth partition member 650 according to an embodiment of the present disclosure can have the same shape as the fourth partition member 640 and can have a symmetrical structure with the fourth partition member 640 with respect to the rear center line CL of the display panel 100.

The fifth partition member 650 can limit (or define) a vibration region (or a vibration area) of the display panel 100 based on the second vibration device 210-2. For example, in the second region A2 of the display panel 100, as a size of the fifth partition member 650 increases, a vibration region of the second region A2 can increase. Thus, the low-pitched sound band characteristic of the right sound can be enhanced. As another embodiment of the present disclosure, in the second region A2 of the display panel 100, as a size of the fifth partition member 650 decreases, the vibration region of the second region A2 can decrease. Thus, the high-pitched sound band characteristic of the right sound can be enhanced. Accordingly, a size of the fifth partition member 650 can be adjusted based on a desired characteristic of a sound band, based on a vibration of the display panel 100 due to the vibration of the first vibration device 210-2.

The fourth and fifth partition members 640 and 650 can limit a vibration region (or a vibration area) of each of the first and second vibration devices 210-1 and 210-2. Thus, the fourth and fifth partition members 640 and 650 can enhance lateral symmetricity of a left sound and a right sound each generated based on a vibration of the display panel 100, and can optimize a sound pressure level characteristic and a sound reproduction band of each of the left and right sounds. For example, when the fourth and fifth partition members 640 and 650 are provided, the third partition member 630 can be omitted. As another embodiment of the present disclosure, when the fourth and fifth partition members 640 and 650 are provided, one or more of the first to third partition members 610 to 630 can be omitted.

Therefore, the apparatus according to another embodiment of the present disclosure includes the partition 600, and thus, the sound pressure level characteristic and the sound reproduction band of each of the left and right sounds can be optimized. For example, the apparatus according to another embodiment of the present disclosure can include at least one or more of the first and second partition members 610 and 620, but embodiments of the present disclosure are not limited thereto. For example, the apparatus according to another embodiment of the present disclosure can include the third partition member 630 and at least one or more of the first and second partition members 610 and 620. For example, the apparatus according to another embodiment of the present disclosure can include the third partition member 630, the fourth partition member 640 and the fifth partition member 650. For example, the apparatus according to another embodiment of the present disclosure can include all of the first to fifth partition members 610 to 650.

Accordingly, the apparatus according to another embodiment of the present disclosure can output, through the first vibration device 210-1 and the second vibration device 210-2, a left sound PVS1 and a right sound PVS2 to a forward region in front of the display panel 100 to provide a sound to a user. The apparatus according to another embodiment of the present disclosure can output a sound including a sound of a two-channel type to the forward region in front of the display panel 100 by separating the left and right sounds PVS1 and PVS2 according to the partition 600.

Figure 13:
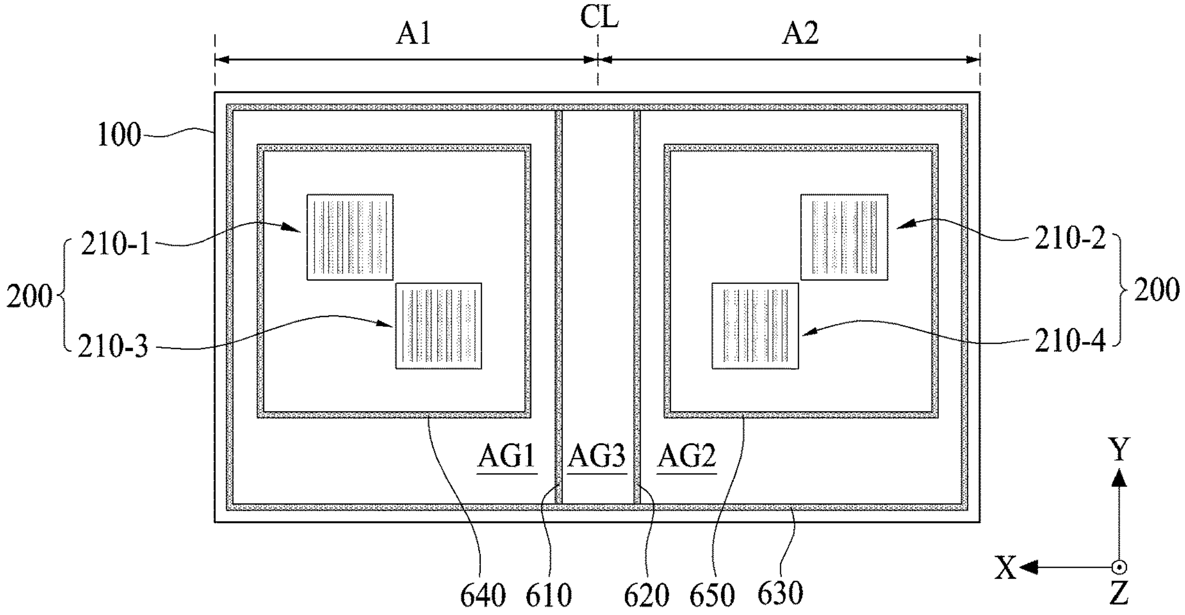
FIG. 13 illustrates an apparatus according to another embodiment of the present disclosure.

FIG. 13 illustrates an apparatus according to another embodiment of the present disclosure.

With reference to FIG. 13, in the apparatus according to another embodiment of the present disclosure, the vibration apparatus 200 can include a first vibration device 210-1, a second vibration device 210-2, a third vibration device 210-3, and a fourth vibration device 210-4, which are disposed at a rear surface of a display panel 100.

With reference to FIG. 13, each of the first vibration device 210-1 and the third vibration device 210-3 can be disposed in a first region A1 of the display panel 100. For example, each of the first vibration device 210-1 and the third vibration device 210-3 can be disposed to be staggered or in a diagonal direction in the first region A1 of the display panel 100. Accordingly, a vibration area of the first region A1 of the display panel 100 can be increased. For example, the diagonal direction can be a direction between a first direction X and a second direction Y.

The first vibration device 210-1 and the third vibration device 210-3 can be surrounded by a partition 600. For example, the first vibration device 210-1 and the third vibration device 210-3 can be surrounded by a fourth partition member 640 (or a first enclosure).

Each of the first vibration device 210-1 and the third vibration device 210-3 can vibrate the first region A1 of the display panel 100, and thus, can generate a first vibration sound (or a left sound) in the first region A1 of the display panel 100 or can generate a first haptic feedback. For example, a vibration area of the first region A1 of the display panel 100 can enlarge based on a parallel arrangement structure of the first vibration device 210-1 and the third vibration device 210-3, thereby enhancing a sound characteristic including a low-pitched sound band of the left sound. For example, in addition to the first vibration device 210-1, the third vibration device 210-3 can be further disposed in the first region A1 of the display panel 100, and thus, the first vibration sound or the first haptic feedback according to another embodiment of the present disclosure can be more enhanced than the first vibration sound or the first haptic feedback described above with reference to FIG. 12.

According to an embodiment of the present disclosure, the first vibration device 210-1 can be disposed to be close to a periphery in the first region A1 of the display panel 100. For example, the first vibration device 210-1 can be disposed in a left upper region adjacent to a periphery of the display panel 100 in the first region A1 of the display panel 100. The third vibration device 210-3 can be disposed to be close to a center line CL of the display panel 100 in the first region A1 of the display panel 100. For example, the third vibration device 210-3 can be disposed in a right lower region adjacent to the center line CL of the display panel 100 in the first region A1 of the display panel 100. The third vibration device 210-3 can be disposed to be staggered with respect to the first vibration device 210-1 in the first region A1 of the display panel 100, and thus, may not overlap the first vibration device 210-1 in the first direction X and the second direction Y. According to an embodiment of the present disclosure, a diagonal arrangement structure of the first vibration device 210-1 and the third vibration device 210-3 can have an effect where two vibration devices 210-1 and 210-3 are arranged in a 2×2 structure in the first region A1 of the display panel 100, and thus, the number of vibration apparatuses vibrating the first region A1 of the display panel 100 can decrease by half.

Each of the second vibration device 210-2 and the fourth vibration device 210-4 can be disposed in a second region A2 of the display panel 100. For example, each of the second vibration device 210-2 and the fourth vibration device 210-4 can be disposed to be staggered or in a diagonal direction in the second region A2 of the display panel 100. Accordingly, a vibration area of the second region A2 of the display panel 100 can be increased. For example, the diagonal can be a direction between the first direction X and the second direction Y.

The second vibration device 210-2 and the fourth vibration device 210-4 can be surrounded by the partition 600. For example, the second vibration device 210-2 and the fourth vibration device 210-4 can be surrounded by a fifth partition member 650 (or a second enclosure).

Each of the second vibration device 210-2 and the fourth vibration device 210-4 can vibrate the second region A2 of the display panel 100, and thus, can generate a second vibration sound (or a right sound) in the second region A2 of the display panel 100 or can generate a second haptic feedback. For example, a vibration area of the second region A2 of the display panel 100 can enlarge based on a diagonal arrangement structure of the second vibration device 210-2 and the fourth vibration device 210-4, thereby enhancing a sound characteristic including a low-pitched sound band of the right sound. For example, in addition to the second vibration device 210-2, the fourth vibration device 210-4 can be further disposed in the second region A2 of the display panel 100, and thus, the second vibration sound or the second haptic feedback according to another embodiment of the present disclosure can be more enhanced than the second vibration sound or the second haptic feedback described above with reference to FIG. 12.

According to an embodiment of the present disclosure, the second vibration device 210-2 can be disposed to be close to a periphery in the second region A2 of the display panel 100. For example, the second vibration device 210-2 can be disposed in a right upper region adjacent to a periphery of the display panel 100 in the second region A2 of the display panel 100. Further, the first vibration device 210-1 and the second vibration device 210-2 can be a left-right symmetrical with respect to the center line CL of the display panel 100. The fourth vibration device 210-4 can be disposed to be close to the center line CL of the display panel 100 in the second region A2 of the display panel 100. For example, the fourth vibration device 210-4 can be disposed in a left lower region adjacent to the center line CL of the display panel 100 in the second region A2 of the display panel 100. The fourth vibration device 210-4 can be disposed to be staggered with respect to the second vibration device 210-2 in the second region A2 of the display panel 100, and thus, may not overlap the second vibration device 210-2 in the first direction X and the second direction Y. According to an embodiment of the present disclosure, a diagonal arrangement structure of the second vibration device 210-2 and the fourth vibration device 210-4 can have an effect where two vibration devices 210-2 and 210-4 are arranged in a 2×2 structure in the second region A2 of the display panel 100, and thus, the number of vibration apparatuses vibrating the second region A2 of the display panel 100 can decrease by half.

Vibration portions of a plurality of vibration structures included in each of the first to fourth vibration devices 210-1 to 210-4 can be the same or differ. For example, based on a sound characteristic needed for the apparatus, the vibration portions of each of the plurality of vibration structures included in each of the first to fourth vibration devices 210-1 to 210-4 can include a vibration portions 231 and 271 which are the same as or different from one or more of the vibration portions 231 and 271 described above with reference to FIGS. 5 to 7F, 10, and 11. When the vibration layer of the vibration portions 231 and 271 of each of the plurality of vibration structures included in each of the first to fourth vibration devices 210-1 to 210-4 includes different vibration portions 231 and 271 of the vibration portions 231 and 271 described above with reference to FIGS. 5 to 7F, 10, and 11, the vibration apparatus 200 can have various resonance frequencies, and thus, a sound pressure level characteristic of a sound and a reproduction band of a sound generated based on a vibration of the vibration apparatus 200 can be considerably increased.

An arrangement structure of the first to fourth vibration devices 210-1 to 210-4 is not limited to an arrangement structure illustrated in FIG. 13. For example, in each of the first region A1 and the second region A2 of the display panel 100, when a direction between a left upper portion and a right lower portion is referred to as a first diagonal direction and a direction between a right upper portion and a left lower portion is referred to as a second diagonal direction, the first vibration device 210-1 and the third vibration device 210-3 can be disposed in a first diagonal direction or a second diagonal direction, and the second vibration device 210-2 and the fourth vibration device 210-4 can be disposed in a diagonal direction, which is the same as or different from a diagonal arrangement direction of the first vibration device 210-1 and the third vibration device 210-3, of the first diagonal direction or the second diagonal direction. For example, the first vibration device 210-1 and the second vibration device 210-2 can be disposed in a left-right symmetrical structure or a left-right asymmetrical structure with respect to the center line CL of the display panel 100. Further, the third vibration device 210-3 and the fourth vibration device 210-4 can be disposed in a left-right symmetrical structure or a left-right asymmetrical structure with respect to the center line CL of the display panel 100.

Therefore, the apparatus according to another embodiment of the present disclosure can provide a sound to a user, output a sound having a two or more-channel to a forward region in front of the display panel 100. Further, in the apparatus according to another embodiment of the present disclosure, a vibration area of each of the first region A1 and the second region A2 can increase based on a diagonal arrangement structure of the first vibration device 210-1 and the third vibration device 210-3 and a diagonal arrangement structure of the second vibration device 210-2 and the fourth vibration device 210-4, and thus, a sound pressure level characteristic of a low-pitched sound band can be more enhanced.

As another embodiment of the present disclosure, each of a first vibration device 210-1 and a third vibration device 210-3 can be disposed in a first region A1 of a display panel 100. For example, the first vibration device 210-1 and the third vibration device 210-3 can be disposed in parallel in a first direction X (or a widthwise direction) in the first region A1 of the display panel 100. For example, the first vibration device 210-1 and the third vibration device 210-3 can be disposed in one row in a second direction Y (or a lengthwise direction) in the first region A1 of the display panel 100.

As another embodiment of the present disclosure, the first vibration device 210-1 and the third vibration device 210-3 can be disposed in parallel in a second direction Y (or a lengthwise direction) or can be disposed in a parallel arrangement structure which is disposed in one row in the first direction X (or the widthwise direction), and even in this case, the same effect as FIG. 13 can be realized. Further, the second vibration device 210-2 and the fourth vibration device 210-4 can be disposed in parallel in a second direction Y (or a lengthwise direction) or can be disposed in a parallel arrangement structure which is disposed in one row in the first direction X (or the widthwise direction), and even in this case, the same effect as FIG. 13 can be realized.

Each of the plurality of vibration structures included in each of the first vibration device 210-1, the second vibration device 210-2, the third vibration device 210-3, and the fourth vibration device 210-4 can include a first portion and a second portion of the vibration portion. With reference to FIG. 13, an arrangement direction of the first portion of the vibration portion 231 can be the same as an arrangement direction of the second portion of the vibration portion 231, but embodiments of the present disclosure are not limited thereto. For example, the arrangement direction of the first portion and the arrangement direction of the second portion in the vibration portion 231 can be the same as a lengthwise direction of the display panel 100. For example, the arrangement direction of the first portion and the arrangement direction of the second portion in the vibration portion 231 can be the same as the second direction Y of the display panel 100. For example, an arrangement direction of a first portion and an arrangement direction of a second portion in the vibration portion of the first vibration device 210-1 can be adjusted to be identical to the lengthwise direction of the display panel 100, and an arrangement direction of a first portion and an arrangement direction of a second portion in the vibration portion of the third vibration device 210-3 can be adjusted to be identical to the widthwise direction of the display panel 100, but embodiments of the present disclosure can be implemented to be opposite thereto. For example, an arrangement direction of a first portion and an arrangement direction of a second portion in the vibration portion of the second vibration device 210-2 can be adjusted to be identical to the lengthwise direction of the display panel 100, and an arrangement direction of a first portion and an arrangement direction of a second portion in the vibration portion of the fourth vibration device 210-4 can be adjusted to be identical to the widthwise direction of the display panel 100, but the present disclosure can be implemented to be opposite thereto.

As another embodiment of the present disclosure, an arrangement direction of a first portion and an arrangement direction of a second portion in the vibration portion of the first vibration device 210-1 can be adjusted to be identical to the lengthwise direction of the display panel 100, and an arrangement direction of a first portion and an arrangement direction of a second portion in the vibration portion of the second vibration device 210-2 can be adjusted to be identical to the widthwise direction of the display panel 100, but the present disclosure can be implemented to be opposite thereto. For example, an arrangement direction of a first portion and an arrangement direction of a second portion in the vibration portion of the third vibration device 210-3 can be adjusted to be identical to the lengthwise direction of the display panel 100, and an arrangement direction of a first portion and an arrangement direction of a second portion in the vibration portion of the fourth vibration device 210-4 can be adjusted to be identical to the widthwise direction of the display panel 100, but embodiments of the present disclosure can be implemented to be opposite thereto.

According to an embodiment of the present disclosure, an arrangement direction of a first portion and an arrangement direction of a second portion in the vibration portion included in each of the first vibration device 210-1 and the second vibration device 210-2 can be symmetrical with an arrangement direction of a first portion and an arrangement direction of a second portion in the vibration portion included in each of the third vibration device 210-3 and the fourth vibration device 210-4. As another embodiment of the present disclosure, an arrangement direction of a first portion and an arrangement direction of a second portion in the vibration portion included in each of the first vibration device 210-1 and the second vibration device 210-2 can be asymmetrical with an arrangement direction of a first portion and an arrangement direction of a second portion in the vibration portion included in each of the third vibration device 210-3 and the fourth vibration device 210-4. For example, an arrangement direction of a first portion and an arrangement direction of a second portion in the vibration portion of the first vibration device 210-1 can differ from an arrangement direction of a first portion and an arrangement direction of a second portion in the vibration portion of the third vibration device 210-3. For example, an arrangement direction of a first portion and an arrangement direction of a second portion in the vibration portion of the second vibration device 210-2 can differ from an arrangement direction of a first portion and an arrangement direction of a second portion in the vibration portion of the fourth vibration device 210-4.

According to an embodiment of the present disclosure, an arrangement direction of the first portion and an arrangement direction of the second portion in each of the vibration structures included in the vibration apparatus can be same as a widthwise direction of the display panel or a lengthwise direction of the display panel, or can be configured with a combination of the widthwise direction and the lengthwise direction of the display panel. For example, an arrangement direction of the first portion and an arrangement direction of the second portion included in one or more of the first to fourth vibration devices can be same as a widthwise direction of the display panel or a lengthwise direction of the display panel, or can be configured in a combination of the widthwise direction and the lengthwise direction of the display panel.

Figure 14:
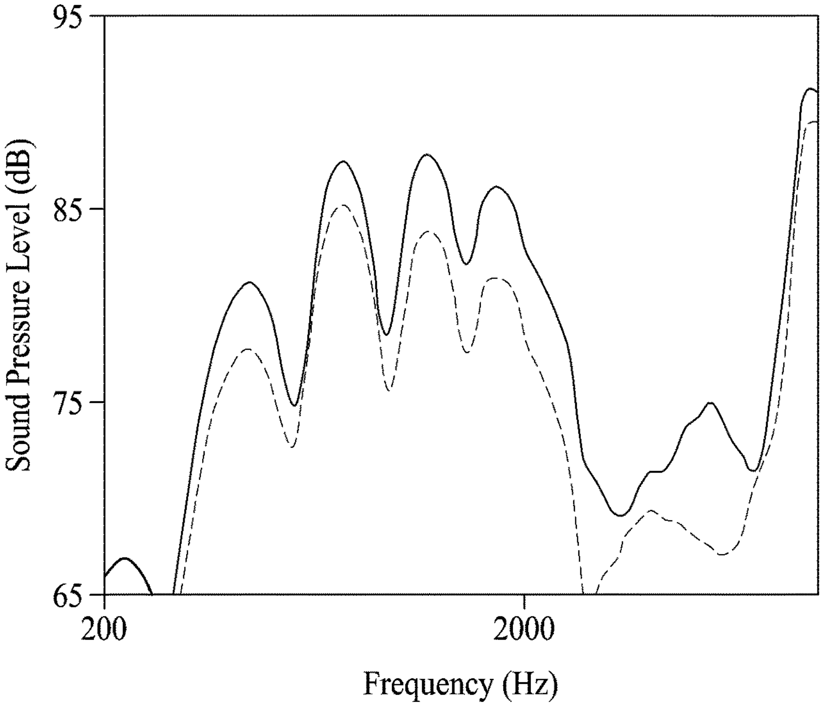
FIG. 14 illustrates a sound output characteristic of an apparatus according to an embodiment of the present disclosure.

FIG. 14 illustrates a sound output characteristic of an apparatus according to another embodiment of the present disclosure.

With reference to FIG. 14, a sound output characteristic can be measured by a sound analysis apparatus. The sound output characteristic has been measured by a B&K audio measurement apparatus. The sound analysis apparatus can include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone can be disposed at a center of the vibration apparatus, and a distance between the display panel and the microphone can be 30 cm. A sound can be measured under a condition where the microphone is vertical to the vibration apparatus. The sound collected through the microphone can be input to the control PC through the sound card, and a control program can check the input sound to analyze a sound of the vibration apparatus. For example, a frequency response characteristic corresponding to a frequency range of 20 Hz to 20 kHz can be measured by using a pulse program.

In FIG. 14, the abscissa axis represents a frequency (Hz), and the ordinate axis represents a sound pressure level (SPL) (dB).

With reference to FIG. 14, in the apparatus of FIG. 3A, copper oxide (CuO or $Cu_2O$) is applied as a connection member, and an adhesive member applies rubber. A plate applies stainless steel. A dotted line represents a sound output characteristic after the adhesive member which is rubber is attached. A solid line represents a sound output characteristic after the adhesive member which is rubber is attached and aging is performed at a temperature of 80° C. for 100 hours. For example, in a frequency of about 20 Hz to about 20 kHz, it can be seen that a sound pressure level represented by the solid line is enhanced by about 3 dB more than the dotted line. Accordingly, it can be seen that a sound pressure level is enhanced by oxidizing the connection member to induce a curing reaction of the adhesive member. According to an embodiment of the present disclosure, because the connection member is further provided, an apparatus including a vibration apparatus having an enhanced sound pressure level can be provided.

Figure 15:
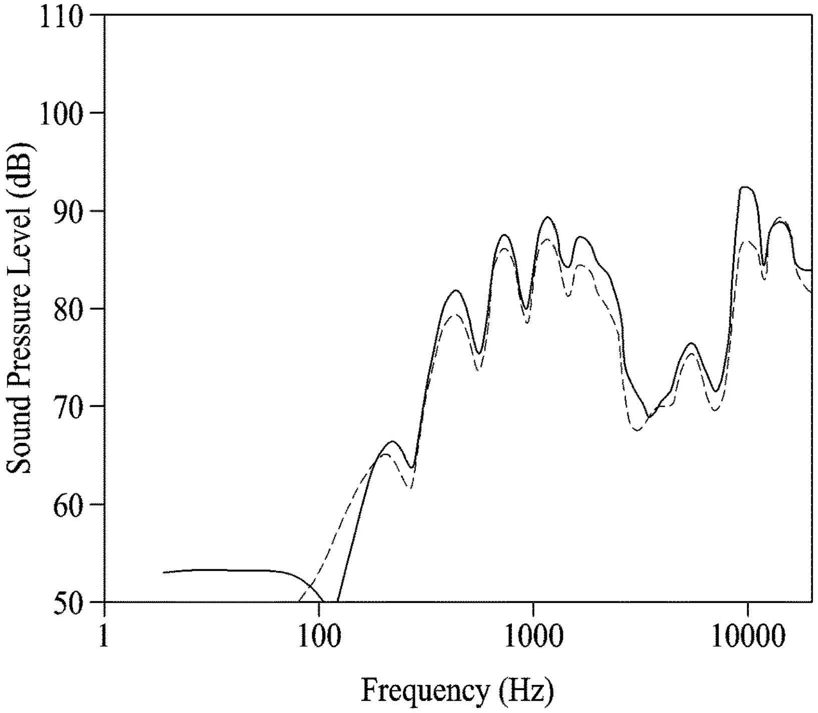
FIG. 15 illustrates a sound output characteristic of an apparatus according to another embodiment of the present disclosure.
Figure 16:
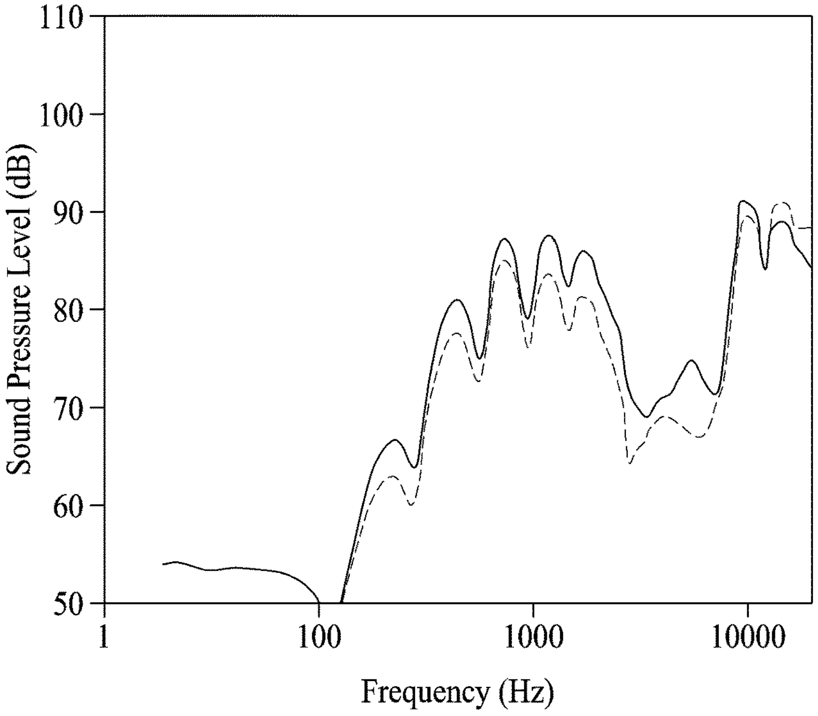
FIG. 16 illustrates a sound output characteristic of an apparatus according to another embodiment of the present disclosure.

FIG. 15 illustrates a sound output characteristic of an apparatus according to another embodiment of the present disclosure. FIG. 16 illustrates a sound output characteristic of an apparatus according to another embodiment of the present disclosure.

A method of measuring a sound output characteristic is the same as FIG. 14, and thus, its description is omitted.

With reference to FIG. 15, in the apparatus of FIG. 3A, copper (Cu) is applied as a connection member, and an adhesive member applies rubber. A plate applies aluminum (Al). A dotted line represents a sound output characteristic after the connection member is attached at a room temperature and aging is performed at a temperature of 80° C. for 0 hours. A solid line represents a sound output characteristic after the connection member is attached at the room temperature and aging is performed at a temperature of 80° C. for 100 hours. For example, in a frequency of about 20 Hz to about 20 kHz, it can be seen that a sound pressure level represented by the dotted line is 74.89 dB, a sound pressure level represented by the solid line is 76.75 dB, and a sound pressure level represented by the solid line is enhanced by about 1.85 dB more than the dotted line.

With reference to FIG. 16, in the apparatus of FIG. 3A, copper (Cu) is applied as a connection member, and an adhesive member applies rubber. A plate applies aluminum (Al). A dotted line represents a sound output characteristic after the connection member is oxidized and attached in a high-temperature and high-humidity environment and aging is performed at a temperature of 80° C. for 0 hours. A solid line represents a sound output characteristic after the connection member is oxidized and attached at the high-temperature and high-humidity environment and aging is performed at a temperature of 80° C. for 100 hours. For example, in the high-temperature and high-humidity environment, a temperature can be 85° C. and humidity can be 85%. In a frequency of about 20 Hz to about 20 kHz, it can be seen that a sound pressure level represented by the dotted line is 72.38 dB, a sound pressure level represented by the solid line is 75.99 dB, and a sound pressure level represented by the solid line is enhanced by about 3.60 dB more than the dotted line. Accordingly, it can be seen that a sound pressure level is enhanced by oxidizing the connection member to induce a curing reaction of the adhesive member. For example, it can be seen that a cross-linking reaction of the adhesive member is induced by metal oxide which is the plate and the connection member. According to an embodiment of the present disclosure, because the connection member is further provided, an apparatus including a vibration apparatus having an enhanced sound pressure level can be provided.

The vibration apparatus according to an embodiment of the present disclosure can be applied to a vibration apparatus disposed in an apparatus. The apparatus according to an embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, sliding apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Further, the vibration apparatus according to an embodiment of the present disclosure can be applied to organic light emitting lighting apparatuses or inorganic light emitting lighting apparatuses. When the vibration apparatus of an embodiment of the present disclosure is applied to lighting apparatuses, the vibration apparatus can act as lighting and a speaker. Further, when the vibration apparatus of an embodiment of the present disclosure is applied to a mobile device, the vibration apparatus can act as one or more of a speaker, a receiver, and a haptic, but embodiments of the present disclosure are not limited thereto.

A vibration apparatus and an apparatus including the same according to an embodiment of the present disclosure will be described below.

An apparatus according to an embodiment of the present disclosure can comprise a display panel configured to display an image, a vibration apparatus disposed at a rear surface of the display panel to vibrate the display panel, and an adhesive member and a connection member between the display panel and the vibration apparatus.

According to some embodiments of the present disclosure, the apparatus can further comprise a plate disposed at the rear surface of the display panel, the adhesive member can be between the plate and the vibration apparatus, and the connection member can be between the adhesive member and the vibration apparatus.

According to some embodiments of the present disclosure, the plate can include a plurality of opening portions provided along a widthwise direction of the display panel or a lengthwise direction of the display panel so as to have a predetermined size and a predetermined interval.

According to some embodiments of the present disclosure, the vibration apparatus can comprise a vibration portion, a first protection member disposed at a first surface of the vibration portion, and a second protection member disposed at a second surface different from the first surface of the vibration portion.

According to some embodiments of the present disclosure, the connection member can be between the first protection member and the adhesive member.

According to some embodiments of the present disclosure, the first protection member can comprise a base member, and an adhesive layer disposed at a first surface of the base member, the adhesive layer can contact the vibration portion.

According to some embodiments of the present disclosure, the vibration apparatus can further comprise a first electrode layer between the vibration portion and the first protection member, and a second electrode layer between the vibration portion and the second protection member.

According to some embodiments of the present disclosure, the plate can comprise one or more of a single nonmetal material, a composite nonmetal material, and a metal material, and the single nonmetal material or the composite nonmetal material can comprise one or more of wood, plastic, glass, cloth, paper, and leather.

According to some embodiments of the present disclosure, the plate can comprise a metal material, and the connection member can comprise a metal material oxidized from the plate.

According to some embodiments of the present disclosure, the connection member can be between the display panel and the adhesive member, and the adhesive member can be between the connection member and the vibration apparatus.

According to some embodiments of the present disclosure, the vibration apparatus can comprise a vibration portion, a first protection member disposed at a first surface of the vibration portion, and a second protection member disposed at a second surface different from the first surface of the vibration portion.

According to some embodiments of the present disclosure, the adhesive member can be between the first protection member and the connection member.

According to some embodiments of the present disclosure, the connection member can comprise a metal oxide.

According to some embodiments of the present disclosure, the vibration apparatus can comprise two or more vibration structures.

According to some embodiments of the present disclosure, each of the two or more vibration structures can comprise a first portion including an inorganic material and a second portion between adjacent first portions, the second portion including an organic material.

According to some embodiments of the present disclosure, an arrangement direction of the first portion and an arrangement direction of the second portion can be same as a widthwise direction of the display panel or a lengthwise direction of the display panel, or can be configured by a combination thereof.

According to some embodiments of the present disclosure, the first portion can have a piezoelectric characteristic, and the second portion can have ductile characteristic.

According to some embodiments of the present disclosure, each of the two or more vibration structures can comprise a vibration portion, a first protection member disposed at a first surface of the vibration portion, and a second protection member disposed at a second surface different from the first surface of the vibration portion.

According to some embodiments of the present disclosure, the vibration portion can include a piezoelectric material, a composite piezoelectric material or an electroactive material, the piezoelectric material, the composite piezoelectric material and the electroactive material having a piezoelectric effect.

According to some embodiments of the present disclosure, the vibration apparatus can further comprise a first electrode layer between the vibration portion and the first protection member, and a second electrode layer between the vibration portion and the second protection member.

According to some embodiments of the present disclosure, the display panel can comprise a first region and a second region, the vibration apparatus can comprise a first vibration device to vibrate the first region and a second vibration device to vibrate the second region, and each of the first vibration device and the second vibration device can comprise the connection member and the adhesive member.

According to some embodiments of the present disclosure, the vibration generating apparatus can further comprise a partition, which divides the first region and the second regions of the display panel.

According to some embodiments of the present disclosure, the partition can include a first partition member and a second partition member disposed between the first vibration device and the second vibration device.

According to some embodiments of the present disclosure, the partition can further include a third partition member disposed to surround the vibration apparatus comprising the first vibration device and the second vibration device.

According to some embodiments of the present disclosure, the partition can further include a fourth partition member surrounding the first vibration device and a fifth partition member surrounding the second vibration device.

According to some embodiments of the present disclosure, the vibration apparatus can further comprise a third vibration device to vibrate the first region and a fourth vibration device to vibrate the second region. The first vibration device and the third vibration device can be disposed to be staggered with each other, in a diagonal direction, in parallel in a widthwise direction of the display panel, or in parallel a lengthwise direction of the display panel in the first region of the display panel. The second vibration device and the fourth vibration device can be disposed to be staggered with each other, in a diagonal direction, in parallel in a widthwise direction of the display panel, or in parallel a lengthwise direction of the display panel in the second region of the display panel.

According to some embodiments of the present disclosure, the vibration apparatus can be configured to vibrate according to a voice signal synchronized with an image displayed by the display panel or a haptic feedback signal synchronized with a user touch applied to a touch panel which is disposed at the display panel or embedded into the display panel, to vibrate the display panel.

According to some embodiments of the present disclosure, the adhesive member can include a hollow portion provided between the display panel and the vibration apparatus for providing an air gap between the display panel and the vibration apparatus.

According to some embodiments of the present disclosure, the vibration generating apparatus can further comprise a supporting member disposed at a rear surface of the display panel with a gap space between the display panel and the supporting member.

According to some embodiments of the present disclosure, the vibration generating apparatus can further comprise a middle frame disposed between a rear periphery of the display panel and a front periphery of the supporting member. The middle frame can surround one or more of side surfaces of each of the display panel and the supporting member, for providing the gap space between the display panel and the supporting member.

According to some embodiments of the present disclosure, the connection member and the adhesive member can be cured by reacting with each other, such that the vibration apparatus is attached at the rear surface of the display panel.

According to some embodiments of the present disclosure, member is hardened by a reaction with the adhesive member at a curing temperature of 80° C. or more to 100° C. or less, and a cross-linking reaction of the adhesive member is induced by the connection member.

An apparatus according to some embodiments of the present disclosure can comprise a vibration member, a vibration apparatus disposed at the vibration member, and an adhesive member and a connection member between the vibration member and the vibration apparatus.

According to some embodiments of the present disclosure, the vibration member can comprise a plate, the plate can comprise one or more of a single nonmetal material, a composite nonmetal material, and a metal material, and the single nonmetal material or the composite nonmetal material can comprise one or more of wood, plastic, glass, cloth, paper, and leather.

According to some embodiments of the present disclosure, the adhesive member can be between the connection member and the plate.

According to some embodiments of the present disclosure, the connection member can comprise a metal oxide.

According to some embodiments of the present disclosure, the vibration member can comprise a plate having a metal material, and the connection member can comprise a metal material oxidized from the plate.

According to some embodiments of the present disclosure, the connection member can be between the vibration member and the adhesive member, and the adhesive member can be between the connection member and the vibration apparatus.

According to some embodiments of the present disclosure, the connection member can comprise a metal oxide.

According to some embodiments of the present disclosure, the vibration member can comprise one or more of a vehicle interior material, a vehicle glass window, a building ceiling, a building interior material, a building glass window, an aircraft interior material, and an aircraft glass window, a light emitting diode lighting panel, an organic light emitting lighting panel, an inorganic light emitting lighting panel, and a display panel including a plurality of pixels configured to display an image.

According to some embodiments of the present disclosure, the vibration apparatus can comprise a plurality of vibration generators.

According to some embodiments of the present disclosure, each of the plurality of vibration generators can comprise the plurality of vibration structures.

According to some embodiments of the present disclosure, each of the plurality of vibration generators can be stacked to be displaced in the same direction.

According to some embodiments of the present disclosure, the vibration apparatus can further comprise a first vibration generator, a second vibration generator overlapped with the first vibration generator, and the second adhesive member between the first vibration generator and the second vibration generator.

According to some embodiments of the present disclosure, each of a vibration portion of the first vibration generator and the second vibration generator can comprise a first portion including an inorganic material and a second portion between adjacent first portions, the second portion including an organic material.

According to some embodiments of the present disclosure, the first portion can have a piezoelectric characteristic, and the second portion can have a ductile characteristic or flexibility.

According to some embodiments of the present disclosure, the second portion can have a modulus and viscoelasticity that are lower than those of the first portion.

According to some embodiments of the present disclosure, the first portion and the second portion can be alternately and repeatedly arranged along a lengthwise direction of the vibration generating apparatus. The first portion can have a first width parallel to the lengthwise direction of the vibration generating apparatus, and the second portion can have a second width parallel to the lengthwise direction of the vibration generating apparatus, which is same or different from the first width.

According to some embodiments of the present disclosure, the second width of the second portion can progressively decrease in a direction from a center portion to both peripheries of the vibration portion.

According to some embodiments of the present disclosure, the first width of the first portion can progressively decrease or increase in a direction from a center portion to both peripheries of the vibration portion.

According to some embodiments of the present disclosure, the first portion can include a plurality of first portions, which are spaced apart from each other in a widthwise direction and a lengthwise direction of the vibration generating apparatus.

According to some embodiments of the present disclosure, each of the plurality of first portions can have a hexahedral shape, a circular shape, or a triangular shape.

According to some embodiments of the present disclosure, the first portions can include a ceramic-based material for generating a relatively high vibration, or includes a piezoelectric ceramic having a perovskite-based crystalline structure.

According to some embodiments of the present disclosure, the first portion can have a piezoelectric deformation coefficient of 1,000 pC/N or more in a thickness direction of the vibration generating apparatus.

According to some embodiments of the present disclosure, the apparatus can further comprise a second connection member between the second adhesive member and the second vibration generator, the second connection member can comprise a metal oxide.

According to some embodiments of the present disclosure, each of the first vibration generator and the second vibration generator can comprise: a vibration portion, a first electrode layer disposed at a first surface of the vibration portion, and a second electrode layer disposed at a second surface different from the first surface of the vibration portion.

A vibration apparatus according to an embodiment of the present disclosure can comprise a vibration portion, a first protection member disposed at a first surface of the vibration portion, a second protection member disposed at a second surface different from the first surface of the vibration portion, a connection member disposed over the first protection member, and an adhesive member disposed over the connection member.

According to some embodiments of the present disclosure, the connection member can comprise a metal oxide.

According to some embodiments of the present disclosure, the vibration apparatus can further comprise a plate disposed at the vibration portion, the connection member can be between the plate and the adhesive member.

A vibration apparatus according to an embodiment of the present disclosure can comprise a vibration member, a first vibration generator disposed at the vibration member, a second vibration generator disposed under the first vibration generator, a first adhesive member between the vibration member and the first vibration generator, a second adhesive member between the first vibration generator and the second vibration generator, and a first connection member between the second vibration generator and the second adhesive member.

According to some embodiments of the present disclosure, the first connection member can comprise a metal oxide.

According to some embodiments of the present disclosure, the vibration apparatus can further comprise a second connection member between the first adhesive member and the first vibration generator.

According to some embodiments of the present disclosure, the second connection member can comprise a metal oxide.

According to some embodiments of the present disclosure, the vibration apparatus can further comprise a plate disposed at the vibration member, and a second connection member between the plate and the first adhesive member.

According to some embodiments of the present disclosure, each of the first vibration generator and the second vibration generator can comprise: a vibration portion, a first electrode layer disposed at a first surface of the vibration portion, and a second electrode layer disposed at a second surface different from the first surface of the vibration portion.

According to some embodiments of the present disclosure, each of the vibration portion of the first vibration generator and the second vibration generator can comprise a first portion including an inorganic material and a second portion between adjacent first portions, the second portion including an organic material.

It will be apparent to those skilled in the art that various modifications and variations can be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. An apparatus, comprising:
a display panel configured to display an image;
a vibration apparatus disposed at a rear surface of the display panel to vibrate the display panel to generate sound; and
an adhesive member and a connection member between the display panel and the vibration apparatus,
wherein the vibration apparatus comprises:
a vibration portion;
a first protection member disposed at a first surface of the vibration portion; and
a second protection member disposed at a second surface of the vibration portion, the second surface of the vibration portion being different from the first surface of the vibration portion,
wherein the connection member covers a front surface of the first protection member adjacent to the adhesive member, and
wherein the connection member comprises a metal oxide.

2. The apparatus of claim 1, further comprising a plate disposed at the rear surface of the display panel,
wherein the adhesive member is between the plate and the vibration apparatus, and
wherein the connection member is between the adhesive member and the vibration apparatus.

3. The apparatus of claim 2, wherein:
the plate comprises one or more of a single nonmetal material, a composite nonmetal material, and a metal material, and
the single nonmetal material or the composite nonmetal material comprises one or more of wood, plastic, glass, cloth, paper, and leather.

4. The apparatus of claim 1, wherein the vibration apparatus comprises:
a first electrode layer between the vibration portion and the first protection member; and
a second electrode layer between the vibration portion and the second protection member, and
wherein the connection member is between the first protection member and the adhesive member.

5. The apparatus of claim 1, wherein the first protection member comprises:
a base member; and
an adhesive layer disposed at a first surface of the base member,
wherein the adhesive layer contacts the vibration portion.

6. The apparatus of claim 1, further comprising a plate, wherein:
the plate comprises a metal material, and
the metal oxide of the connection member comprises the metal material oxidized from the plate.

7. The apparatus of claim 1, wherein the vibration apparatus comprises two or more vibration structures, and
wherein each of the two or more vibration structures comprises a piezoelectric material.

8. The apparatus of claim 1, wherein the vibration apparatus comprises two or more vibration structures, and
wherein each of the two or more vibration structures comprises first portions including an inorganic material and a second portion between adjacent first portions, the second portion including an organic material.

9. The apparatus of claim 8, wherein an arrangement direction of the first portions and an arrangement direction of the second portion are the same as a widthwise direction of the display panel or a lengthwise direction of the display panel, or are configured by a combination thereof.

10. The apparatus of claim 8, wherein the first portion has a piezoelectric characteristic, and
wherein the second portion has a ductile characteristic.

11. The apparatus of claim 1, wherein:
the display panel comprises a first region and a second region,
the vibration apparatus comprises a first vibration device to vibrate the first region and a second vibration device to vibrate the second region, and
each of the first vibration device and the second vibration device comprises the connection member and the adhesive member.

12. The apparatus of claim 1, wherein the connection member is hardened by a reaction with the adhesive member at a curing temperature of 80° C. or more to 100° C. or less, and
wherein a cross-linking reaction of the adhesive member is induced by the connection member.

13. An apparatus, comprising:
a vibration member;
a vibration apparatus disposed at the vibration member to generate sound; and
an adhesive member and a connection member between the vibration member and the vibration apparatus,
wherein the vibration apparatus comprises:
a vibration portion;
a first protection member disposed at a first surface of the vibration portion;
a second protection member disposed at a second surface of the vibration portion, the second surface of the vibration portion being different from the first surface of the vibration portion;

a first electrode layer between the vibration portion and the first protection member; and a second electrode layer between the vibration portion and the second protection member, wherein the connection member is between the first protection member and the adhesive member, wherein the connection member covers a front surface of the first protection member adjacent to the adhesive member, and wherein the connection member comprises a metal oxide.

14. The apparatus of claim 13, wherein:

the vibration member comprises a plate, the plate comprises one or more of a single nonmetal material, a composite nonmetal material, and a metal material, the single nonmetal material or the composite nonmetal material comprises one or more of wood, plastic, glass, cloth, paper, and leather.

15. The apparatus of claim 13, wherein the vibration member comprises a plate, and wherein the adhesive member is between the connection member and the plate.

16. The apparatus of claim 13, wherein:

the vibration member comprises a plate having a metal material, and the metal oxide of the connection member comprises the metal material oxidized from the plate.

17. The apparatus of claim 13, wherein the vibration member comprises one or more of a vehicle interior material, a vehicle glass window, a building ceiling, a building interior material, a building glass window, an aircraft interior material, and an aircraft glass window, a light emitting diode lighting panel, an organic light emitting lighting panel, an inorganic light emitting lighting panel, and a display panel including a plurality of pixels configured to display an image.

18. The apparatus of claim 13, wherein the vibration apparatus comprises a plurality of vibration generators, wherein each of the plurality of vibration generators comprises a plurality of vibration structures, and wherein each of the plurality of vibration generators is stacked to be displaced in the same direction.

19. The apparatus of claim 13, wherein the vibration apparatus further comprises:

a first vibration generator;

a second vibration generator overlapped with the first vibration generator; and wherein the second adhesive member is between the first vibration generator and the second vibration generator, and wherein each of the first vibration generator and the second vibration generator comprises a first portion including an inorganic material and a second portion between adjacent first portions, the second portion including an organic material.

20. The apparatus of claim 19, further comprising a second connection member between the second adhesive member and the second vibration generator, wherein the second connection member comprises a metal oxide.

21. The apparatus of claim 13, wherein the vibration apparatus further comprises:

a first vibration generator;

a second vibration generator overlapped with the first vibration generator; and wherein the second adhesive member is between the first vibration generator and the second vibration generator, and wherein each of the first vibration generator and the second vibration generator comprises a piezoelectric material.

22. The apparatus of claim 21, further comprising a second connection member between the second adhesive member and the second vibration generator, wherein the second connection member comprises a metal oxide.

23. A vibration apparatus, comprising:

a vibration portion;

a first protection member disposed at a first surface of the vibration portion;

a second protection member disposed at a second surface of the vibration portion, the second surface of the vibration portion being different from the first surface of the vibration portion;

a connection member disposed over the first protection member; and an adhesive member disposed over the connection member, wherein the connection member covers a front surface of the first protection member adjacent to the adhesive member, and wherein the connection member comprises a metal oxide.

24. The vibration apparatus of claim 23, further comprising a plate disposed at the vibration portion, wherein the connection member is between the plate and the adhesive member.

25. The vibration apparatus of claim 23, further comprising:

a vibration member;

a first vibration generator disposed at the vibration member, the first vibration generator including the vibration portion;

a second vibration generator disposed under the first vibration generator, wherein the adhesive member is between the vibration member and the first vibration generator, wherein another adhesive member between the first vibration generator and the second vibration generator, and wherein another connection member between the second vibration generator and the another adhesive member.

26. The vibration apparatus of claim 25, wherein the another connection member comprises a metal oxide.

27. The vibration apparatus of claim 25, further comprising:

a plate disposed at the vibration member, wherein the connection member is between the plate and the adhesive member.

* * * * *